United States Patent
Kuwahara et al.

(10) Patent No.: US 6,449,232 B1
(45) Date of Patent: Sep. 10, 2002

(54) DISK TYPE DETERMINATION METHOD

(75) Inventors: Masaya Kuwahara; Shinichi Yamada, both of Osaka; Hiroyuki Yamaguchi, Hyogo; Masuo Maruyama, Osaka; Masanari Mohri, Hyogo; Akihiro Sakaguchi; Yasuo Nishihara, both of Osaka; Masayoshi Shioya, Hyogo, all of (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/601,379

(22) PCT Filed: Feb. 2, 1999

(86) PCT No.: PCT/JP99/00438

§ 371 (c)(1),
(2), (4) Date: Sep. 25, 2000

(87) PCT Pub. No.: WO99/40583

PCT Pub. Date: Aug. 12, 1999

(30) Foreign Application Priority Data

Feb. 3, 1998 (JP) ............................. 10-021785
Mar. 10, 1998 (JP) ............................. 10-057808

(51) Int. Cl.[7] ................................................ G11B 7/00
(52) U.S. Cl. ............................... 369/53.23; 369/53.37; 369/44.27
(58) Field of Search .......................... 369/53.23, 53.22, 369/53.2, 53.28, 53.31, 53.37, 94, 44.25, 44.27, 44.29

(56) References Cited

U.S. PATENT DOCUMENTS 5,831,953 A * 11/1998 Numata ................... 369/53.23
5,903,531 A * 5/1999 Satoh et al. .............. 369/53.23
5,917,791 A * 6/1999 Tsuchiya et al. ......... 369/53.23
6,058,082 A * 5/2000 Hwang .................... 369/44.27
6,240,054 B1 * 5/2001 Takeya et al. ............ 369/53.37
6,288,988 B1 * 9/2001 Kumagai .................. 369/53.23

FOREIGN PATENT DOCUMENTS

| JP | 4195733 | 7/1992 |
| JP | 05054396 | 3/1993 |
| JP | 06231475 | 8/1994 |
| JP | 06325482 | 11/1994 |
| JP | 09035402 | 2/1997 |
| JP | 09120613 | 5/1997 |
| JP | 09265722 | 10/1997 |
| JP | 09312057 | 12/1997 |
| JP | 09312507 | 12/1997 |
| JP | 09320178 | 12/1997 |
| JP | 10097755 A * | 4/1998 |
| JP | 10143883 | 5/1998 |
| JP | 10222853 | 8/1998 |
| JP | 10312629 | 11/1998 |
| JP | 2000182314 A * | 6/2000 |

* cited by examiner

Primary Examiner—Thang V. Tran
(74) Attorney, Agent, or Firm—Renner, Otto, Boisselle & Sklar

(57) ABSTRACT

Optical disks compliant with different standards are recorded or reproduced by a single recording/reproducing apparatus by a first step of determining a substrate thickness of the disk based on a focusing error signal, when a focusing section for bringing the light beam into a focus on the disk is moved in such a way as to approach or withdraw from the recording surface of the disk; a second step of performing any one step of determining the number of recording surfaces of the disk when the focusing section is moved in such a way as to approach or withdraw from the recording surface of the disk, and determining whether or not the disk can be recorded and reproduced using a tracking error signal detected when the light beam crosses the track.

29 Claims, 36 Drawing Sheets

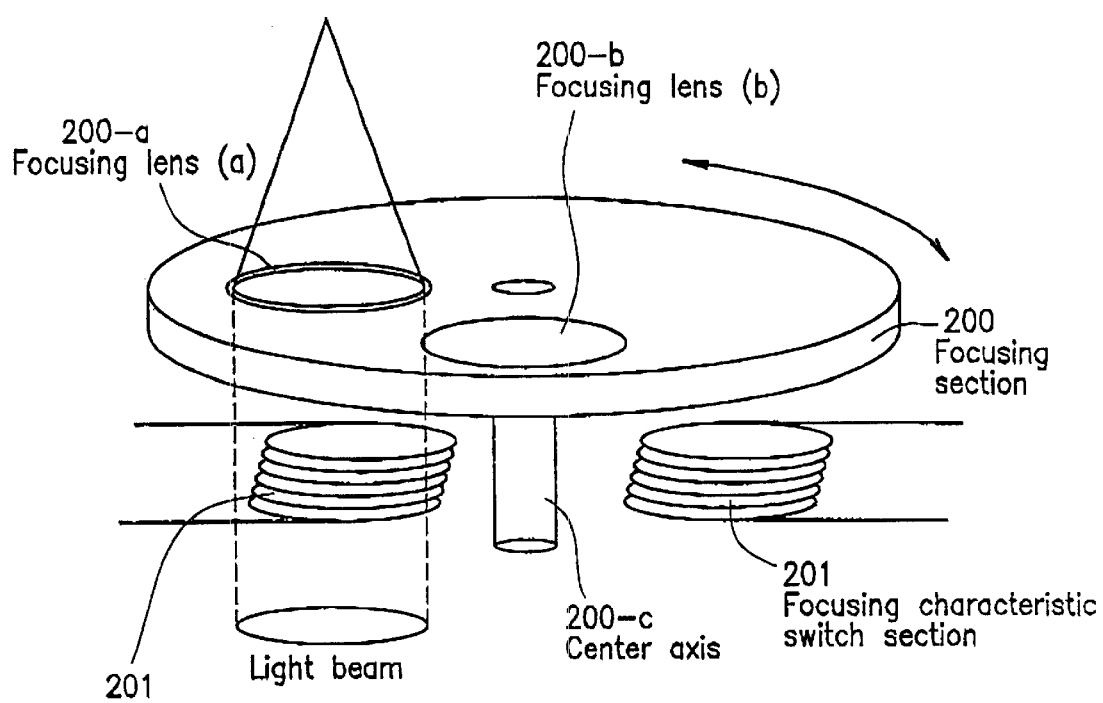

Focusing error detection circuit

Focusing error signal

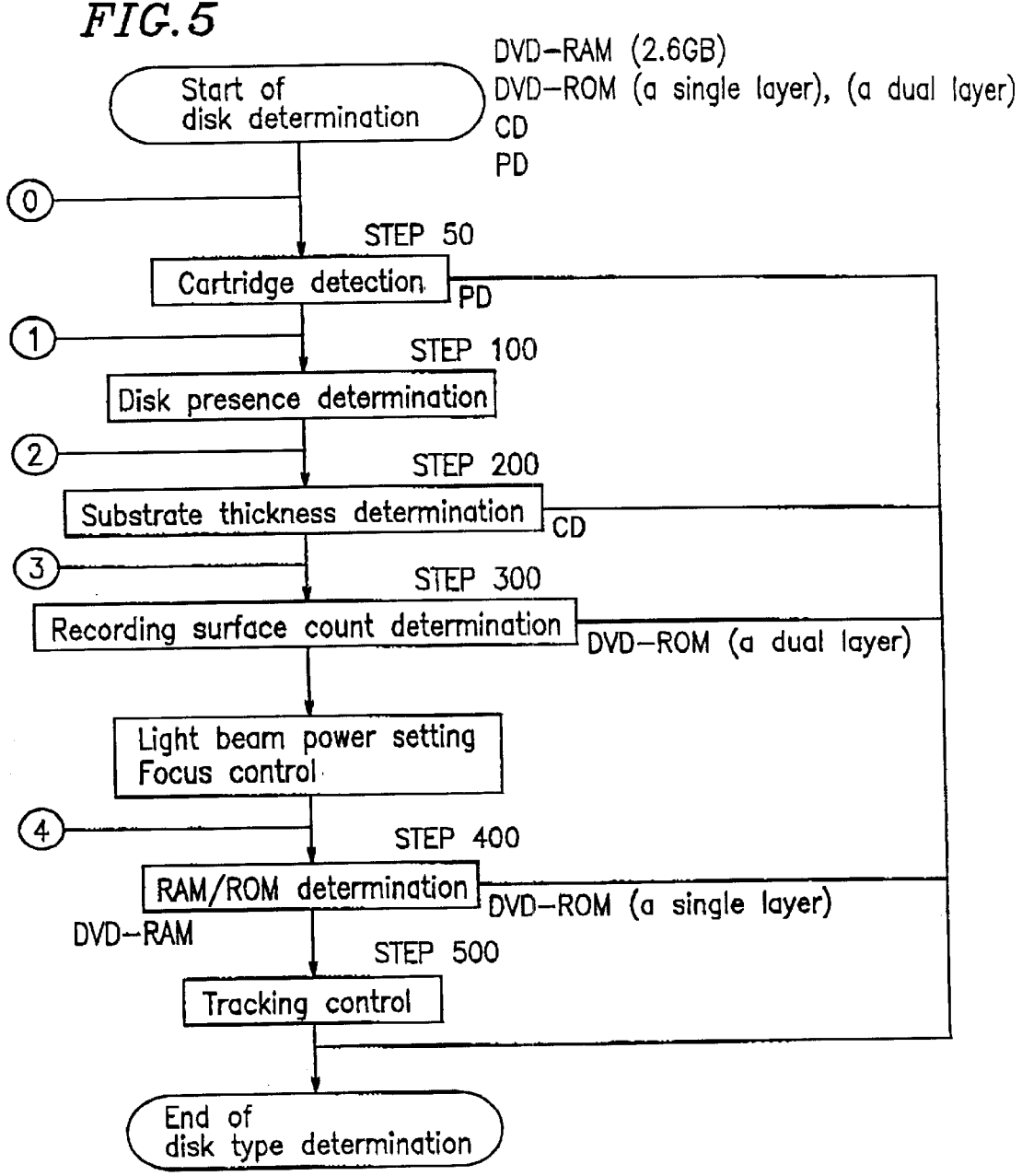

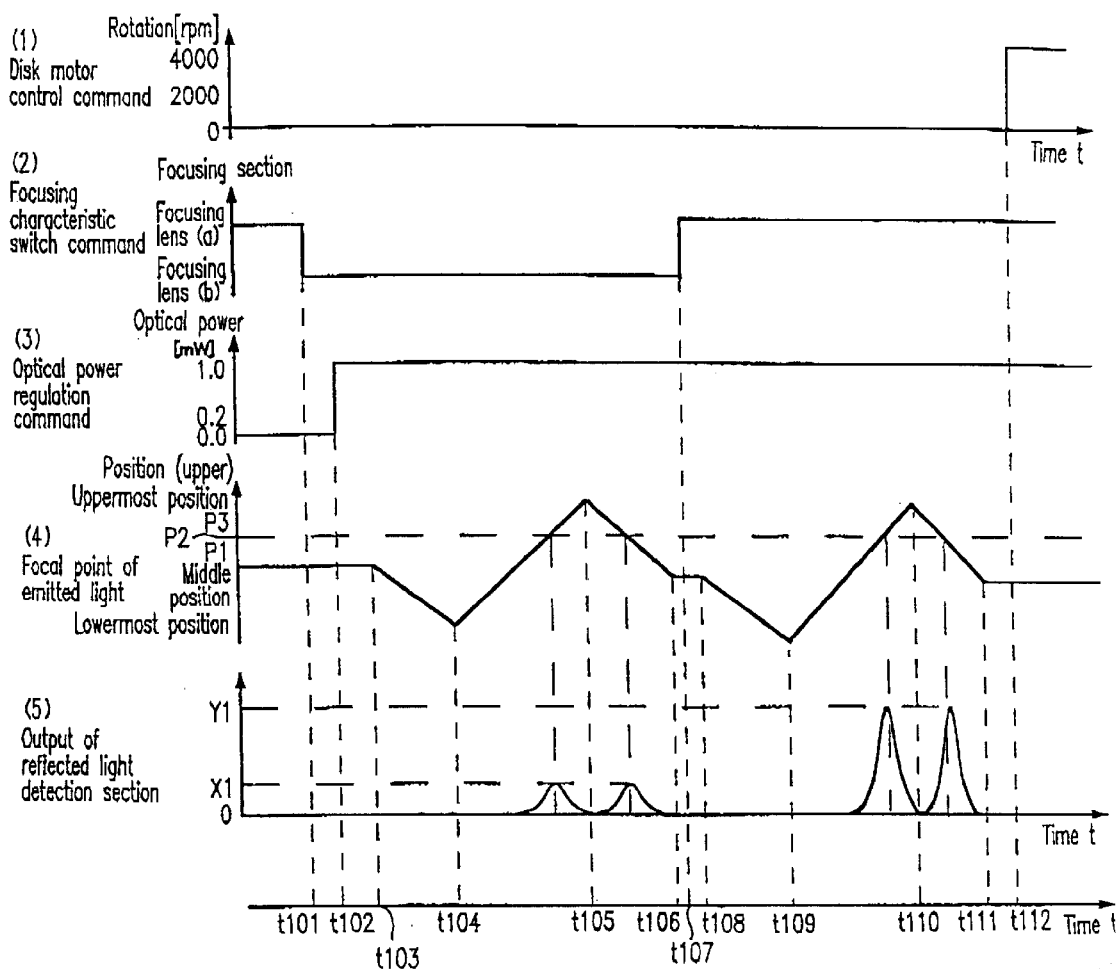

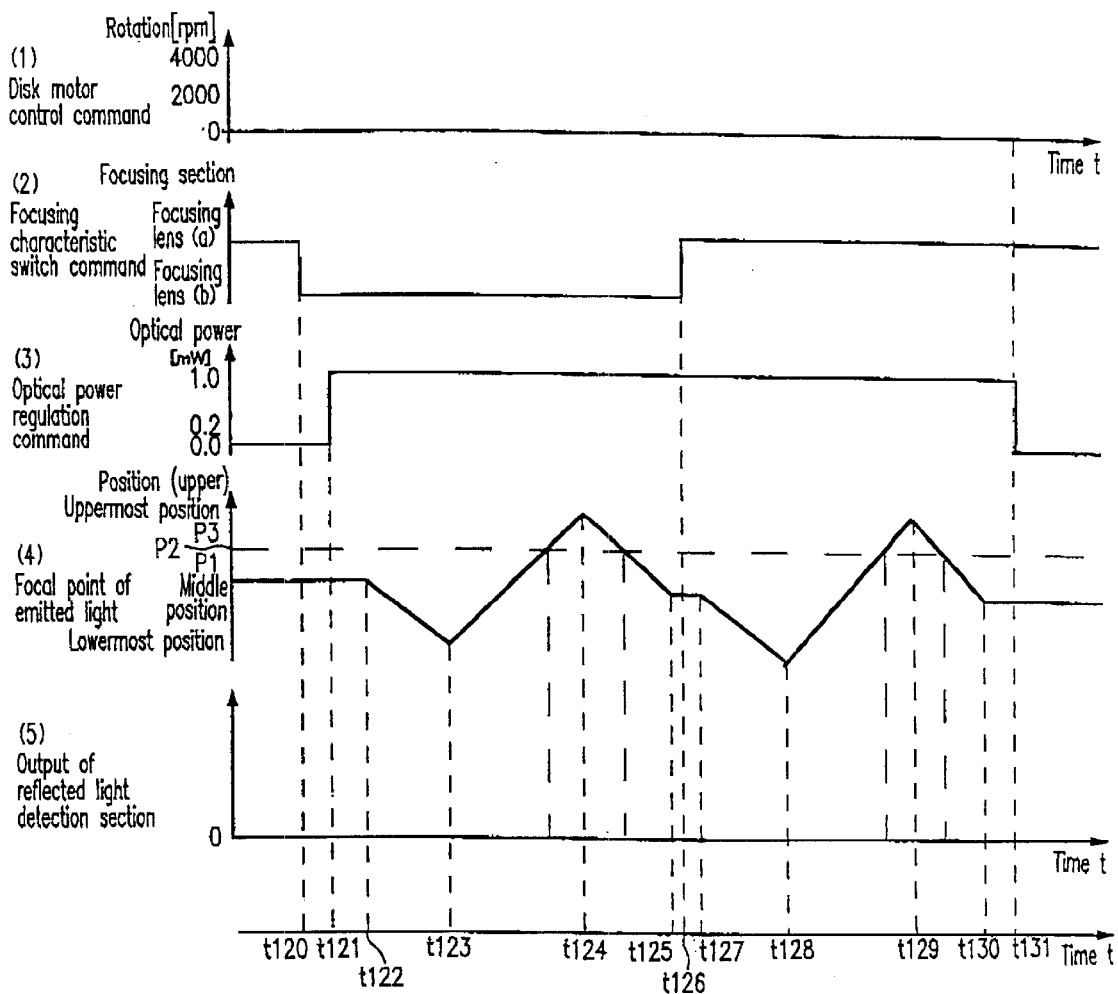

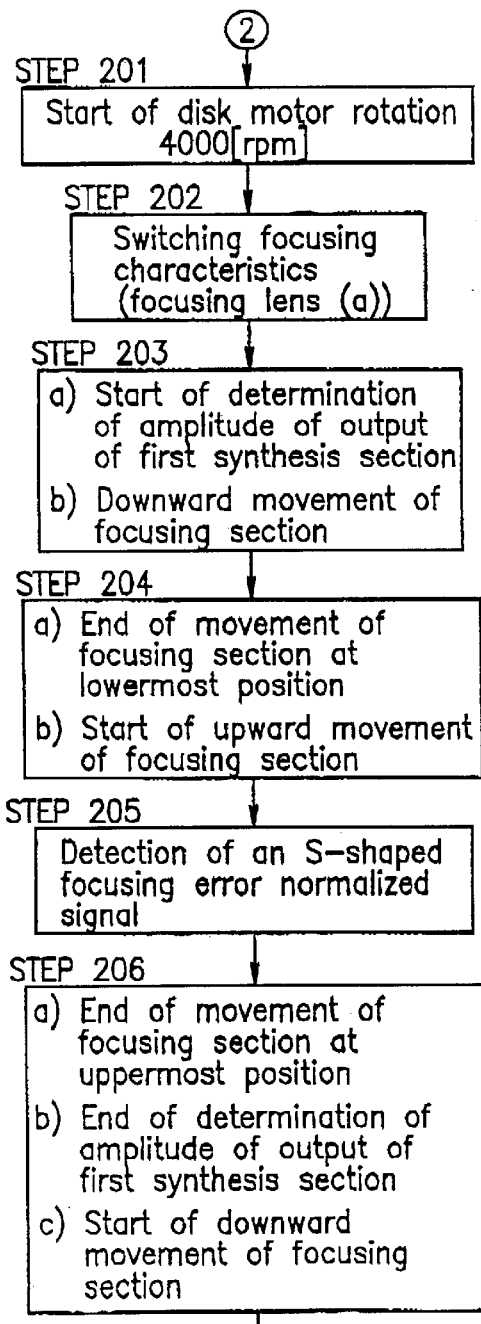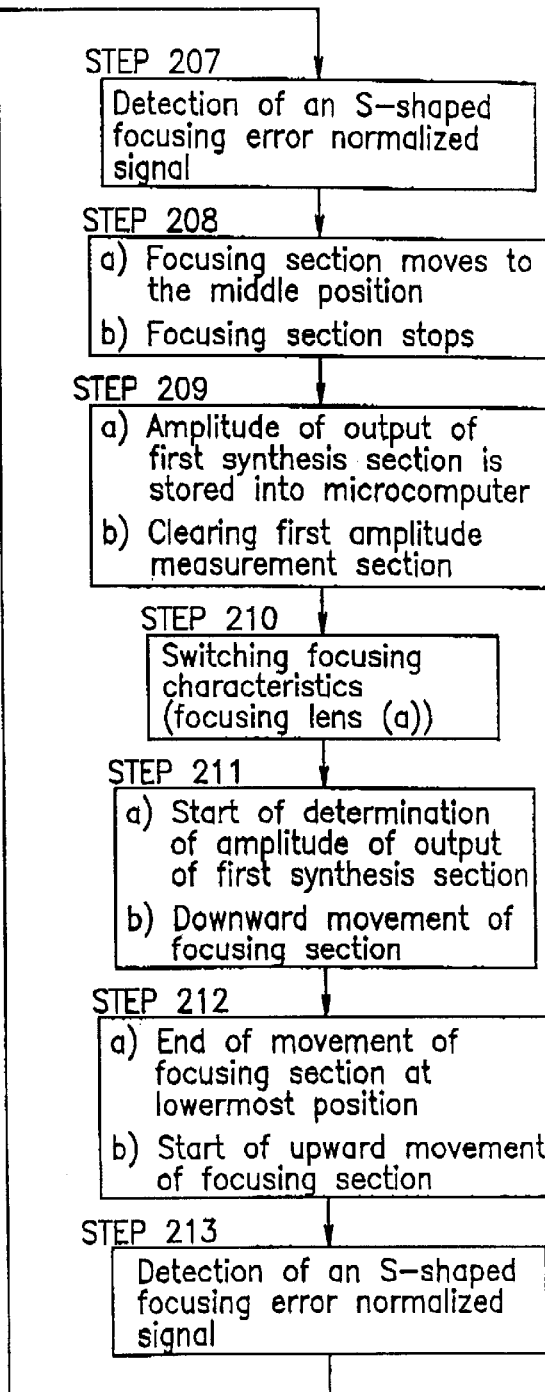
FIG. 11A
To FIG.11B

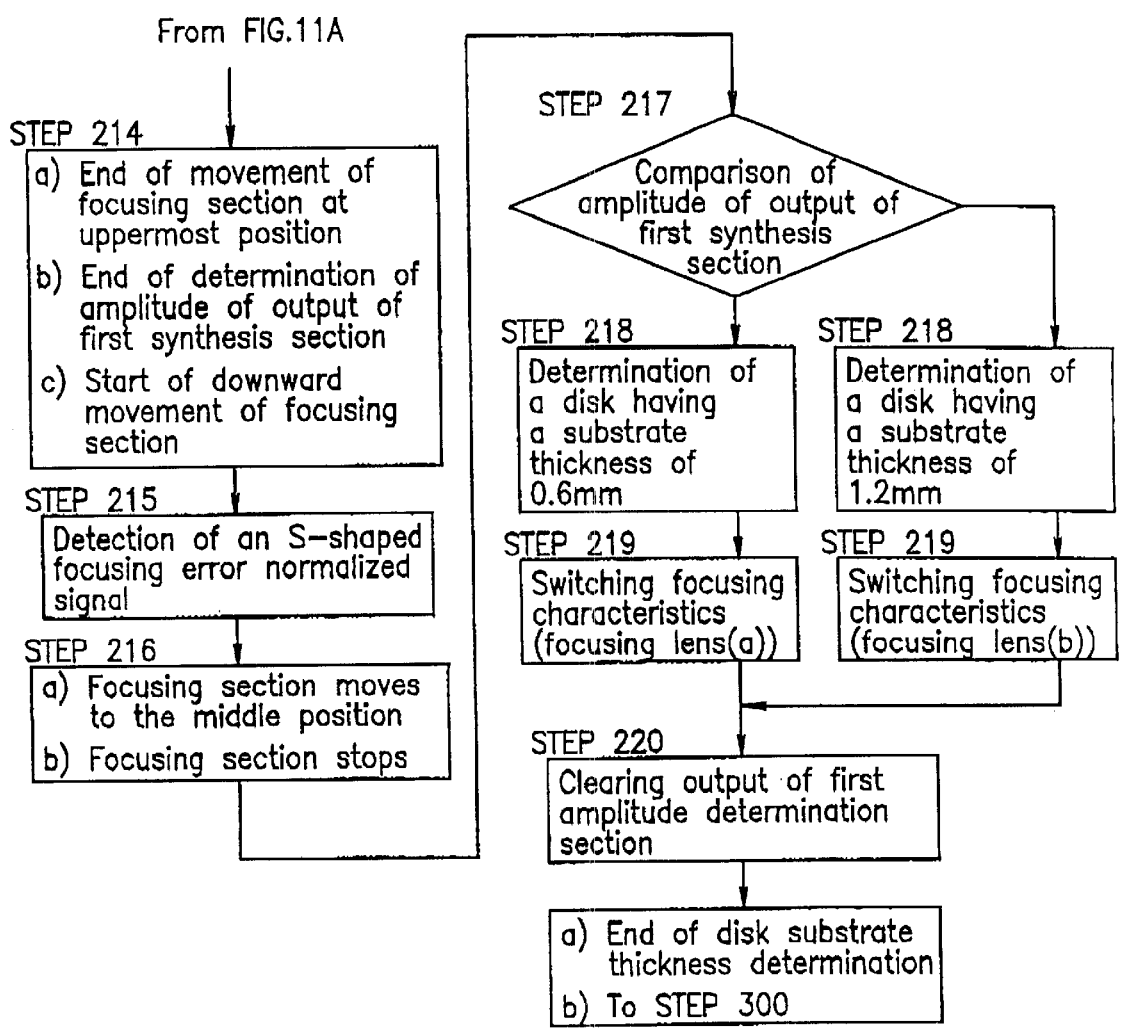

FIG. 33
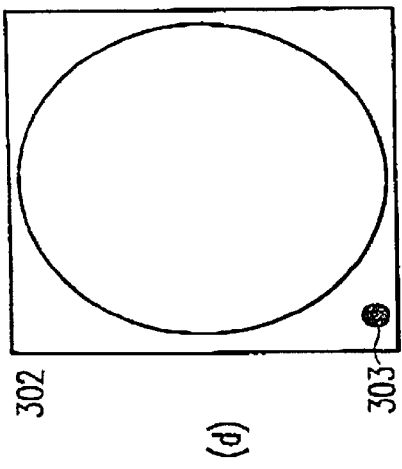
(a)
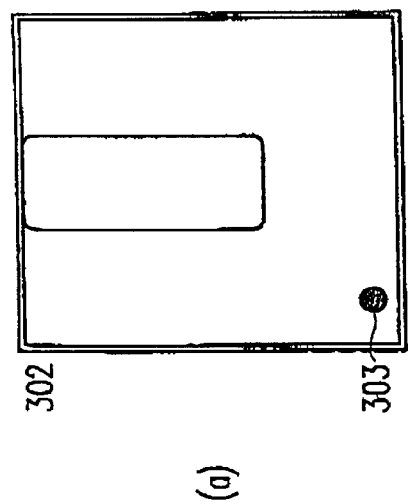
(d)
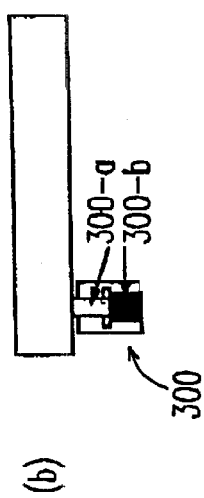
(b)
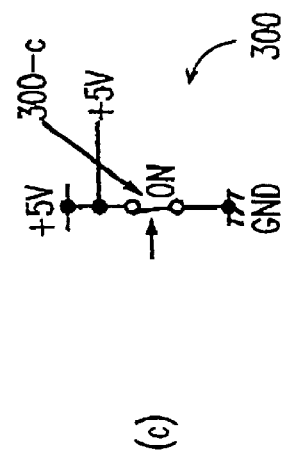
(e)
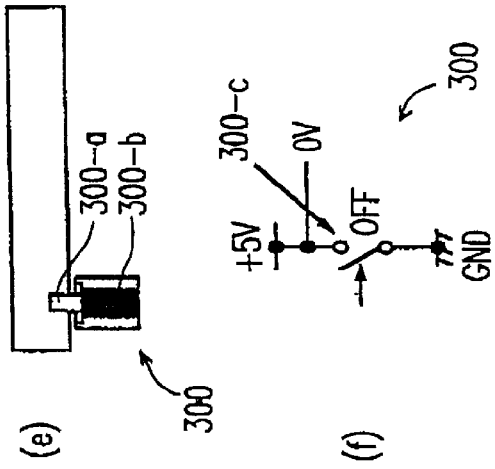
(c)
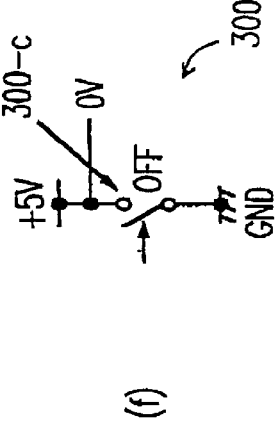
(f)

DISK TYPE DETERMINATION METHOD

TECHNICAL FIELD

The present invention relates to a method for use in an apparatus for recording and reproducing a reproduction-only optical disk and a recording/reproducing optical disk.

BACKGROUND ART

An apparatus for recording and reproducing information onto/from a disk, such as, typically, DVD-RAM driving apparatuses, needs to be compatible with a plurality of types of disks having different substrate thicknesses, track patches or recording densities, and the like. Accordingly, the apparatus should determine the type of a disk loaded in the recording/reproducing apparatus and transition to a state of the apparatus suitable for the disk.

To determine the type of a disk, the control circuit or the signal processing circuit is operated in an approximate manner to reproduce an address signal recorded on the disk, or to search a region called table of Contents (TOC) or a region called control track into which information on the number of signal recording surfaces, pit density, track pitch, or the like is recorded for reproduction of the information therein. U.S. Pat. No. 5,587,981 discloses such a method for determining the type of a disk.

However, there is a problem in that conventional recording/reproducing apparatuses cannot always reproduce information recorded on the loaded disk. There is also a problem in that it takes a long time to determine the type of the loaded disk.

In view of the above-described problems, an object of the present invention is to provide a method for determining the types of a plurality of disks, whereby a single apparatus can record and reproduce disks compliant with different standards.

DISCLOSURE OF THE INVENTION

A method according to the present invention for determining the type of a disk, includes a first step of determining a substrate thickness of the disk based on a focusing error signal representing a positional deviation of the focal point of a light beam from a recording surface of the disk, when a focusing section for bringing the light beam into a focus on the disk is moved in such a way as to approach or withdraw from the recording surface of the disk; a second step of determining the number of recording surfaces of the disk when the focusing section is moved in such a way as to approach or withdraw from the recording surface of the disk and a third step of determining whether or not the disk can be recorded and reproduced using a tracking error signal representing a positional deviation of the focal point of a light beam from a track of the disk, when the light beam crosses the track, wherein at least one of the second step and the third step is performed after the first step is performed, thereby attaining the above-described object.

The focusing section may include a plurality of focusing characteristics; and in the first step, the substrate thickness of the disk may be determined based on the focusing error signal when the focusing section is moved in such a way as to approach or withdraw from the recording surface of the disk while the focusing characteristics of the focusing section are switched.

The focusing section may include a plurality of objective lenses having different focusing characteristics; and in the first step, the substrate thickness of the disk may be determined based on the focusing error signal when the focusing section is moved in such a way as to approach or withdraw from the recording surface of the disk while the objective lenses are switched.

In the first step, the substrate thickness of the disk may be determined based on the amplitude of the focusing error signal when the focusing section is moved in such a way as to approach or withdraw from the recording surface of the disk.

In the first step, the substrate thickness of the disk may be determined based on a signal obtained by synthesizing the focusing error signal when the focusing section is moved in such a way as to approach or withdraw from the recording surface of the disk with at least part of one of reflected or transmitted light from the disk.

In the first step, the substrate thickness of the disk may be determined based on the amplitude of a signal obtained by synthesizing the focusing error signal when the focusing section is moved in such a way as to approach or withdraw from the recording surface of the disk with at least part of one of reflected or transmitted light from the disk.

In the second step, the substrate thickness of the disk may be determined based on the number of detections of a predetermined waveform in the focusing error signal when the focusing section is moved in such a way as to approach or withdraw from the recording surface of the disk.

In the second step, the substrate thickness of the disk may be determined based on the number of detections of in-focus positions in the focusing error signal when the focusing section is moved in such a way as to approach or withdraw from the recording surface of the disk.

In the second step, the substrate thickness of the disk may be determined based on the number of detections of a change from an intermediate value to a bottom value and a change from the bottom value to the intermediate value of the focusing error signal, in a predetermined order, when the focusing section is moved in such a way as to approach or withdraw from the recording surface of the disk.

A change from an intermediate value to a peak value of the focusing error signal may be detected by comparing the focusing error signal with a first reference value; a change from the peak value to the intermediate value of the focusing error signal may be detected by comparing the focusing error signal with a second reference value; the first reference value may be defined to be larger than the intermediate value of the focusing error signal; and the second reference value may be defined to be smaller than the intermediate value of the focusing error signal.

The second step may include the steps of: determining one of a first internal state or a second internal state based on a position, on which the light beam is brought into a focus, when the focusing section is moved in such a way as to approach or withdraw from the recording surface of the disk; and calculating by adding or subtracting a predetermined value based on the determined internal state and the focusing error signal, wherein the internal state determining step and the calculating step may be repeated in at least a part of an interval where the focusing section is moved in such a way as to approach or withdraw from the recording surface of the disk; and the number of recording surfaces of the disk is determined based on the result of the calculation.

The first internal state may be where the focal point of the light beam is in focus; and the second internal state may be where the focal point of the light beam is out of focus.

The focusing position of the light beam may be detected based on an order in which the focusing error signal transitions at least one of a first reference value, a second reference value, a third reference value, and a fourth reference value when the focusing section is moved in such a way as to approach or withdraw from the recording surface of the disk.

The focusing section may be moved in such a way as to approach or withdraw from the recording surface of the disk, the internal state determining step determines that the internal state transitions to the first or second state in the case of detecting any one of transition from the first reference value to the second reference value or transition from the fourth reference value to the third reference value.

In the calculating step: the predetermined value may be added when the focusing error signal transitions from the fourth reference value to the third reference value, in the second internal state; the predetermined value may be added when the focusing error signal transitions from the first reference value to the second reference value, in the first internal state; the predetermined value may be subtracted when the focusing error signal transitions from the fourth reference value to the third reference value, in the first internal state; and the predetermined value may be subtracted when the focusing error signal transitions from the first reference value to the second reference value, in the second internal state.

The first reference value may be larger than the second reference value and the third reference value is larger than the fourth reference value; or the first reference value may be smaller than the second reference value and the third reference value is smaller than the fourth reference value.

In the second step, when the focusing section starts moving in such a way as to approach or withdraw from the recording surface of the disk, the position of the focusing section may be away from the recording surface of the disk; and the focusing section may be set in the first or second internal state.

The third step may determine whether or not the disk can be recorded and reproduced based on the tracking error signal when the light beam crosses the track at the time of switching between methods of detecting the tracking error.

The third step may determine whether or not the disk can be recorded and reproduced based on the amplitude of the tracking error signal when the light beam crosses the track.

The third step may determine whether or not the disk can be recorded and reproduced based on a signal obtained by synthesizing the tracking error signal when the light beam crosses the track with at least part of one of reflected or transmitted light from the disk, at the time of switching between methods of detecting the tracking error.

The signal obtained by synthesizing the tracking error signal when the light beam crosses the track with at least part of one of reflected or transmitted light from the disk, may be a signal obtained by dividing the tracking error signal by the at least part of one of reflected or transmitted light from the disk.

Another method according to the present invention for determining the type of a disk, includes a step of detecting a cartridge housing the disk; a first step of determining a substrate thickness of the disk based on a focusing error signal representing a positional deviation of the focal point of a light beam from a recording surface of the disk, when a focusing section for bringing the light beam into a focus on the disk is moved in such a way as to approach or withdraw from the recording surface of the disk; a second step of determining the number of recording surfaces of the disk when the focusing section is moved in such a way as to approach or withdraw from the recording surface of the disk; and a third step of determining whether or not the disk can be recorded and reproduced using a tracking error signal representing a positional deviation of the focal point of a light beam from a track of the disk, when the light beam crosses the track, wherein when the cartridge is not detected, at least one of the second stop and the third step is performed after the first step is performed, thereby attaining the above-described object.

Another disk type determination method according to the present invention, wherein a focusing section for bringing a light beam into a focus on a disk has a plurality of focusing characteristics; it is determined whether or not the disk is loaded on a recording/reproducing apparatus based on an output value of at least part of one of reflected light or transmitted light from the disk when the focusing section is moved in such a way as to approach or withdraw from the recording surface of the disk, while the focusing characteristics of the focusing section are switched, thereby attaining the above-described object.

It may be determined whether or not the disk is loaded on a recording/reproducing apparatus by comparing the at least part of one of reflected light or transmitted light from the disk with a predetermined value, when the focusing section is moved in such a way as to approach or withdraw from the recording surface of the disk while the focusing characteristics of the focusing section are switched.

The focusing section may have a plurality of objective lenses; and it may be determined whether or not the disk is loaded on a recording/reproducing apparatus based on an output value of at least part of one of reflected light or transmitted light from the disk when the focusing section is moved in such a way as to approach or withdraw from the recording surface of the disk, while the objective lenses of the focusing section are switched.

BRIEF DESCRIPTION OF THE DRAWINGS

FIG. 2 is a diagram showing an example of a focusing section 200.

FIG. 5 is a diagram showing a disk type determination method according to Example 1 of the present invention.

FIG. 7 is a diagram showing a time chart of output signals output from the components when the presence or absence of a disk is determined.

FIG. 9 is a diagram showing a time chart of output signals output from the components when the presence or absence of a disk is determined.

FIGS. 11A and 11B are diagram showing the flowchart of a disk substrate thickness determination method.

FIG. 33 is a diagram showing a tray on which a disk housed in a cartridge is loaded.

BEST MODE FOR CARRYING OUT THE INVENTION

Hereinafter, embodiments of the present invention will be described with reference to the drawings.

EXAMPLE 1

Figure 1:
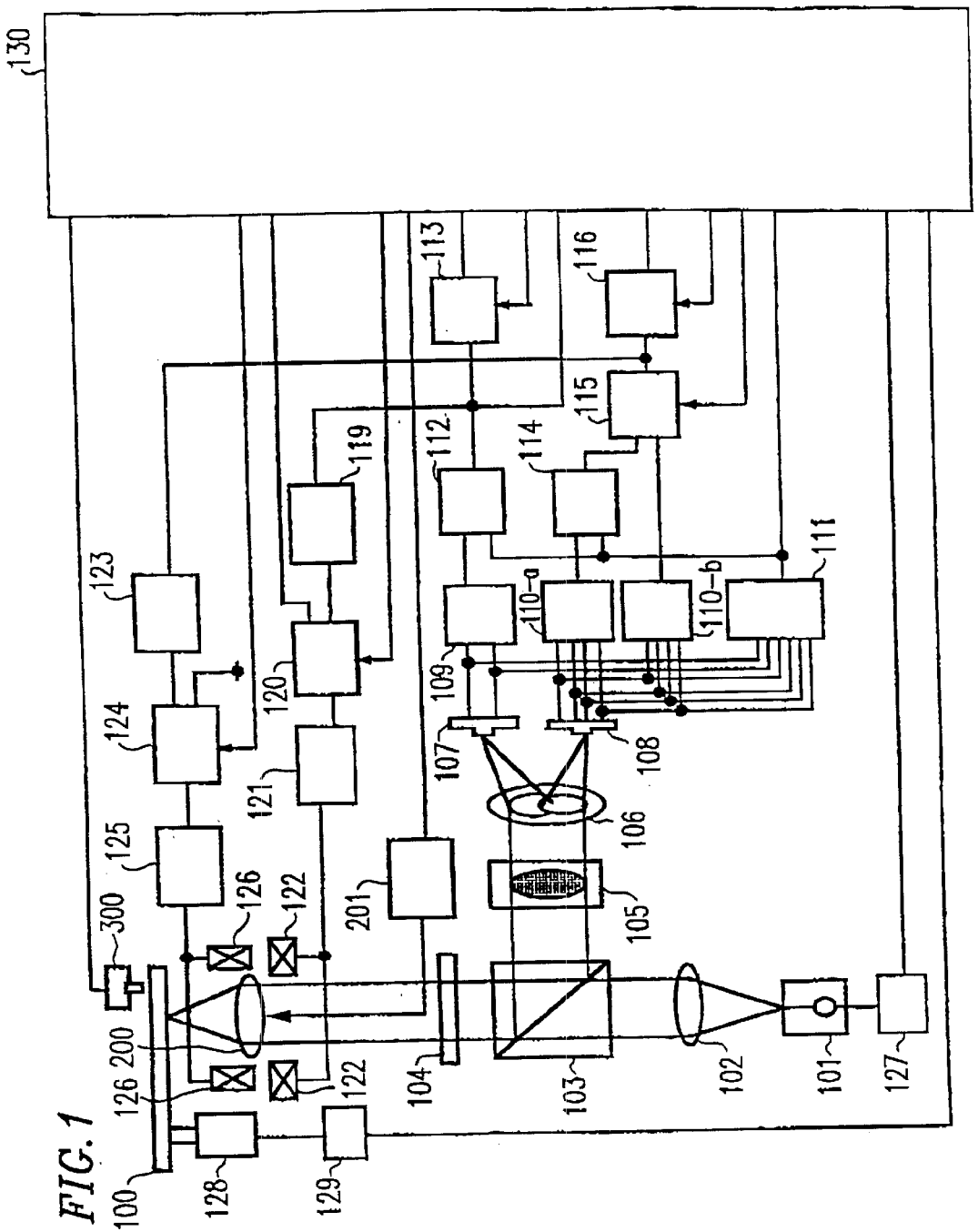
FIG. 1 is a diagram showing a recording/reproducing apparatus according to the present invention.

FIG. 1 is a diagram showing a recording/reproducing apparatus according to the present invention.

An irradiation section 101 is a light source in which light can be emitted from a red semiconductor laser having a wavelength of 650 nm and which can change the power of the light beam. The light beam power of the irradiation section 101 is determined based on an optical power regulation command output from a microcomputer 130. Specifically, an optical power regulation section 127 receives the optical power regulation command output. The optical power regulation section 127 controls the irradiation section 101.

A light beam emitted from the irradiation section 101 (hereinafter referred to as "emitted light") travels through a collimator lens 102 which causes the emitted light to parallel light, a polarization beam splitter 103, and a wavelength plate 104, and is brought into a focus by a focusing section 200, irradiating a disk 100.

The focusing section 200 which brings the emitted light into a focus on the disk 100 switches between two different types of focusing characteristics by means of a focusing characteristic switch section 201 in accordance with a focusing characteristic switching command output from the microcomputer 130.

The focusing characteristic of the focusing section 200 is designed depending on the substrate thickness of the disk 100, so that the focusing characteristic of the focusing section 200 needs to be switched in accordance with the substrate thickness of the disk 100 loaded in the recording/ reproducing apparatus.

FIG. 2 is a diagram showing an example of the focusing section 200.

The focusing section 200 shown in FIG. 2 has two different focusing characteristics. Specifically, the focusing section 200 includes a focusing lens (a) 200-*a* which is designed to bring a light beam into a focus on a thick disk having a substrate thickness of 0.6 mm, and a focusing lens (b) 200-*b* which is designed to bring a light beam into a focus on a thick disk having a substrate thickness of 1.2 mm.

The focusing lens (a) 200-*a* and the focusing lens (b) 200-*b* pivot around a center axis 200-*c*. By this pivoting, the passage of the emitted light is switched between the focusing lenses. In other words, the pivoting causes the focusing characteristics to be switched.

The focusing characteristic switch section 201 outputs a driving output for producing a pivoting movement used to switch between the focusing characteristics of the focusing section 200. The focusing lens (a) 200-*a* and the focusing lens (b) 200-*b* perform the pivoting movement, leading to switch between the focusing characteristics.

FIG. 2 shows a state in which the focusing lens (a) 200-*a* is selected. As shown in FIG. 1, reflected light from the disk 100 passes through the focusing section 200 and the wavelength plate 104, and is reflected by the polarization beam splitter 103 so that the light departs from the light passage of the emitted light, and enters a light detection hologram 105. The reflected light from the disk 100 is diffracted by the light detection hologram 105 to split into (focus detection+ first order) light and (tracking detection–first order) light, both light being introduced into a detection lens 106. The (focus detection+first order) light is condensed by the detection lens 106 to enter a two-way split light detection section 107. The two outputs of the two-way split light detection section 107 are referred to as FO1 and FO2.

The output signals (FO1, FO2) of the two-way split light detection section 107 enter a focusing error detection section 109.

Figure 3A:
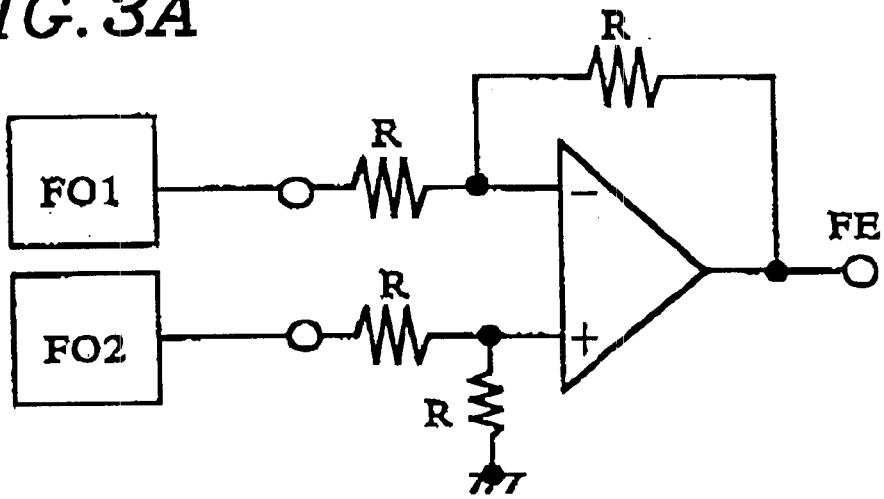
FIG. 3A is a diagram showing a focus error detection section 109.

FIG. 3A is a diagram showing the focusing error detection section 109. The focusing error detection section 109 shown in FIG. 3A is a type of differential amplifier.

The output signals FO1 and FO2 of the two-way split light detection section 107 are input to a non-inverse input terminal and inverse input terminal of the focus error detection section 109, respectively. The focus error detection section 109 calculates the difference between the output signals FO1 and FO2 and outputs the result. The two-way split light detection section 107 is disposed in such a manner that when the amount of positional deviation of the focal point of a light beam from a recording surface of the disk 100 is zero, the reflected light beams condensed by the detection lens 106 equally enter the light detection section split into two portions. The focusing error signal detection section 109 so constructed is based on a focusing error detection method called the Spot Size Detection (SSD) method which is widely known. Any additional description about the focusing error signal detection section 109 is therefore omitted.

Figure 3B:
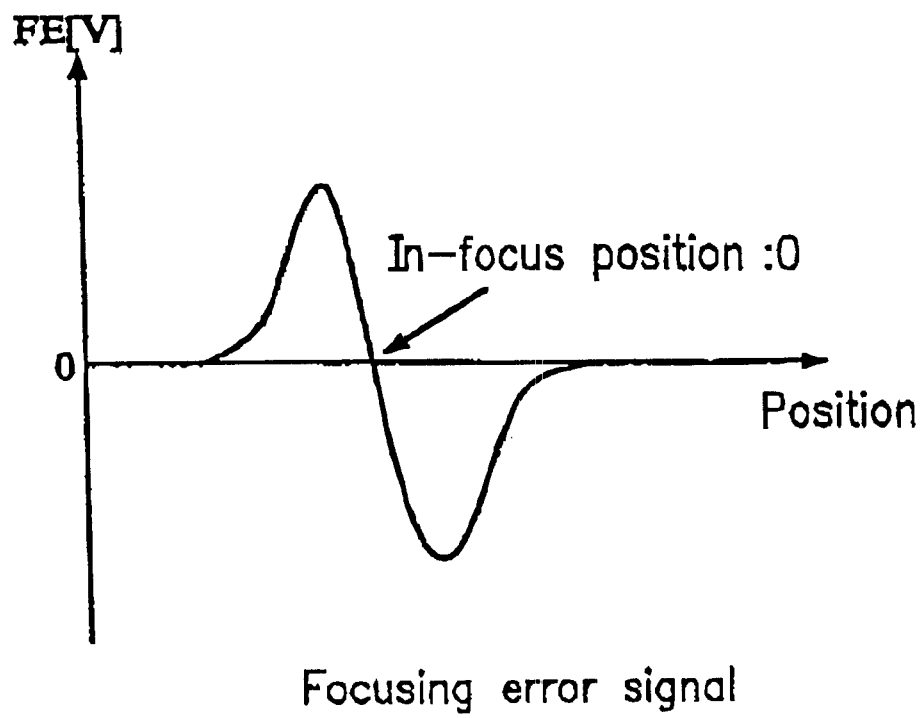
FIG. 3B is a diagram showing the relationship between the amount of positional deviation of the focal point of an emitted light from a recording surface of a disk 100 and a focusing error signal when focusing error detection is performed in accordance with an SSD method.

FIG. 3B is a diagram showing the relationship between the amount of positional deviation of the focal point of an emitted light from a recording surface of the disk 100 and a focusing error signal when focusing error detection is performed in accordance with the SSD method. The relationship has an S-shaped characteristic.

The horizontal axis shown in FIG. 3B represents a position on a recording surface of the disk 100 where 0 indicates an in-focus state in which the focal point of the emitted light is positioned on the recording surface of the disk 100. The point where the in-focus state is zero is referred to as the focal point.

As shown in FIG. 1, the (tracking detection–first order) light condensed by the detection lens 106 enters a four-way split light detection section 108. The output signals from the four-way split light detection section 108 are referred to as TR1, TR2, TR3, and TR4.

The output signals (TR1, TR2, TR3, and TR4) of the four-way split light detection section 108 enter a tracking error detection section (a) 110-*a* and a tracking error detection section (b) 110-*b*. A detection method used in the tracking error detection section (a) 110-*a* is a widely known push-pull method. A detection method used in the tracking error detection section (b) 110-*b* is a widely known phase difference detection method. Therefore, any additional description about those methods is omitted.

Note that the push-pull method is used when a disk loaded in the recording/reproducing apparatus is a continuous groove disk such as, typically, a DVD-RAM disk. The phase difference detection method is used when a disk loaded in the recording/reproducing apparatus is a pit recording disk such as, typically, a DVD-ROM disk.

Figure 4:
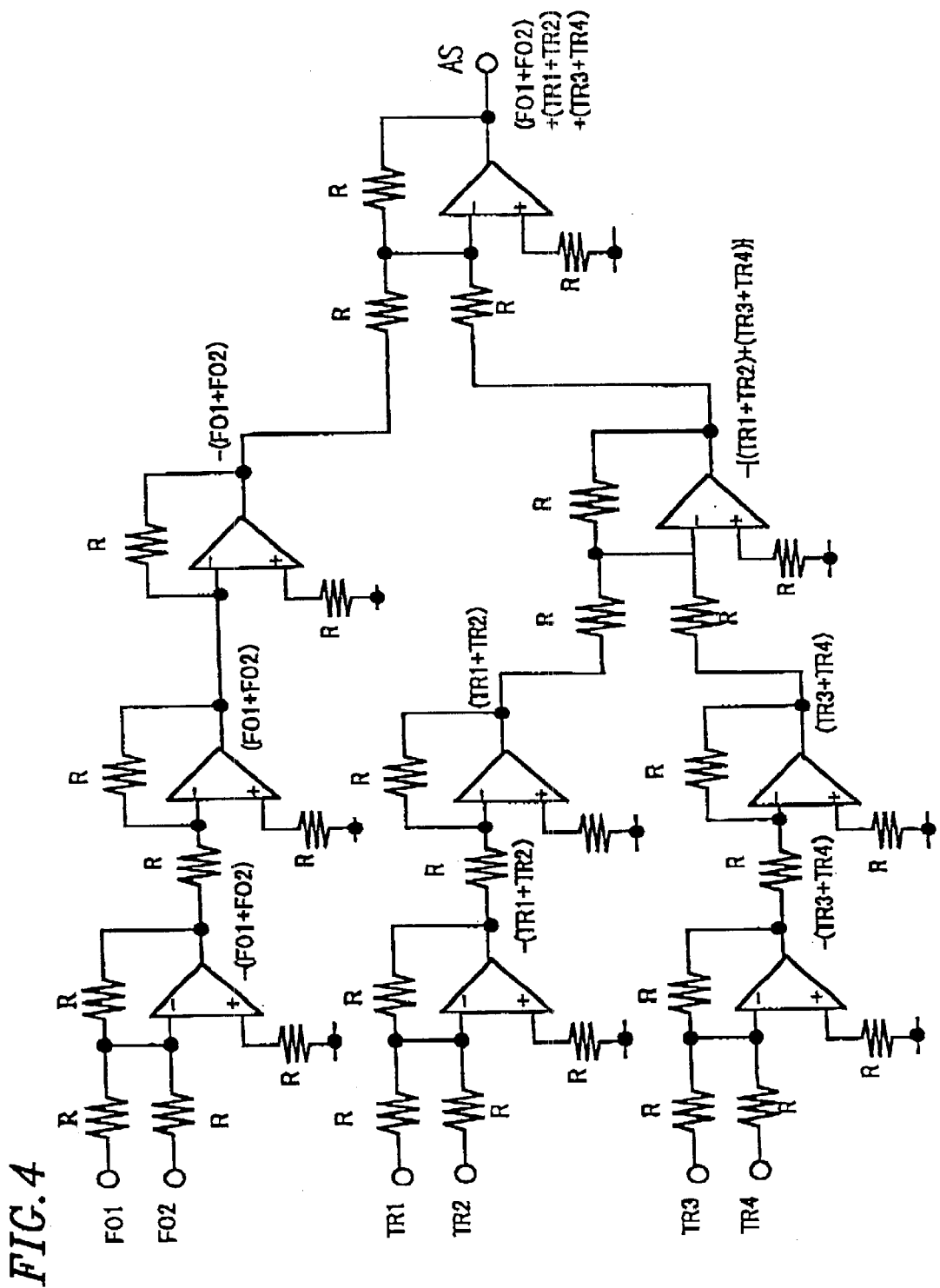
FIG. 4 is a diagram showing an example of a reflected light detection section 111.

The outputs of the two-way light detection section 107 and the four-way light detection section 108 are input to the reflected light detection section 111. FIG. 4 is a diagram showing an example of the reflected light detection section 111.

As shown in FIG. 4, the reflected light detection section 111 detects a total addition signal obtained by adding up the overall output signals output from the two-way light detection section 107 and the four-way light detection section 108. The total addition signal is as follows:

$$AS=(FO1+FO2)+(TR1+TR2+TR3+TR4).$$

The overall addition signal AS detected by the reflected light detection section 111 is output to a first synthesis section 112. In the first synthesis section 112, the output signal of the focusing error detection section 109 is divided by the overall addition signal AS so as to normalize the focus error signal. Further, in the second synthesis section 114, the output signal of the tracking error detection section (a) 110-*a* is divided by the overall addition signal AS so as to normalize the tracking error signal.

Further, a signal for determining whether the disk 100 loaded in the recording/reproducing apparatus has recording and reproducing capabilities is output from a second amplitude measurement section 116 to the microcomputer 130. The reflected light detection section 111 is output to an address read section (not shown) which reads address information previously recorded in the disk 100.

The first synthesis section 112 normalizes an output signal from the focus error detection section 109 using an output signal of the reflected light detection section 111. An output signal of the focus error detection section 109 is output to the focus phase compensation 119.

The focus phase compensation 119 is provided so as to obtain reliable control stability of focusing control in which the positional deviation of the focal point of a light beam from a recording surface of the disk 100.

An output signal of the focus phase compensation 119 and an up/down driving command of the microcomputer 130 are input to a focus driving switch section 120. The focus driving switch section 120 receives a focus drawing command from the microcomputer 130 as a control signal to switch between the output signal of the focus phase compensation 119 and the up/down movement command of the microcomputer 130. The focus driving switch section 120 outputs the switching result to a focus driving circuit 121. The focus driving circuit 121 drives a focus actuator 122.

An output signal of the first synthesis section 112 is output to a first amplitude measurement section 113. The first amplitude measurement section 113 detects the maximum and minimum values in a unit time of a signal obtained by synthesizing a focus error signal in the reflected light detection section 111, and outputs the difference between the maximum and minimum values to the microcomputer 130 as the amplitude value.

An output signal of the first amplitude measurement section 113 is caused to be zero at an arbitrary timing by a clear signal output from the microcomputer 130. Further, an output signal of the first synthesis section 112 is output to the microcomputer 130. The microcomputer 130 determines the number of information recording layers of the disk 100 based on the output signal of the first synthesis section 112. A method for determining the number of information recording layers will be described later.

An output signal (hereinafter referred to as push-pull TE) of the tracking error detection section (a) 110-*a* is output to a second synthesis section 114 in which the output signal is normalized using an output signal of the reflected light detection section 111. An output signal of the second synthesis section 114 and an output signal (hereinafter referred to as phase difference TE) of the tracking error signal detection section (b) 110-*b* are input to a detection method switch section 115. The detection method switch section 115 receives a tracking error detection method switch command output from the microcomputer 130 as a control signal, switches between the output signal of the second synthesis section 114 and the phase difference TE, and outputs the result to the second amplitude measurement section 116.

The second amplitude measurement section 116 detects the maximum and minimum values in a unit time of an output signal of the detection method switch section 115 and determines the difference as an amplitude value. Further, the second amplitude measurement section 116 is designed to cause an output signal thereof to be zero at an arbitrary timing by the clear signal of the microcomputer 130. An output signal of the second amplitude measurement section 116 is output to the microcomputer 130 which in turn determines whether the disk 100 has recording and reproducing capabilities.

An output signal of the detection method switching section 115 is output to a tracking phase compensation 123. The tracking phase compensation 123 is provided so as to obtain reliable control stability of focusing control in which the positional deviation of the focal point of an emitted light from a track. Further, the output signal of the detection method switch section 115 is output to the microcomputer 130 which in turn detects a tracking drawing timing. An output signal of the tracking phase compensation 123 is output to a tracking driving switch section 124. The tracking driving switch section 124 receives the tracking drawing command output from the microcomputer 130 as a control signal and outputs the output of the tracking phase compensation 123 to the tracking driving circuit 125. The tracking driving circuit 125 receives an output signal of the tracking phase compensation 123 and drives a tracking actuator 126.

Further, a cartridge detection section 300 detects whether a loaded disk is housed in a cartridge, and outputs the detection result to the microcomputer 130. A specific description will be described later.

Hereinafter, a disk type determination method according to Example 1 of the present invention will be described with reference to FIG. 5. Specifically, a description is given of sequential operations when a disk is loaded in the recording/reproducing apparatus shown in FIG. 1.

In Example 1, for the sake of simplicity, the types of the disks to be loaded are limited to the following five types: a DVD-RAM disk, a DVD-ROM (a single layer) disk, a DVD-ROM (a dual layer) disk, a Compact Disk (CD), and a PD (a phase-varying disk housed in a cartridge, which has recording and reproducing capabilities).

FIG. 5 is a diagram showing a disk type determination method according to Example 1.

When a disk is loaded into a recording/reproducing apparatus, the microcomputer 130 performs cartridge detection shown in STEP 50. When the microcomputer 130 detects a cartridge housing a disk in the cartridge detection, the microcomputer 130 determines that the loaded disk is a PD. Next, the microcomputer 130 performs disk presence determination shown in STEP 100.

In the disk presence determination, the microcomputer 130 performs substrate thickness determination shown in STEP 200 when it is confirmed that the disk is loaded in the apparatus.

In the substrate thickness determination, when the microcomputer determines the disk substrate thickness is 1.2 mm, the microcomputer 130 determines that the loaded disk is a CD. In the substrate thickness determination, when the disk substrate thickness is determined to be 0.6 mm, recording layer number determination is performed as shown in STEP 300 to determine the number of recording layers of a disk. In the recording layer number determination, when the number of recording layers of a disk is two, the microcomputer 130 determines that the loaded disk is a DVD-ROM (a dual layer) disk.

Thereafter, the microcomputer 130 sets a light beam power and controls irradiation of the light beam and focus drawing. The microcomputer 130 performs RAM/ROM determination shown in STEP 400 using a tracking error signal when the focus control is in operation. The microcomputer 130 determines whether a loaded disk has recording and reproducing capabilities, based on the RAM/ROM determination. When it is determined that the loaded disk has recording and reproducing capabilities, the microcomputer 130 determines that the loaded disk is a DVD-ROM (a single layer). By the above-described steps, the type of a loaded disk can be determined.

Note that the steps shown in FIG. 5 may be performed in an arbitrary order. It should be noted that STEP 300 or STEP 400 is preferably performed after STEP 200. Further, STEP 50 or STEP 100 is preferably performed before STEP 300.

Hereinafter, the description is divided into three parts. The first part is a description about the disk presence determination shown in STEP 100. The second part is a description about the substrate thickness determination shown in STEP 200. The third part is a description about the recording layer number determination shown in STEP 300. The fourth part is a description about the RAM/ROM determination shown in STEP 400. Note that a description about the cartridge detection shown in STEP 50 will be described later.

As the first part, the disk presence determination shown in STEP 100 is described.

A description will be given of the case when a thick disk having a substrate thickness of 0.6 mm such as a DVD-RAM, a DVD-ROM (a single layer), or a DVD-ROM (a dual layer) disk is loaded into a recording/reproducing apparatus, referring to FIGS. 1, 6, and 7A through 7E.

Figure 6A:
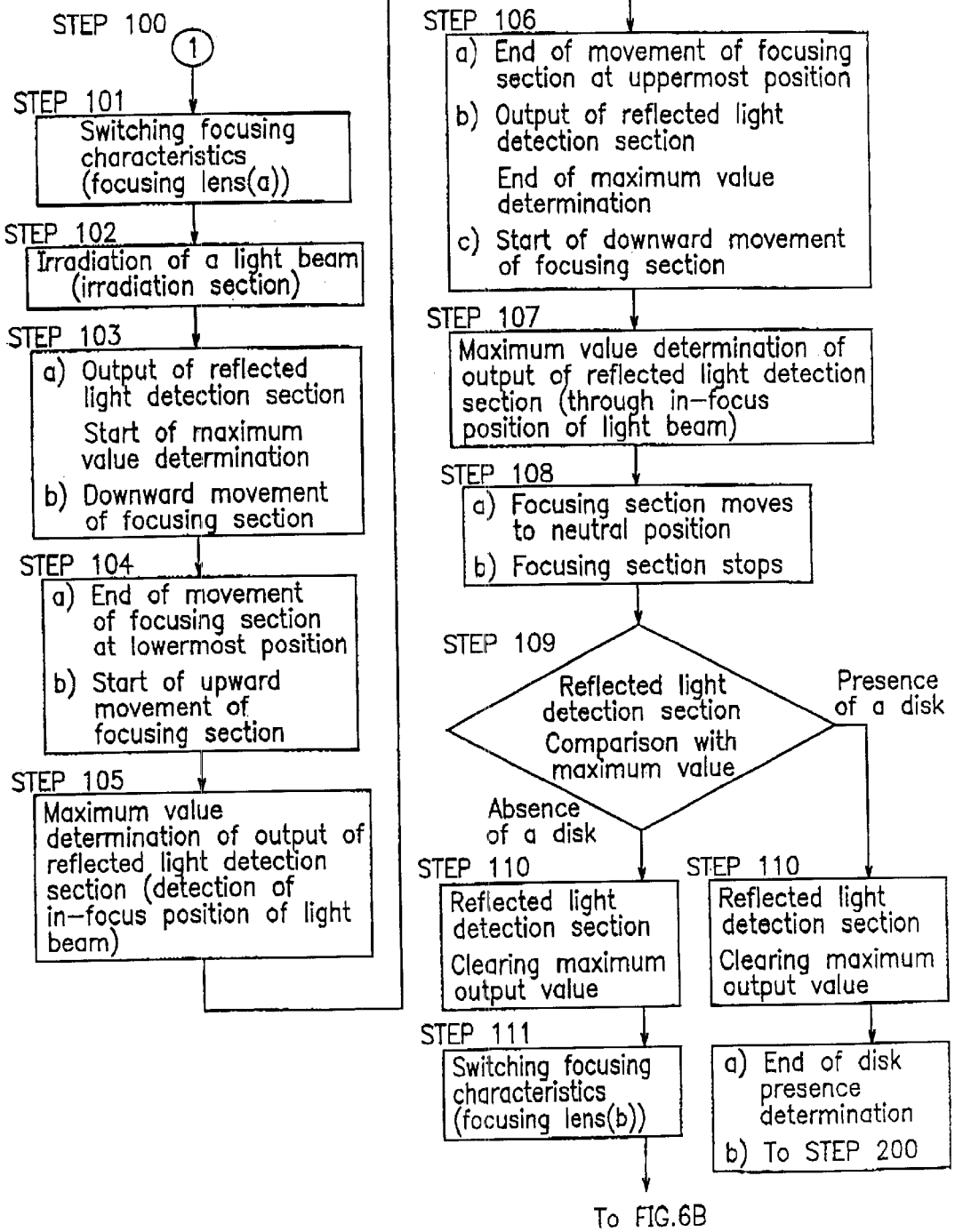
FIGS. 6A and 6B are diagrams showing a flowchart of a disk presence determination method.
Figure 6B:
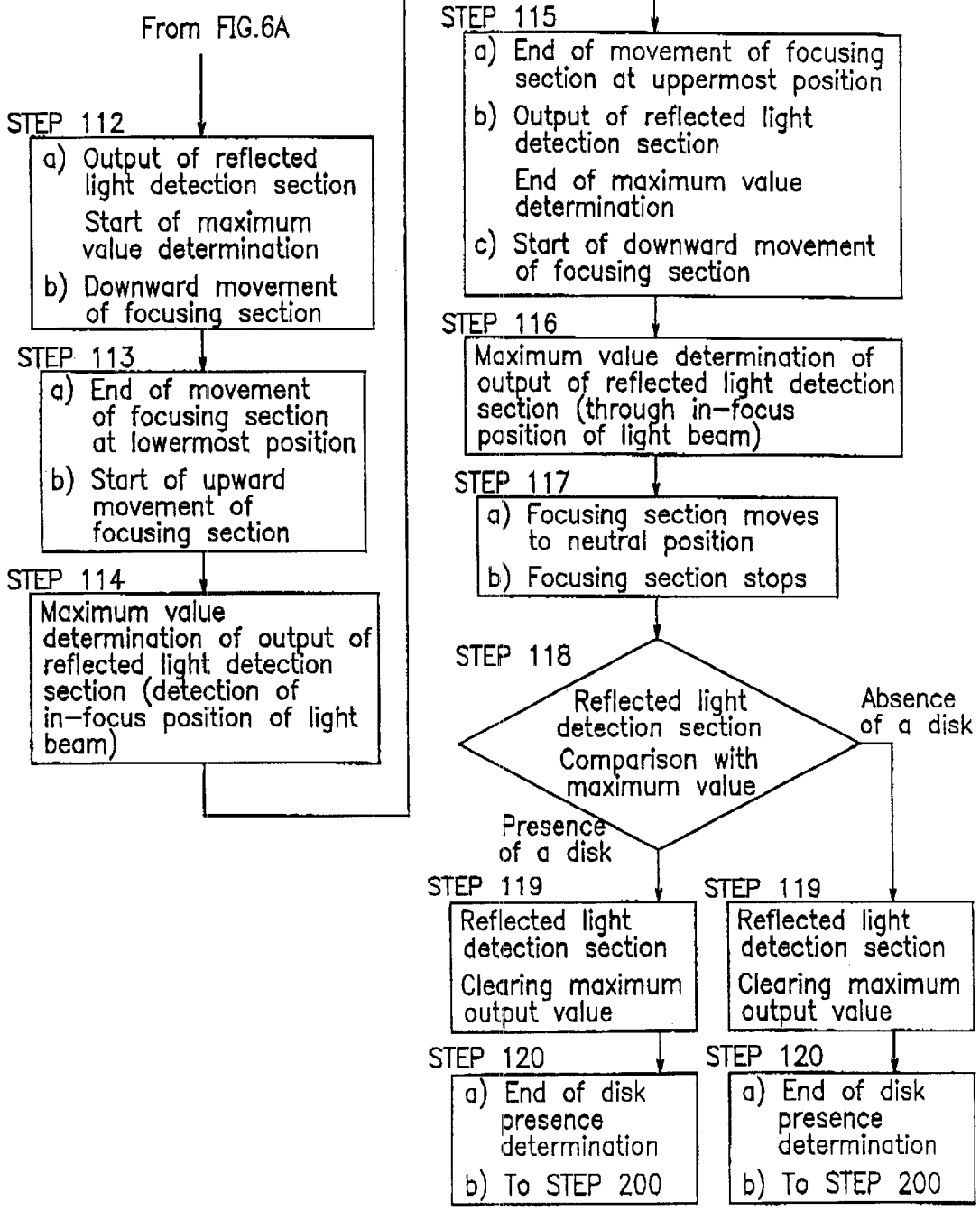

FIGS. 6A and 6B are diagrams showing a flow chart of a disk presence determination method. FIG. 7 is a time chart of output signals output from the components when determining the presence or absence of a disk.

Specifically, FIG. 7(1) is a diagram showing the relationship between a disk motor control command for controlling the number of rotations of a disk motor 128, and time. FIG. 7(2) is a diagram showing the relationship between a focusing characteristic switch command of the microcomputer 130 with respect to a focusing characteristic switch section 201 for switching between focusing lenses (a) 200-*a* and (b) 200-*b*, and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 7(3) is a diagram showing the relationship between an optical power regulation command output from the microcomputer 130 to an optical power regulation section 127 which regulates an optical beam power emitted by the irradiation section 101, and time. FIG. 7(4) is a diagram showing the relationship between the focal point of the emitted light, and time. FIG. 7(5) is a diagram showing the relationship between an output signal of the reflected light detection section 111, and time.

At time t=t101, the microcomputer 130 outputs a focusing characteristic switch command, which switches the focusing characteristic of the focusing section 200 to the focusing lens (b) 200-*b* designed for a disk having a substrate thickness of 1.2 mm, to the focusing characteristic switch section 201. The focusing characteristic switch section 201 switches the focusing characteristic of the focusing section 200 to the focusing lens (b) 200-*b*, in accordance with an output signal from the microcomputer 130 (STEP 101).

At time t=t102, the microcomputer 130 outputs to the optical power regulation section 127 an optical power regulation command for causing the irradiation section 101 to emit a light beam having an optical power of 1.0 mW. The optical power regulation section 127 commands the irradiation section 101 to set the optical power of the light beam to 1.0 mW. Accordingly, the irradiation section 101 emits light having an optical power of 1.0 mW.

At time t=t103, the microcomputer 130 receives the focus drawing command as a control signal and switches an output signal of the focus driving switch section 120 to the up/down movement command of the microcomputer 130. The up/down command of the microcomputer 130 commands that the focusing lens (b) 200-*b* is moved away from a recording surface of a disk. As a result, the focus driving circuit 121 drives the focusing lens (b) 200-*b*. In response to this, the focal point of the emitted light is moved away from an in-focus position P2 on the recording surface of the disk as shown in FIG. 7(4) (STEP 103).

At time t=t104, the microcomputer 130 outputs the up/down movement command so that the focusing lens (b) 200-*b* approaches the recording surface of the disk. In response to this, the focus driving circuit 121 starts driving the focusing lens (b) 200-*b* in such a manner as to cause the focal point of the emitted light to approach the recording surface of the disk (STEP 104).

The focal point of the emitted light continues to approach the disk 100, and eventually passes a position P1, the in-focus position P2, and a position P3 in this order. An output signal of the reflected light detection section 111 outputs to the microcomputer 130 the maximum value X when the focal point of the emitted light is positioned at the in-focus position P2 (STEP 105).

At time t=t105, the focal point of the emitted light reaches the uppermost position where the focal point is closest to the recording surface of the disk. At that point, the microcomputer 130 ends measuring the output of the reflected light detection section 111. Further, the microcomputer 130 outputs the up/down movement command so that the focal point of the emitted light approaches the in-focus position P2. In response to this, the focus driving circuit 121 initiates movement to the focal point of the emitted light to approach the in-focus position P2 on the recording surface of the disk (STEP 106).

The focal point of the emitted light approaches the recording surface of the disk 100, and then passes through the in-focus position P2 and the position P1 in this order from the position P3. In this case, the output signal of the reflected light detection section 111 has the maximum value X when the focal point of the emitted light is positioned at the in-focus position P2. The output signal is output to the microcomputer 130 (STEP 107).

At time t=t106, the focusing lens (b) 200-*b* reaches a middle point of the range in which it can move. At that point, the microcomputer 130 ends the up/down movement command to the focus driving circuit 121. In response to this, the focus driving circuit 121 sets the driving output to the focusing lens (b) 200-*b* to zero. Thus, the focusing lens (b) 200-*b* stops at the neutral point (STEP 108).

At that point, the microcomputer 130 compares the maximum output of the reflected light detection section 111 with a predetermined value. Specifically, the values to be compared with each other are the value X detected when the focal point of the emitted light is positioned at the in-focus position P2 and a comparative value C1 preset in the microcomputer. The focusing lens is designed to bring light into a focus on a thick disk having a substrate thickness of 1.2 mm. This leads to influence of spherical aberration on light when the loaded disk has a substrate thickness of 0.6 mm. Accordingly, the maximum value X of the output of the reflected light detection section 111 is smaller than the comparative value C1 preset by the microcomputer. Therefore, the microcomputer 130 determines that a disk is not loaded in the recording/reproducing apparatus (STEP 109).

Hereinafter, the comparative value C1 preset by the microcomputer 130 will be described.

FIGS. 10A through 10D are diagrams of waveforms showing how an output signal AS output from the reflected light detection section 111 changes depending on the positional relationship between the focal point of the emitted light and the recording surface of a disk.

Figure 10A:
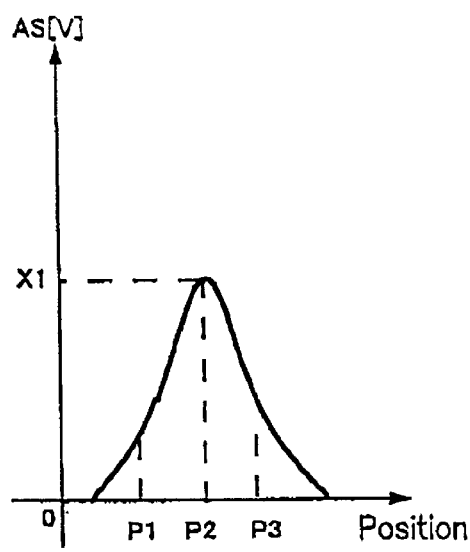
FIG. 10A is a diagram showing an output waveform output from the reflected light detection section 111 with respect to a disk having a substrate thickness of 0.6 mm when the focusing characteristic of the focusing section 200 is designed to bring a light beam into a focus on a thick disk having a substrate thickness of 1.2 mm.

Specifically, FIG. 10A is a diagram of an output waveform output from the reflected light detection section 111 with respect to a disk having a substrate thickness of 0.6 mm when the focusing characteristic of the focusing section 200 is designed so that a light beam is brought into a focus on a thick disk having a substrate thickness of 1.2 mm.

Figure 10B:
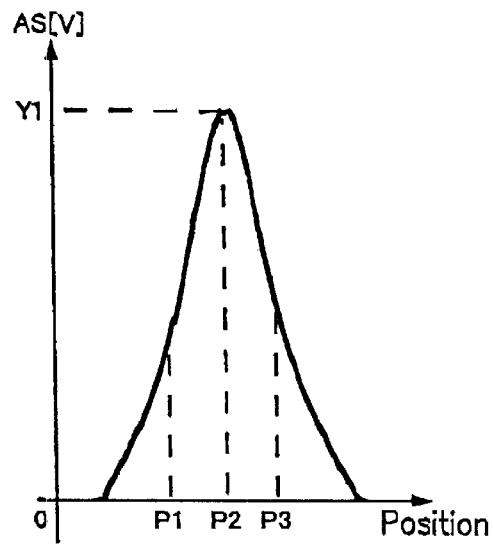
FIG. 10B is a diagram showing an output waveform output from the reflected light detection section 111 with respect to a disk having a substrate thickness of 0.6 mm when the focusing characteristic of the focusing section 200 is designed to bring a light beam into a focus on a thick disk having a substrate thickness of 0.6 mm.

FIG. 10B is a diagram of an output waveform output from the reflected light detection section 111 with respect to a disk having a substrate thickness of 0.6 mm when the focusing characteristic of the focusing section 200 is designed so that a light beam is brought into a focus on a thick disk having a substrate thickness of 0.6 mm.

Figure 10C:
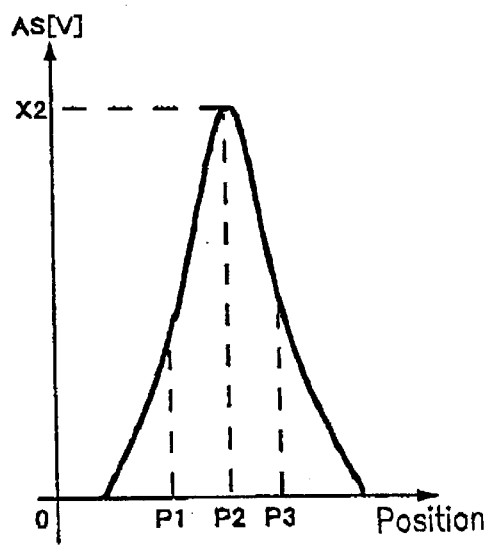
FIG. 10C is a diagram showing an output waveform output from the reflected light detection section 111 with respect to a disk having a substrate thickness of 1.2 mm when the focusing characteristic of the focusing section 200 is designed to bring a light beam into a focus on a thick disk having a substrate thickness of 1.2 mm.

FIG. 10C is a diagram of an output waveform output from the reflected light detection section 111 with respect to a disk having a substrate thickness of 1.2 mm when the focusing characteristic of the focusing section 200 is designed so that a light beam is brought into a focus on a thick disk having a substrate thickness of 1.2 mm.

Figure 10D:
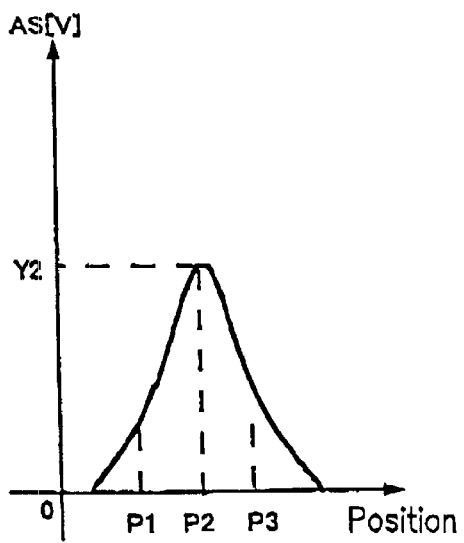
FIG. 10D is a diagram showing an output waveform output from the reflected light detection section 111 with respect to a disk having a substrate thickness of 1.2 mm when the focusing characteristic of the focusing section 200 is designed to bring a light beam into a focus on a thick disk having a substrate thickness of 0.6 mm.

FIG. 10D is a diagram of an output waveform output from the reflected light detection section 111 with respect to a disk having a substrate thickness of 1.2 mm when the focusing characteristic of the focusing section 200 is designed so that a light beam is brought into a focus on a thick disk having a substrate thickness of 0.6 mm.

Note that in FIGS. 10A through 10D, the horizontal axis represents the positional relationship between the focal point of the emitted light and the recording surface of the disk 100. The in-focus position is indicated by P2. The vertical axis represents the magnitude of the output signal of the reflected light detection section 111.

In this example, when the focusing characteristic of the focusing section 200 is designed for a disk having a substrate thickness of 0.6 mm, i.e., when the focusing lens (a) 200-*a* is used, if the thick disk 100 has a substrate thickness of 0.6 mm, the output signal of the reflected light detecting section 111 is equal to the maximum value X2 at the in-focus position (FIG. 10C).

The maximum value of the reflected light detection section 111 is decreased when the disk 100 has a substrate thickness of 1.2 mm, since spherical aberration occurs due to the difference between the focusing lens and the disk substrate thickness. The maximum value is equal to Y2 at the in-focus position P2 (FIG. 10D).

When the focusing characteristics of the focusing section 200 is designed for a thick disk having a substrate thickness of 1.2 mm, i.e., when the focusing lens (b) 200-*b* is used, if the disk 100 has a substrate thickness of 0.6 mm, the output signal of the reflected light detecting section 111 is equal to the maximum value X1, since spherical aberration occurs due to the difference between the focusing lens (b) 200-*b* and the disk substrate thickness. (FIG. 10A).

When the disk 100 has a substrate thickness of 1.2 mm, the output signal of the reflected light detecting section 111 is equal to the maximum value Y1 at the in-focus position P2 (FIG. 10B).

Specifically, the comparative value C1 preset by the microcomputer 130 is designed so as to detect the presence of a disk when the focusing characteristic of the focusing lens fits with the substrate thickness of the disk 100, satisfying the following expressions:

$$Y1 > C1 > X1 > 0 \text{ and } X2 > C1 > Y2 > 0.$$

Here, FIG. 7 will described.

At time t=t107, the maximum value of the measured values of the reflected light detection section 111 is set to zero within the microcomputer 130 (STEP 110).

The microcomputer 130 outputs to the focusing characteristic switch section 201 the focusing characteristic switch command for switching the focusing lens (b) 200-*b* to the focusing lens (a) 200-*a* which is designed for a disk having a substrate thickness of 0.6 mm. The focusing characteristic switch section 201 switches the focusing characteristic to the focusing lens (a) 200-*a* which is designed for a disk having a substrate thickness of 0.6 mm (STEP 111).

At time t=t108, the microcomputer 130 starts measurement of the maximum value of the reflected light detection section 111. The microcomputer 130 outputs the up/down movement command which causes a focusing lens (a) 200-*a* to withdraw from the disk surface. In response to this, the focus driving circuit 121 starts driving the focusing lens (a) 200-*a* so that the focal point of the emitted light withdraws from the in-focus position P2 of the disk surface (STEP 112).

Thereafter, at time t=t109, the microcomputer 130 outputs the up/down movement command which causes the focusing lens (a) 200-*a* to approach the disk surface. In response to this, the focus driving circuit 121 starts driving the focusing lens (a) 200-*a* so that the focal point of the emitted light approaches the in-focus position P2 of the disk surface (STEP 113).

When the focal point of the emitted light continues to approach a disk 100, the focal point of the emitted light passes through the position P1, the in-focus position P2, and the position P3 in this order. In this case, the output signal of the reflected light detection section 111 has the maximum value Y1 when the focal point of the emitted light is positioned at the in-focus position P2 (STEP 114).

At time t=t110, the focal point of the emitted light reaches the uppermost position where it is the closest to the recording surface of the disk 100.

The microcomputer 130 ends the measurement of the maximum output of the reflected light detection section 111. The microcomputer 130 outputs the up/down movement command which causes the focal point of the emitted light to approach the in-focus position P2. The focus driving circuit 121 drives the focusing lens (a) 200-*a*. In response to this, the focal point of the emitted light starts moving in such a way as to approach the in-focus position P2 of the disk surface (STEP 115).

When the focal point of the emitted light continues to approach the disk 100, the focal point of the emitted light eventually passes through the position P3, the in-focus position P2, and the position P1 in this order. In this case, the output signal of the reflected light detection section 111 has the maximum value Y1 when the focal point of the emitted light is positioned at the in-focus position P2 again (STEP 116).

The focusing lens (a) 200-*a* reaches the middle point of the movable range at time t=t111. The microcomputer 130 stops outputting the up/down movement command to the focus driving switch section 120.

The focus driving circuit 121 sets the driving output to the focusing lens (a) 200-*a* to zero via the focus driving switch section 120. Thus, the focusing lens (a) 200-*a* stops at the neutral point (STEP 117).

At that point, the microcomputer 130 compares the maximum output Y1 of the reflected light detection section 111 with the comparative value C1. The maximum value Y1 of the output of the reflected light detection section 111 is larger than the comparative value C1 preset by the microcomputer 130. Therefore, the microcomputer 130 determines that the disk is loaded in the apparatus (STEP 118).

At time t=t112, the microcomputer 130 sets the maximum output Y1 of the reflected light detection section 111 to zero (STEP 119). The microcomputer 130 determines that the disk is loaded in the recording/reproducing apparatus. The microcomputer 130 outputs to a disk motor driving section 129 a disk motor control command to cause a disk motor to rotate at 4000 revolutions per minute. The disk motor section 128 causes the disk motor 128 to rotate at 4000 revolutions per minute in response to the disk motor control command from the microcomputer 130.

A description will be given of the case when a CD having a substrate thickness of 1.2 mm is loaded as a disk in the recording/reproducing apparatus shown in FIG. 1, with reference to FIGS. 1, 6A and 6B, and 8.

Figure 8:
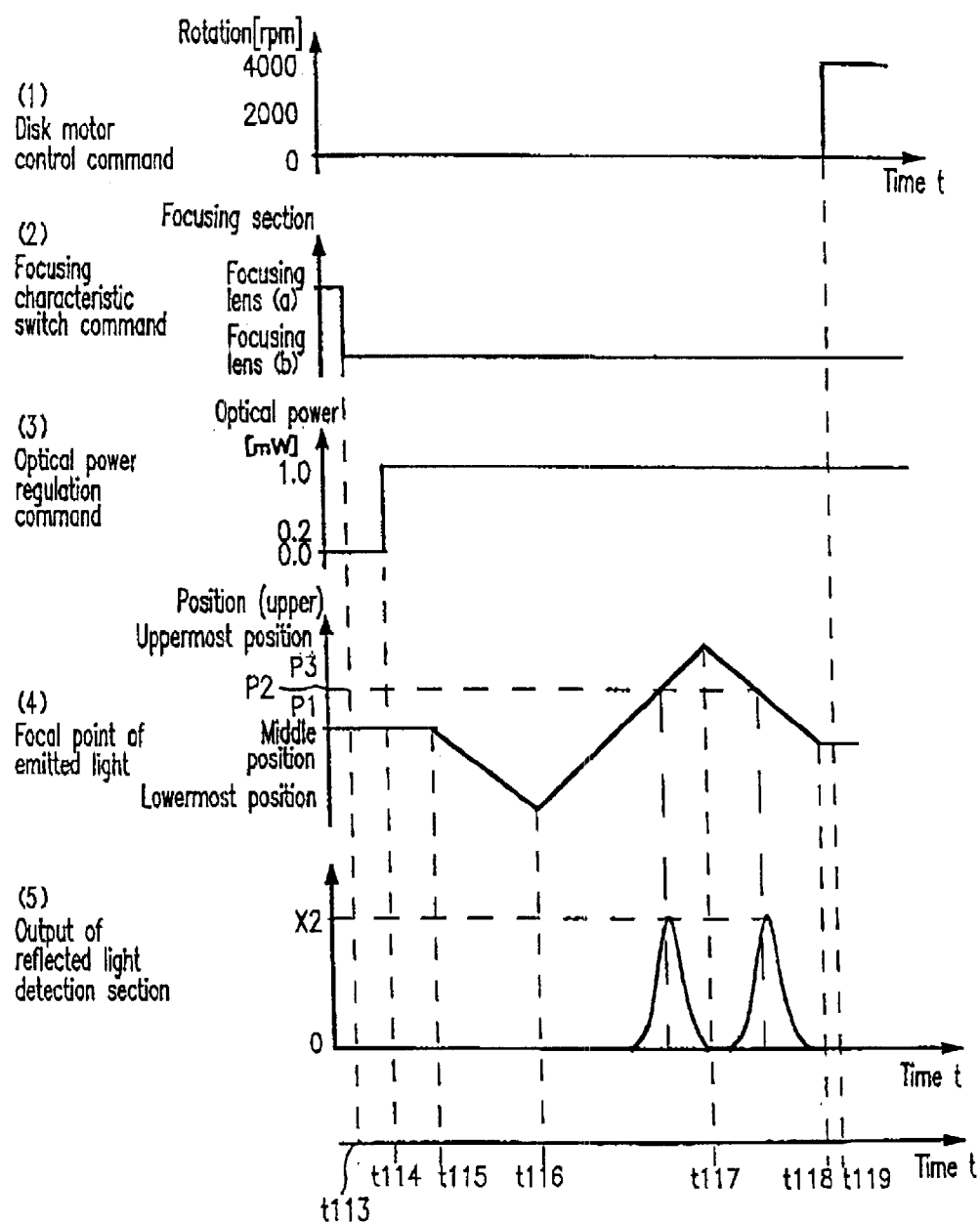
FIG. 8 is a diagram showing a time chart of output signals output from the components when the presence or absence of a disk is determined.

FIGS. 6A and 6B are diagrams showing a flowchart of the disk presence determination method. FIG. 8 is a diagram showing a time chart of output signals output from the components when the presence or absence of a disk is determined.

Specifically, FIG. 8(1) is a diagram showing the relationship between the disk motor control command for controlling the number of rotations of the disk motor 128, and time. FIG. 8(2) is a diagram showing the relationship between a focusing characteristic switch command of the microcomputer 130 with respect to a focusing characteristic switch section 201 for switching the focusing characteristic of the focusing section 200 between focusing lenses (a) 200-*a* and (b) 200-*b,* and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 8(3) is a diagram showing the relationship between an optical power regulation command output from the microcomputer 130 to an optical power regulation section 127 which regulates an optical beam power emitted by the irradiation section 101, and time. FIG. 8(4) is a diagram showing the relationship between the focal point of the emitted light, and time. FIG. 8(5) is a diagram showing the relationship between an output signal of the reflected light detection section 111, and time.

The operations of the apparatus and the waveforms of the output signals of the components during time t=t113 to t115 are similar to those described for time t=t101 to t103, whereby the description is omitted.

At time t=t116, the microcomputer 130 outputs the up/down movement command so that the focusing lens (b) 200-*b* approaches the recording surface of the disk. In response to this, the focus driving circuit 121 starts driving the focusing lens (b) 200-*b* in such a manner as to cause the focal point of the emitted light to approach the recording surface of the disk (STEP 104).

The focal point of the emitted light continues to approach the disk 100, and eventually passes a position P1, the in-focus position P2, and a position P3 in this order. The output signal of the reflected light detection section 111 has the maximum value X2 when the focal point of the emitted light is positioned at the in-focus position P2 (STEP 105).

At time t=t117, the focal point of the emitted light reaches the uppermost position where the focal point is closest to the recording surface of the disk. At that point, the microcomputer 130 ends measuring the maximum value of the output signal of the reflected light detection section 111. Further, the microcomputer 130 outputs the up/down movement command so that the focal point of the emitted light approaches the in-focus position P2. In response to this, the focus driving circuit 121 initiates movement to the focal point of the emitted light to approach the in-focus position P2 on the recording surface of the disk (STEP 106).

The focal point of the emitted light approaches the recording surface of the disk 100, and then passes through the position P3, the in-focus position P2 and the position P1 in this order. In this case, the output signal of the reflected light detection section 111 has the maximum value X2 when the focal point of the emitted light is positioned at the in-focus position P2 (STEP 107).

At time t=t118. the focusing lens (b) 200-*b* reaches a middle point of the range in which it can move. At that point, the microcomputer 130 ends the up/down movement command to the focus driving circuit 121. In response to this, the focus driving circuit 121 sets the driving output to the focusing lens (b) 200-*b* to zero. Thus, the focusing lens (b) 200-*b* stops, at the neutral point (STEP 108).

At that point, the microcomputer 130 compares the maximum value X2 of the output of the reflected light detection section 111 with the comparative value C1. Specifically, the maximum value X2 of the output of the reflected light detection section 111 is larger than the comparative value C1 preset by the microcomputer. Therefore, the microcomputer 130 determines that a disk is loaded in the recording/reproducing apparatus (STEP 109).

At time t=t119, the microcomputer 130 clears the maximum output X2 of the reflected light detection section 111. The microcomputer 130 determines that the disk is loaded in the recording/reproducing apparatus. The microcomputer 130 outputs to the disk motor driving section 129 the disk motor control command to cause a disk motor to rotate at 4000 revolutions per minute. The disk motor section 128 causes the disk motor 128 to rotate at 4000 revolutions per minute in response to the disk motor control command from the microcomputer 130.

A description will be given of the case when no disk is loaded in the recording/reproducing apparatus shown in FIG. 1, with reference to FIGS. 1, 6A and 6B, and 9.

FIGS. 6A and 6B are diagrams showing a flowchart of the disk presence determination method. FIG. 9 is a diagram showing a time chart of output signals output from the components when the presence or absence of a disk is determined.

Specifically, FIG. 9(1) is a diagram showing the relationship between the disk motor control command for controlling the number of rotations of the disk motor 128, and time. FIG. 9(2) is a diagram showing the relationship between a focusing characteristic switch command of the microcomputer 130 with respect to a focusing characteristic switch section 201 for switching the focusing characteristic of the focusing section 200 between focusing lenses (a) 200-*a* and (b) 200-*b,* and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 9(3) is a diagram showing the relationship between an optical power regulation command output from the microcomputer 130 to an optical power regulation section 127 which regulates an optical beam power emitted by the irradiation section 101, and time. FIG. 9(4) is a diagram showing the relationship between the focal point of the emitted light, and time. FIG. 9(5) is a diagram showing the relationship between an output signal of the reflected light detection section 111, and time.

The disk motor control command, the focusing characteristic switch command, the optical power regulation command, and the focal point of the emitted light are similar to those described for time t=t101 to t111, whereby the description is omitted.

However, the maximum values of the outputs of the reflected light detection section 111 detected in STEPs 105, 107, 114 and 116 are zero because no disk is loaded in the recording/reproducing apparatus. Therefore, the maximum value of the output of the reflected light detection section 111 is smaller than the comparative value C1. The microcomputer 130 determines that no disk is loaded in the recording/reproducing apparatus (STEP 118).

Therefore, at time t=t131, the microcomputer 130 sets the maximum value of the output of the internal reflected light detection section 111 to zero (STEP 119), and determines that no disk is loaded in the recording/reproducing apparatus. The microcomputer 130 outputs to the optical power regulation section 127 the optical power regulation command for stopping the light beam emission by the irradiation section 101. The optical power regulation section 127 sets the power to 0.0 W. In other words, the optical power regulation section 127 causes the irradiation section 101 to stop the light beam emission.

In FIGS. 6A and 6B, the microcomputer 130 measures the maximum values of outputs of the reflected light detection section in STEPs 103 to 106 and STEPs 112 to 115.

The relationship among the comparative value C1 and Y1, YZ, X1, and X2 shown in FIGS. 10A to 10D satisfies:

$$Y1>C1>X1>0 \text{ and } X2>C1>Y2>0.$$

This leads to achievement of the same effects as described above.

Hereinafter, the second part, i.e., determination of substrate thickness, will be described.

In this part, for the sake of simplicity, the types of disks to be loaded in the recording/reproducing apparatus shown in FIG. 1 are limited to the following four types: a DVD-ROM disk (a single layer) disk, a DVD-ROM (a dual layer) disk and a DVD-RAM each having a substrate thickness of 0.6 mm, and a Compact Disk (CD) having a substrate thickness of 1.2 mm. Note that when the disk loaded in the recording/reproducing apparatus is a PD, the disk type is determined in STEP 50.

The operation of the recording/reproducing apparatus shown in FIG. 1 when the DVD-ROM disk (a single layer) disk, the DVD-ROM (a dual layer) disk and the DVD-RAM each having a substrate thickness of 0.6 mm will be described with reference to FIGS. 1, 11A and 11B, and 12.

Figure 12:
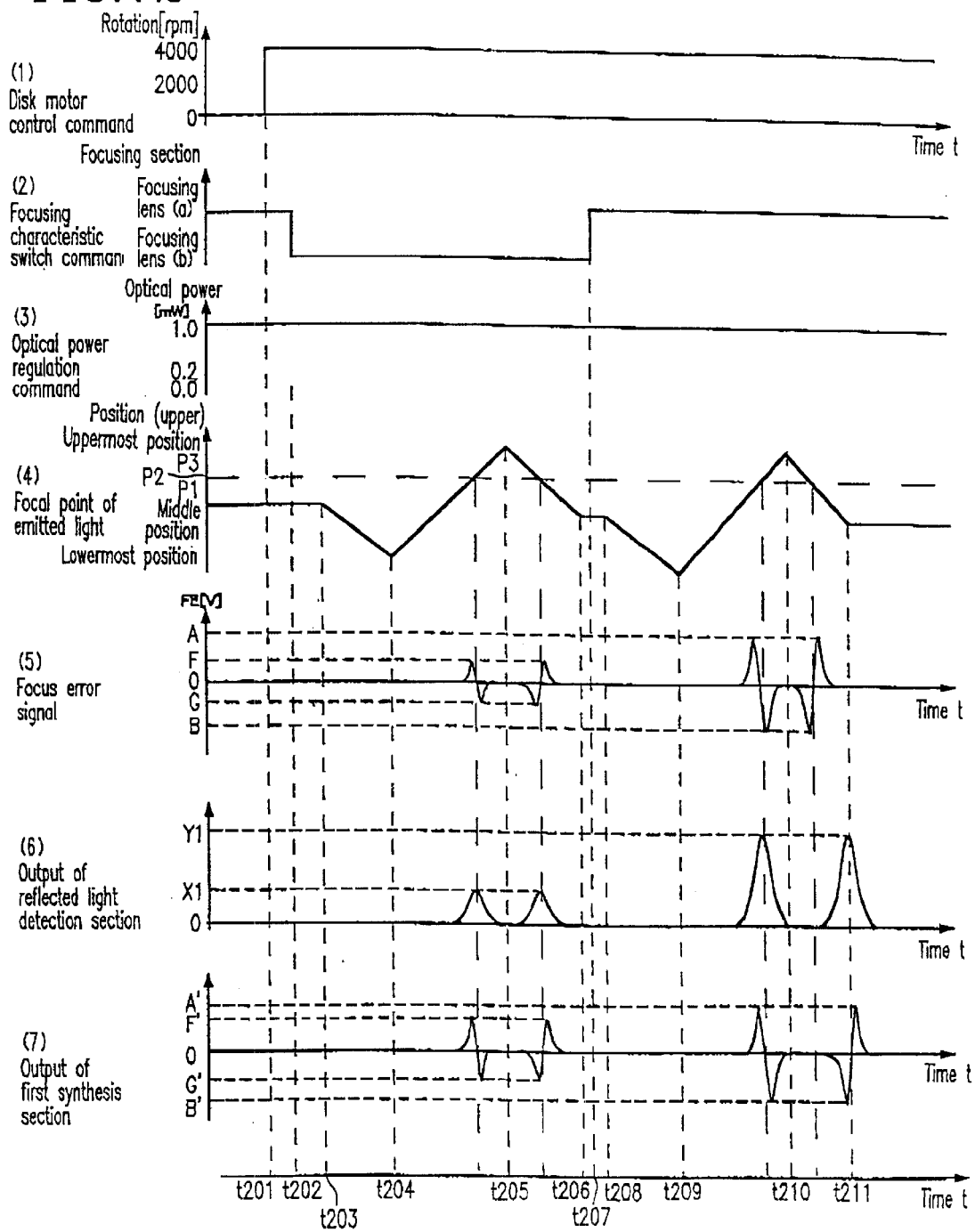
FIG. 12 is a diagram showing a time chart of output signals output from the components when the substrate thickness of a disk is determined.

FIGS. 11A and 11B are diagrams showing a flow chart of the disk substrate thickness determination method. FIG. 12 is a diagram showing a time chart of output signals output from the components when the substrate thickness of a disk is determined.

Specifically, FIG. 12(1) is a diagram showing the relationship between the disk motor control command output to the disk motor driving section 129, and time. FIG. 12(2) is a diagram showing the relationship between a focusing characteristic switch command of the microcomputer 130 with respect to a focusing characteristic switch section 201 for switching the focusing characteristic of the focusing section 200 between focusing lenses (a) 200-*a* and (b) 200-*b*, and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 12(3) is a diagram showing the relationship between an optical power regulation command output from the microcomputer 130 to an optical power regulation section 127 which regulates an optical beam power emitted by the irradiation section 101, and time. FIG. 12(4) is a diagram showing the relationship between the focal point of the emitted light, and time. FIG. 12(5) is a diagram showing the relationship between an output signal of the focusing error detection section 109, and time. FIG. 12(6) is a diagram showing the relationship between an output signal of the reflected light detection section 111, and time. FIG. 12(7) is a diagram showing the relationship between an output signal of the first synthesis section 112, and time.

At time t=t201. the microcomputer 130 outputs to the disk motor driving section 129 a disk motor control command to cause a disk motor 128 to rotate at 4000 revolutions per minute (STEP 201). The disk motor 128 causes the disk 100 to rotate at 4000 revolutions per minute in response to the disk motor control command.

At time t=t202, the microcomputer 130 outputs to the focusing characteristic switch section 201 the focusing characteristic switch command for switching to the focusing lens (b) 200-*b* which is designed for a disk having a substrate thickness of 1.2 mm. The focusing characteristic switch section 201 switches the focusing characteristic of to the focusing lens (b) 200-*b* which is designed for a disk having a substrate thickness of 1.2 mm (STEP 202).

At time t=t203, the microcomputer 130 outputs the up/down movement command, which causes a focusing lens (b) 200-*b* to withdraw from the disk surface, to the focus driving circuit 121 via the focus driving switch section 120. In response to this, the focus driving circuit 121 starts driving the focusing lens (b) 200-*b* so that the focal point of the emitted light withdraws from the in-focus position P2 of the disk surface, as shown in FIG. 12(4) (STEP 203).

At time t=t204, the microcomputer 130 outputs the up/down movement command, which causes the focusing lens (b) 200-*b* to approach the disk surface, to the focus driving circuit 121 via the focus driving switch section 120. In response to this, the focus driving circuit 121 starts driving the focusing lens (b) 200-*b* so that the focal point of the emitted light approaches the disk surface (STEP 204). The focal point of the emitted light continues to approach a disk 100. Eventually, the focal point of the emitted light passes through the position P1, the in-focus position P2, and the position P3 in this order. In this case, the focusing error detection section 109 detects an S-shaped focusing error signal as shown in FIG. 12(5).

The output signal of the reflected light detection section 111 has the maximum value X1 when the focal point of the emitted light is positioned at the in-focus position P2 as shown in FIG. 12(6). A focusing error normalized signal output from the first synthesis section 112 is S-shaped as shown in FIG. 12(7). The S-shaped focusing error normalized signal is output to the first amplitude measurement section 113 (STEP 205).

The first amplitude measurement section 113 detects the maximum value F' and the minimum value G', and determines the difference, (F'-G'), as the amplitude of the S-shaped focusing error normalized signal, which is output to the microcomputer 130.

At time t=t205, the focal point of the emitted light reaches the uppermost position, when the first amplitude measurement section 113 ends measuring the amplitude of the output signal of the first synthesis section 112. The microcomputer 130 outputs the up/down movement command, which causes the focal point of the emitted light to approach the in-focus position P2, to the focus driving section 121 via the focus driving switch circuit 120. In response to this, the focus driving circuit 121 starts driving the focusing lens (b) 200-*b* in such a way as to approach the in-focus position P2 of the disk surface (STEP 206).

The focal point of the emitted light continues to approach the disk 100, and eventually passes through the position P3, the in-focus position P2 and the position P1 in this order.

In this case, the output signal of the first synthesis section 112 is S-shaped as shown in FIG. 12(7). That is, the S-shaped focusing error normalized signal is detected (STEP 207).

At time t=t206, the focusing lens (b) 200-*b* reaches a middle point of the range in which it can move. At that point, the microcomputer 130 ends the up/down movement command to the focus driving circuit 121, via the focusing driving switch section 120. The focus driving circuit 121 sets the driving output to the focusing lens (b) 200-*b* to zero. Thus, the focusing lens (b) 200-*b* stops at the neutral point (STEP 208).

The microcomputer 130 holds the output value of the first amplitude measurement section 113 at that point. The value held therein is (F'–G'). Thereafter the microcomputer 130 sets the output signal output from the first amplitude measurement section 113 to zero in accordance with a clear signal (STEP 209).

At time t=t2O7, the microcomputer 130 outputs to the focusing characteristic switch section 201 the focusing characteristic switch command for switching the focusing characteristic of the focusing lens (b) 200-*b* to the focusing lens (a) 200-*a* which is designed for a thick disk having a substrate thickness of 0.6 mm. The focusing characteristic switch section 201 switches the focusing characteristic of the focusing lens (b) 200-*b* to the focusing lens (a) 200-*a* which is designed for a thick disk having a substrate thickness of 0.6 mm (STEP 210).

At time t=t208, the first amplitude measurement section 113 resumes the amplitude measurement of the output signal of the first synthesis section 112. The microcomputer 130 outputs the up/down movement command, which causes a focusing lens (a) 200-*a* to withdraw from the disk surface, to the focus driving circuit 121 via the focus driving switch section 120. In response to this, the focus driving circuit 121 starts driving the focusing lens (a) 200-*a* so that the focal point of the emitted light withdraws from the in-focus position P2 of the disk surface, as shown in FIG. 12(4) (STEP 211).

At time t=t209, the microcomputer 130 outputs the up/down movement command, which causes the focusing lens (a) 200-*a* to approach the disk surface, to the focus driving circuit 121 via the focus driving switch section 120. In response to this, the focus driving circuit 121 starts driving the focusing lens (a) 200-*a* so that the focal point of the emitted light approaches the in-focus position P2 of the disk surface (STEP 212).

The focal point of the emitted light continues to approach the disk 100, and eventually passes through the position P1, the in-focus position P2, and the position P3 in this order.

In this case, the output signal of the focusing error signal detection section 109 is S-shaped as shown in FIG. 12(5). The focusing error signal detection section 109 detects the S-shaped focusing error signal. The output signal of the reflected light detection section 111 is a signal as shown in FIG. 12(6), which has the maximum value Y1 when the focal point of the emitted light is positioned at the in-focus position P2. The S-shaped focusing error normalized signal is S-shaped as shown in FIG. 12(7). The focusing error normalized signal is output to the first amplitude measurement section 113. The first amplitude measurement section 113 detects the maximum value A' and the minimum value B', and determines the difference, (A'–B'), as the amplitude of the S-shaped focusing error normalized signal, which is output to the microcomputer 130 (STEP 213).

At time t=t210, the focal point of the emitted light reaches the uppermost position. The first amplitude measurement section 113 ends measuring the amplitude of the output signal of the first synthesis section 112. The microcomputer 130 outputs the up/down movement command, which causes the focal point of the emitted light to approach the in-focus position P2, to the focus driving section 121 via the focus driving switch circuit 120. In response to this, the focus driving circuit 121 starts driving the focusing lens (a) 200-*a* in such a way as to approach the in-focus position P2 of the disk surface (STEP 214).

The focal point of the emitted light continues to approach the disk 100, and eventually passes through the position P3, the in-focus position P2 and the position P1 in this order.

In this case, the first synthesis section 112 generates the S-shaped focusing error normalized signal again (STEP 215).

At time t=t211, the focusing lens (a) 200-*a* reaches a middle point of the range in which it can move. At that point, the microcomputer 130 ends the up/down movement command to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 216).

Hereinafter, the disk substrate thickness determination method by the microcomputer 130 will be described with reference to FIG. 14.

Figure 14:
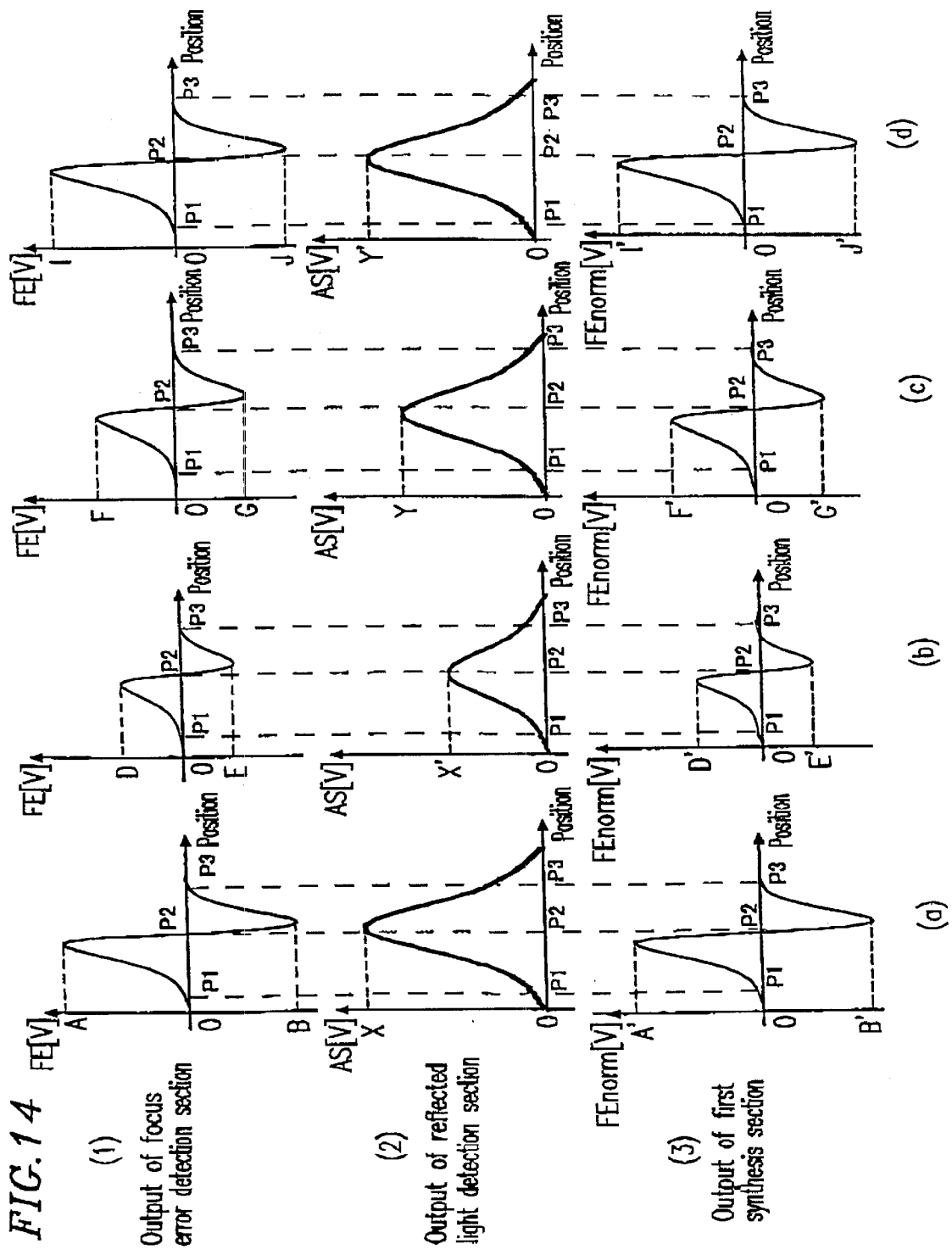
FIG. 14 is a diagram showing how a focusing error signal waveform detected by the above-described focusing error signal detection section 109, an output waveform of the reflected light detection section 111, and a focusing error signal normalized waveform of a first synthesis section 112 are changed due to the focusing characteristic of the focusing section 200 and the disk substrate thickness.

FIG. 14 is a diagram showing how a focusing error signal waveform detected by the above-described focusing error signal detection section 109, an output waveform of the reflected light detection section 111, and a focusing error signal normalized waveform of the first synthesis section 112 are changed due to the focusing characteristic of the focusing section 200 and the disk substrate thickness.

FIG. 14 is divided into rows (1) to (3) and columns (*a*) to (*d*). For example, the upper-left graph in FIG. 14 is called FIG. 14(1)(*a*). The lower-right graph is called FIG. 14(3)(*d*).

FIGS. 14(1)(*a*) to 14(3)(*a*) are graphs showing the focusing error signal waveform detected by the focusing error signal detection section 109, the output waveform of the reflected light detection section 111, and the output waveform of the first synthesis section 112 with respect to a disk having a substrate thickness of 0.6 mm when the focusing characteristics of the focusing section 200 is designed for the thick disk having a substrate thickness of 0.6 mm.

FIGS. 14(1)(*b*) to 14(3)(*b*) are graphs showing the focusing error signal waveform detected by the focusing error signal detection section 109, the output waveform of the reflected light detection section 111, and the output waveform of the first synthesis section 112 with respect to a disk having a substrate thickness of 1.2 mm when the focusing characteristics of the focusing section 200 is designed for the thick disk having a substrate thickness of 0.6 mm.

FIGS. 14(1)(*c*) to 14(3)(*a*) are graphs showing the focusing error signal waveform detected by the focusing error signal detection section 109, the output waveform of the reflected light detection section 111, and the output waveform of the first synthesis section 112 with respect to a disk having a substrate thickness of 0.6 mm when the focusing characteristics of the focusing section 200 is designed for the thick disk having a substrate thickness of 1.2 mm.

FIGS. 14(1)(*d*) to 14(3)(*d*) are graphs showing the focusing error signal waveform detected by the focusing error signal detection section 109, the output waveform of the reflected light detection section 111, and the output waveform of the first synthesis section 112 with respect to a disk having a substrate thickness of 1.2 mm when the focusing characteristics of the focusing section 200 is designed for the thick disk having a substrate thickness of 1.2 mm.

Here, In FIG. 14, the horizontal axis represents the positional relationship between the focal point of a light beam and the recording surface of the disk 100. The in-focus state is represented by P2. The vertical axis represents the magnitude of signals output from the focusing error detection section 109, the reflected light detection section 111, and the first synthesis section 112.

As shown in FIGS. 14(1)(*a*) to 14(3)(*a*), when the substrate thickness of the disk 100 is 0.6 mm and the focusing characteristic of the focusing section 200 is designed for a thick disk having a substrate thickness of 0.6 mm. the amplitude of the S-shaped focusing error signal is (A–B). When the positional relationship between the focal point of a light beam and the recording surface of the disk 100 is in the in-focus state, the output signal output from the reflected light detection section 111 has the maximum value X while the amplitude of the focusing error normalized signal output from the first synthesis section 112 is (A'−B').

As shown in FIGS. 14(1)(c) to 14(3)(c), when the substrate thickness of the disk 100 is 0.6 mm and the focusing characteristic of the focusing section 200 is designed for a thick disk having a substrate thickness of 1.2 mm, the amplitude of the S-shaped focusing error signal is (F−G). When the positional relationship between the focal point of a light beam and the recording surface of the disk 100 is in the in-focus state, the output signal output from the reflected light detection section 111 has the maximum value Y while the amplitude of the focusing error normalized signal output from the first synthesis section 112 is (F'−G').

When the focusing characteristic is designed for the thick disk having a substrate thickness of 1.2 mm, spherical aberration occurs in the S-shaped focusing error signal and the focusing error normalized signal, resulting in a reduction in the amplitude. That is, the following relationship is established:

$$(A-B)>(F-G),$$

and $$(A'-B')>(F'-G').$$

As shown in FIGS. 14(1)(b) to 14(3)(b), when the substrate thickness of the disk 100 is 1.2 mm and the focusing characteristic of the focusing section 200 is designed for a thick disk having a substrate thickness of 0.6 mm, the amplitude of the S-shaped focusing error signal is (D−E). When the positional relationship between the focal point of a light beam and the recording surface of the disk 100 is in the in-focus state, the output signal output from the reflected light detection section 111 has the maximum value X' while the amplitude of the focusing error normalized signal output from the first synthesis section 112 is (D'−E').

As shown in FIGS. 14(1)(d) to 14(3)(d), when the substrate thickness of the disk 100 is 1.2 mm and the focusing characteristic of the focusing section 200 is designed for a thick disk having a substrate thickness of 1.2 mm, the amplitude of the S-shaped focusing error signal is (I−J). When the positional relationship between the focal point of a light beam and the recording surface of the disk 100 is in the in-focus state, the output signal output from the reflected light detection section 111 has the maximum value Y' while the amplitude of the focusing error normalized signal output from the first synthesis section 112 is (I'−J'). When the focusing characteristic is designed for the disk having a substrate thickness of 0.6 mm, spherical aberration occurs in the S-shaped focusing error signal, resulting in a reduction in the amplitude. That is, the following relationship is established:

$$(I-J)>(D-E),$$

and $$(I'''J')>(D'-E').$$

The microcomputer 130 determines the amplitude of the focusing error normalized signal, which is the output signal of the first synthesis section 112 and is measured by the first amplitude measurement section 113. This determination is performed while switching the focusing characteristic of the focusing section 200 between the focusing lens designed for the thick disk having a substrate thickness of 0.6 mm and the focusing lens designed for the thick disk having a substrate thickness of 1.2 mm. When the detected amplitude is large, it is determined that the used focusing lens is suitable for the disk. In other words, when the focusing lens designed for a disk having a substrate thickness of α mm is used, if the amplitude is larger compared with when the focusing lens designed for a disk having the other substrate thickness, the microcomputer 130 determines that the disk has a substrate thickness of α mm.

The microcomputer 130 compares the amplitude of the focus error normalized signal, (A'−B'), measured by the first amplitude measurement section 113 with the focusing error amplitude (F'−G') held therein. The result is given by:

$$(F'-G')<(A'-B').$$

The microcomputer 130 determines that the substrate thickness of the disk is 0.6 mm (STEP 218).

The microcomputer 130 determines that the substrate thickness of the disk is 0.6 mm, and therefore switches the focusing characteristic of the focusing section 200 to the focusing lens (a) 200-a designed for the thick disk having a substrate thickness of 0.6 mm (STEP 219). The microcomputer 130 sets the output of the first amplitude measurement section 113 to zero in accordance with the clear signal (STEP 220).

Moreover, the microcomputer 130 determines that the substrate thickness of the disk is 0.6 mm, and therefore outputs the disk motor control command to the disk motor driving section 129. In response to the output of the microcomputer 130, the disk motor 128 rotates at 2000 revolutions per minute. The microcomputer 130 outputs to the optical power regulation section 127 the optical power regulation command for causing the irradiation section 101 to emit a light beam having an optical power of 1.0 mW. The optical power regulation section 127 commands the irradiation section 101 to set the optical power of the light beam to 1.0 mW. The microcomputer 130 outputs a focusing characteristic switch command, which switches the focusing characteristic of the focusing section 200 to the focusing lens (a) 200-a designed for the 0.6 mm-substrate-thick disk, to the focusing characteristic switch section 201. The focusing characteristic switch section 201 switches the focusing characteristic to the focusing lens (a) 200-a designed for the 0.6 mm-substrate-thick disk.

Hereinafter, the operation when a CD having a substrate thickness of 1.2 mm is loaded as a disk in the recording/reproducing apparatus shown in FIG. 1 will be shown in FIGS. 1, 11A and 11B, and 13.

Figure 13:
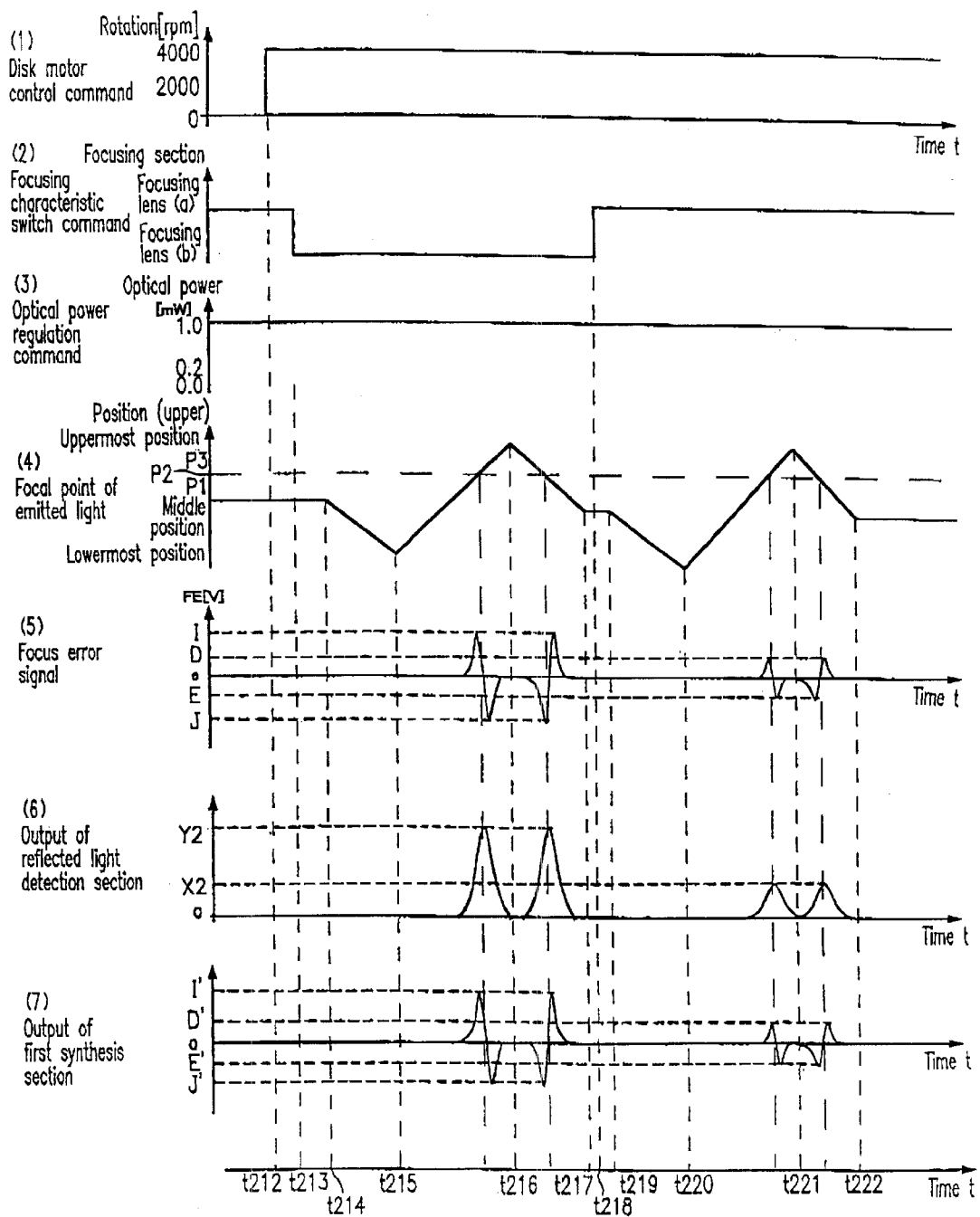
FIG. 13 is a diagram showing a time chart of output signals output from the components when the substrate thickness of a disk is determined.

FIGS. 11A and 11B are diagrams showing a flow chart of the disk substrate thickness determination method. FIG. 13 is a diagram showing a time chart of output signals of the components when the substrate thickness of a disk is determined.

Specifically, FIG. 13(1) is a diagram.showing the relationship between the disk motor control command output to the disk motor driving section 129, and time.

FIG. 13(2) is a diagram showing the relationship between a focusing characteristic switch command output to a focusing characteristic switch section 201 for switching the focusing characteristic of the focusing section 200 between focusing lenses (a) 200-a and (b) 200-b, and time. The focusing lens (a) 200-a of the focusing section 200 is designed to bring a light beam into a focus on a thick disk having a substrate thickness of 0.6 mm. The focusing lens (b) 200-b of the focusing section 200 is designed to bring a light beam into a focus on a thick disk having a substrate thickness of 1.2 mm. FIG. 13(3) is a diagram showing the relationship between an optical power regulation command output from the microcomputer 130 to the optical power regulation section 127, and time. FIG. 13(4) is a diagram showing the relationship between the focal point of the emitted light, and time. FIG. 13(5) is a diagram showing the relationship between an output signal of the focusing error detection section 109, and time. FIG. 13(6) is a diagram showing the relationship between an output signal of the reflected light detection section 111, and time. FIG. 13(7) is a diagram showing the relationship between an output signal of the first synthesis section 112, and time.

The operations of the components from time t=t212 to t215 are similar to those described for time t=t201 to t204, whereby the description is omitted.

At time t=t215, the microcomputer 130 outputs the up/down movement command, which causes the focusing lens (b) 200-*b* to approach the disk surface, to the focus driving circuit 121 via the focus driving switch section 120.

In response to this, the focus driving circuit 121 starts driving the focusing lens (b) 200-*b* so that the focal point of the emitted light approaches the disk surface (STEP 204).

The focal point of the emitted light continues to approach the disk 100. Eventually, the focal point of the emitted light passes through the position P1, the in-focus position P2, and the position P3 in this order. In this case, an output signal of the focusing error detection section 109 is S-shaped as shown in FIG. 13(5). The focusing error detection section 109 detects the S-shaped focusing error signal.

The output signal of the reflected light detection section 111 has the maximum value Y2 when the focal point of the emitted light is positioned at the in-focus position P2 as shown in FIG. 13(6). A focusing error normalized signal output from the first synthesis section 112 (FIG. 13(7)) is output to the first amplitude measurement section 113 (STEP 205).

The first amplitude measurement section 113 detects the maximum value I' and the minimum value J', and determines the difference, (I'−J'), as the amplitude of the S-shaped focusing error normalized signal, which is output to the microcomputer 130.

At time t=t216, the focal point of the emitted light reaches the uppermost position, when the first amplitude measurement section 113 ends measuring the amplitude of the output signal of the first synthesis section 112. The microcomputer 130 outputs the up/down movement command, which causes the focal point of the emitted light to approach the in-focus position P2, to the focus driving section 121 via the focus driving switch section 120. In response to this, the focus driving circuit 121 starts driving the focusing lens (b) 200-*b* in such a way as to approach the in-focus position P2 of the disk surface (STEP 206).

The focal point of the emitted light continues to approach the disk 100, and eventually passes through the position P3, the in-focus position P2 and the position P1 in this order. In this case, the first synthesis section 112 detects an S-shaped focusing error normalized signal as shown in FIG. 13(7) again (STEP 207).

At time t=t217, the focusing lens (b) 200-*b* reaches a middle point of the range in which it can move. At that point, the microcomputer 130 ends the up/down movement command to the focus driving circuit 121, via the focusing driving switch section 120. The focus driving circuit 121 sets the driving output to the focusing lens (b) 200-*b* to zero. Thus, the focusing lens (b) 200-*b* stops at the neutral point (STEP 208).

The microcomputer 130 holds the output value of the first amplitude measurement section 113 at that point. The value held therein is (I'−J'). Thereafter, the microcomputer 130 sets the output signal output from the first amplitude measurement section 113 to zero in accordance with the clear signal (STEP 209).

At time t=t218, the microcomputer 130 outputs to the focusing characteristic switch section 201 the focusing characteristic switch command for switching the focusing characteristic of the focusing lens (b) 200-*b* to the focusing lens (a) 200-*a* which is designed for a thick disk having a substrate thickness of 0.6 mm.

The focusing characteristic switch section 201 switches the focusing characteristic of the focusing lens (b) 200-*b* to the focusing lens (a) 200-*a* which is designed for a thick disk having a substrate thickness of 0.6 mm (STEP 210) in accordance with the output of the microcomputer 130.

At time t=t219, the first amplitude measurement section 113 resumes the amplitude measurement of the output signal of the first synthesis section 112. The microcomputer 130 outputs the up/down movement command, which causes a focusing lens (a) 200-*a* to withdraw from the disk surface, to the focus driving circuit 121 via the focus driving switch section 120. In response to this, the focus driving circuit 121 starts driving the focusing lens (a) 200-*a* so that the focal point of the emitted light withdraws from the in-focus position P2 of the disk surface, as shown in FIG. 13(4) (STEP 211).

At time t=t220. the microcomputer 130 outputs the up/down movement command, which causes the focusing lens (a) 200-*a* to approach the disk surface, to the focus driving circuit 121 via the focus driving switch section 120. In response to this, the focus driving circuit 121 starts driving the focusing lens (a) 200-*a* so that the focal point of the emitted light approaches the in-focus position P2 of the disk surface (STEP 212).

The focal point of the emitted light continues to approach the disk 100, and eventually passes through the position P1, the in-focus position P2, and the position P3 in this order. In this case, the output signal of the focusing error signal detection section 109 detects an S-shaped focusing error signal as shown in FIG. 13(5).

The output signal of the reflected light detection section 111 is a signal as shown in FIG. 12(6), which has the maximum value X2 when the focal point of the emitted light is positioned at the in-focus position P2. The focusing error normalized signal, which is the output of the first synthesis section 112, is S-shaped as shown in FIG. 13(7). The focusing error normalized signal is output to the first amplitude measurement section 113. The first amplitude measurement section 113 detects the maximum value D' and the minimum value E', and determines the difference, (D'−E'), as the amplitude of the S-shaped focusing error normalized signal, which is output to the microcomputer 130 (STEP 213).

At time t=t221, the focal point of the emitted light reaches the uppermost position. The first amplitude measurement section 113 ends measuring the amplitude of the output signal of the first synthesis section. The microcomputer 130 outputs the up/down movement command, which causes the focal point of the emitted light to approach the in-focus position P2, to the focus driving section 121 via the focus driving switch circuit 120. In response to this. the focus driving circuit 121 starts driving the focusing lens (a) 200-*a* in such a way as to approach the in-focus position P2 of the disk surface (STEP 214).

The focal point of the emitted light continues to approach the disk 100, and eventually passes the position P3, the in-focus position P2, and the position P1 in this order. In this case, the first synthesis section 112 generates the S-shaped focusing error normalized signal again (STEP 215).

At time t=t222, the focusing lens (a) 200-*a* reaches a middle point of the range in which it can move. At that point, the microcomputer 130 ends the up/down movement command to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 216).

The microcomputer 130 compares the amplitude of the focus error normalized signal, (D'–E'), measured by the first amplitude measurement section 113 with the focusing error amplitude (I'–J') held therein. The result is given by:

$$(D'-E')<(I'-J').$$

The microcomputer 130 determines that the substrate thickness of the disk is 1.2 mm (STEP 218).

The microcomputer 130 determines that the substrate thickness of the disk is 1.2 mm, and therefore switches the focusing characteristic of the focusing section 200 to the focusing lens (b) 200-*b* designed for the thick disk having a substrate thickness of 1.2 mm (STEP 219). The microcomputer 130 sets the output signal of the first amplitude measurement section 113 to zero in accordance with the clear signal (STEP 220).

Moreover, the microcomputer 130 determines that the substrate thickness of the disk is 1.2 mm, and therefore outputs the disk motor control command to the disk motor driving section 129. In response to the output of the microcomputer 130, the disk motor 128 rotates at 2000 revolutions per minute. The microcomputer 130 outputs to the optical power regulation section 127 the optical power regulation command for causing the irradiation section 101 to emit a light beam having an optical power of 0.2 mW. The optical power regulation section 127 commands the irradiation section 101 to set the optical power of the light beam to 0.2 mW. The microcomputer 130 outputs a focusing characteristic switch command, which switches the focusing characteristic of the focusing section 200 to the focusing lens (b) 200-*b* designed for the 1.2 mm-substrate-thick disk, to the focusing characteristic switch section 201. The focusing characteristic switch section 201 switches the focusing characteristic to the focusing lens (b) 200-*b* designed for the 1.2 mm-substrate-thick disk.

In the above-described Example, the first amplitude measurement section 113 detects the peak-to-peak value of the S-shaped focusing error signal which is the output signal of the first synthesis section 112. The same effects can be obtained when the zero-to-peak value is detected.

Figure 15:
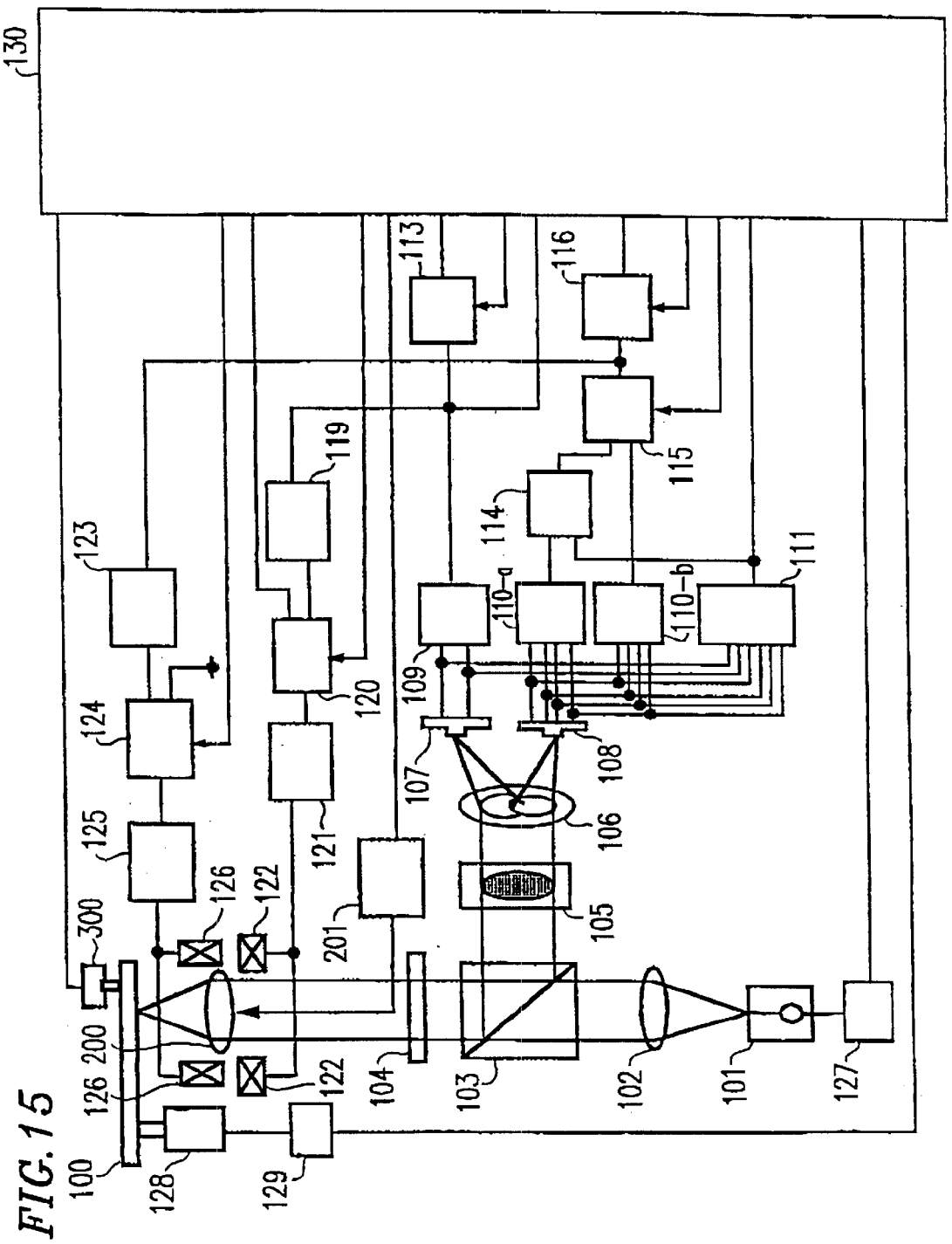
FIG. 15 is a diagram showing a recording/reproducing apparatus according to the present invention.

Further, as shown in FIG. 15, an output terminal of the focusing error signal detection section 109 may be connected to the first amplitude measurement section 113. The first amplitude measurement section 113 may measure the amplitude of the focusing error signal, which is detected when the focusing section 200 moves, i.e., approaches or withdraws from the disk 100, while switching the focusing characteristic of the focusing section 200. This leads to achievement of the same effects.

Hereinafter, the third part, i.e., the determination of the information recording surface count, will be described.

In this part, the types of disks to be loaded as the disk 100 in the recording/reproducing apparatus shown in FIG. 1 are limited to the following three types: a DVD-ROM disk (a single layer) disk, a DVD-ROM (a dual layer) disk and a DVD-RAM. Note that when the disk loaded in the recording/reproducing apparatus is a PD or CD, the disk type is already determined in STEP 50 and STEP 200.

The operation when the DVD-ROM disk (a single layer) disk, the DVD-ROM (a dual layer) disk or the DVD-RAM is loaded in the recording/reproducing apparatus shown in FIG. 1, will be described with reference to FIGS. 1, 16, and 17.

Figure 16:
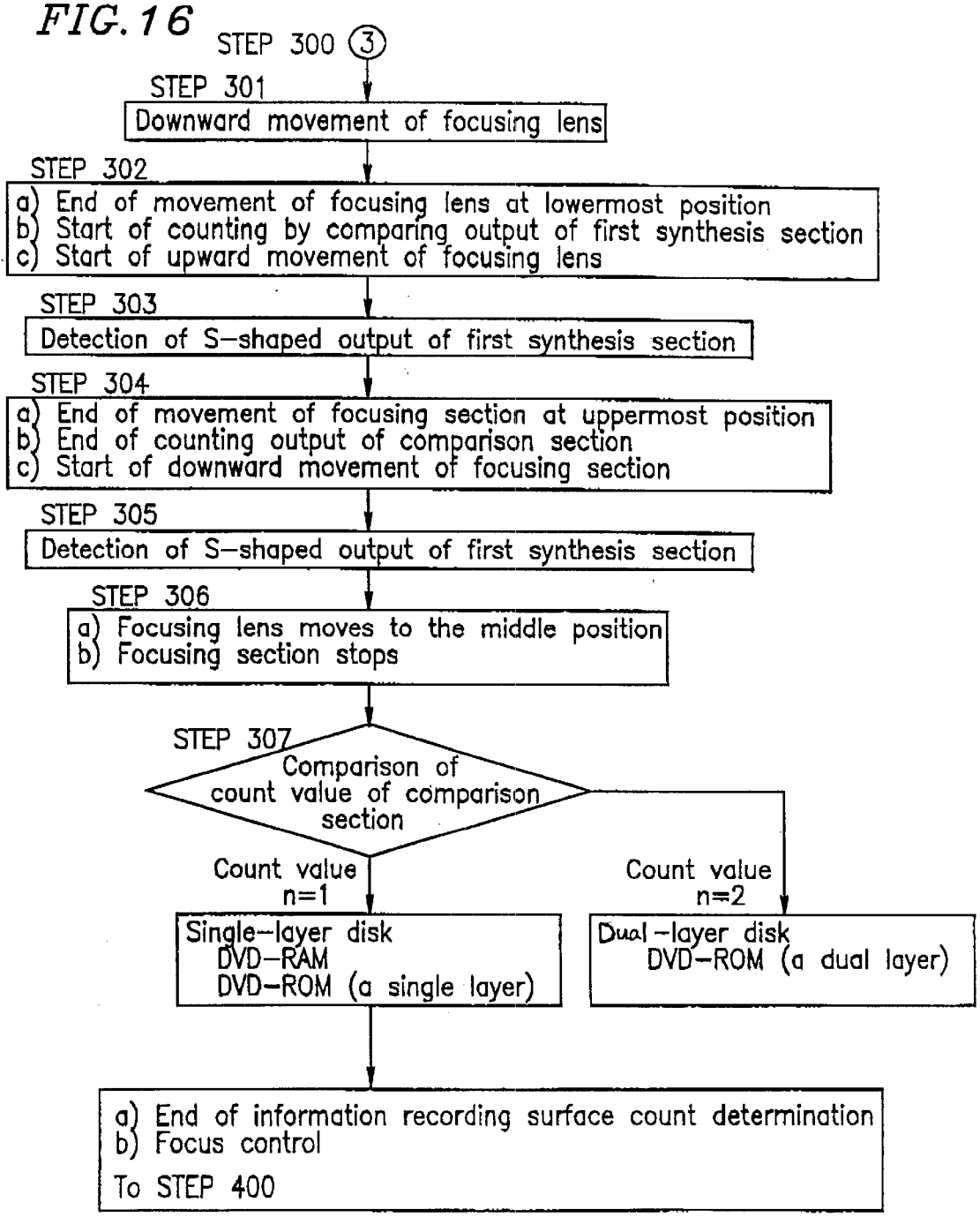
FIG. 16 is a diagram showing a flowchart of an information recording surface count determination method.

FIG. 16 is a diagram showing a flow chart of the information recording surface count determination method. FIG. 17 is a diagram showing a time chart of output signals output from the components when the information recording surface count is determined.

Figure 17:
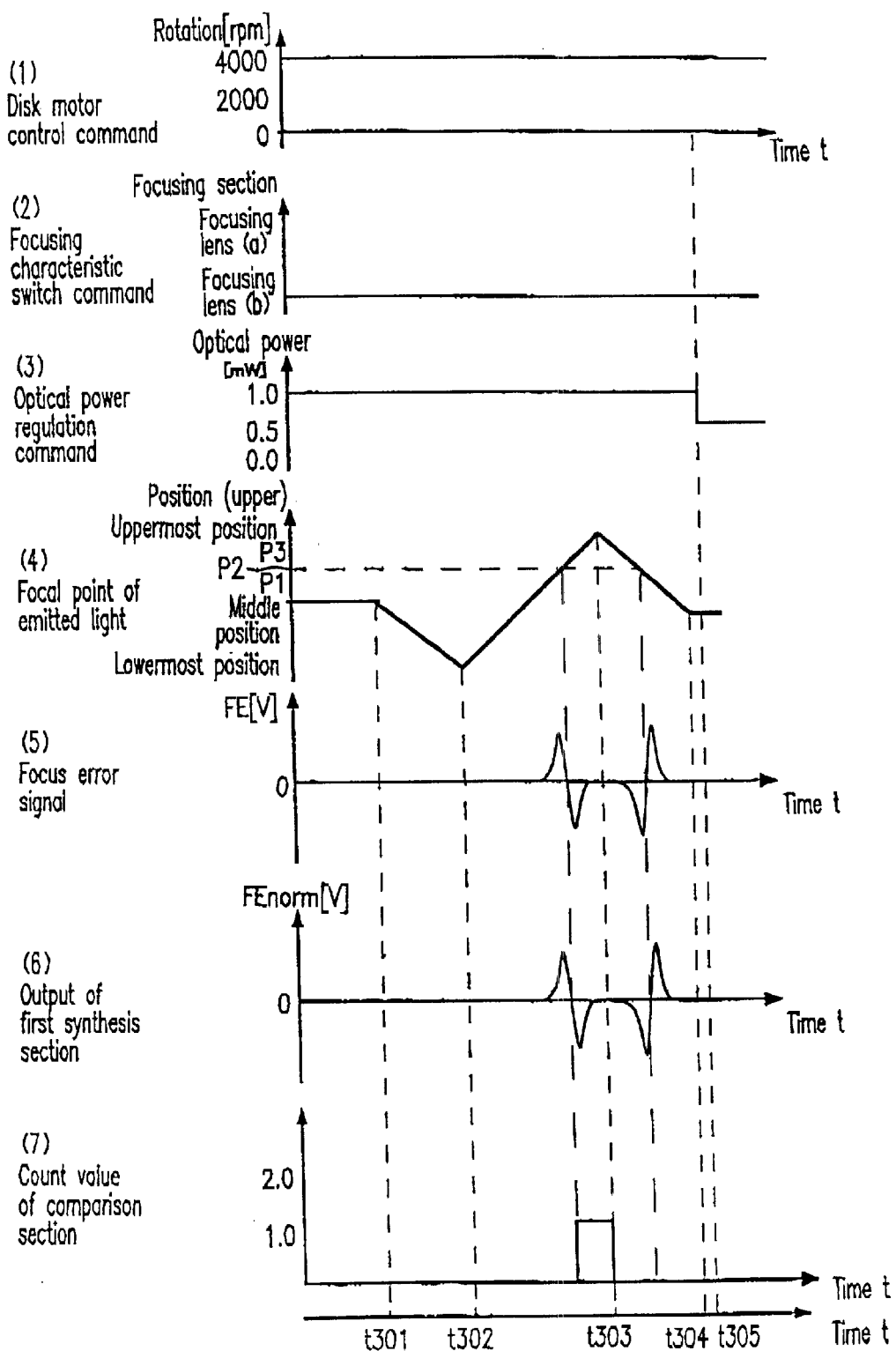
FIG. 17 is a diagram showing a time chart of output signals output from the components when the information recording surface count is determined.

Specifically, FIG. 17(1) is a diagram showing the relationship between the disk motor control command output to the disk motor driving section 129 from the microcomputer 130, and time.

FIG. 17(2) is a diagram showing the relationship between the focusing characteristic switch command output to the focusing characteristic switch section 201 for switching the focusing characteristic of the focusing section 200 between focusing lenses (a) 200-*a* and (b) 200-*b*, and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 17(3) is a diagram showing the relationship between the optical power regulation command output from the microcomputer 130 to the optical power regulation section 127, and time. FIG. 17(4) is a diagram showing the relationship between the focal point of the emitted light, and time. FIG. 17(5) is a diagram showing the relationship between an output signal of the focusing error detection section 109, and time. FIG. 17(6) is a diagram showing the relationship between an output signal of the first synthesis section 112, and time.

FIG. 17(7) is a diagram showing the relationship between a count by a comparison section counter, and time. The comparison section counter within the microcomputer 130 counts a result of comparison of the output signal of the first synthesis section 112 with a predetermined value.

At time t=t301, the microcomputer 130 outputs the up/down movement command, which causes the focusing lens (a) 200-*a* to withdraw from the disk surface, to the focus driving circuit 121 via the focus driving switch section 120. In response to this, the focus driving circuit 121 drives the focusing lens (a) 200-*a* so that the focal point of the emitted light withdraws from the in-focus position P2 of the disk surface, as shown in FIG. 17(4) (STEP 301).

At time t=t302, the microcomputer 130 causes the comparison section counter to count the result of comparison of the output signal of the first synthesis section 112 with the predetermined value is counted. The microcomputer 130 outputs the up/down movement command, which causes the focusing lens (a) 200-*a* to approach the disk surface, to the focus driving circuit 121 via the focus driving switch section 120. In response to this, the focus driving circuit 121 starts driving the focusing lens (a) 200-*a* so that the focal point of the emitted light approaches the disk surface (STEP 302).

The focal point of the emitted light continues to approach the disk 100. Eventually, the focal point of the emitted light passes through the in-focus position P2. In this case, the focusing error detection section 109 detects an S-shaped focusing error signal as shown in FIG. 17(5). The first synthesis section 112 outputs an S-shaped signal as shown in FIG. 17(6) to the microcomputer 130. Since the number of information recording surfaces (also referred to as "information recording surface count") of the disk loaded in the recording/reproducing apparatus is one, there exists a single in-focus position of the disk. Therefore, the comparison section counter within the microcomputer 130 counts 1.0 which indicates the focal point of the emitted light passes through the in-focus position one time (STEP 303).

At time t=t303, the focal point of the emitted light reaches the uppermost position, when the comparison section counter ends counting. After storing the count value 1.0 the count value ts set to 0. Then, the microcomputer 130 outputs the up/down movement command, which causes the focal point of the emitted light to approach the in-focus position P2, to the focus driving section 121 via the focus driving switch circuit 120.

In response to this, the focus driving circuit 121 starts driving the focusing lens (b) 200-*b* in such a way as to approach the in-focus position P2 of the disk surface (STEP 304).

The focal point of the emitted light continues to approach the disk 100, and eventually passes through the in-focus position P2. In this case, the first synthesis section 112 detects an S-shaped signal as shown in FIG. 17(6) (STEP 305).

At time t=t304, the focusing lens (a) 200-*a* reaches a middle point of the range in which it can move. At that point, the microcomputer 130 ends the up/down movement command to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 306).

The microcomputer 130 determines the information recording surface count using the output signal of the comparison section counter within the microcomputer 130 stored in STEP 304. In this case, the count value stored by the microcomputer 130 is 1.0. Therefore, it is determined that the information recording surface count of the loaded disk is a single layer (STEP 307).

The microcomputer 130 determines that the information recording surface count is a single layer, i.e., that the disk loaded in the recording/reproducing apparatus is a DVD-ROM (a single layer) or DVD-RAM. The microcomputer 130 outputs to the optical power regulation section 127 the optical power regulation command for causing the irradiation section 101 to emit a light beam having an optical power of 0.5 mW. The optical power regulation section 127 commands the irradiation section 101 to set the optical power of the light beam to 0.5 mW. The microcomputer 130 causes the focusing lens (a) 200-*a* to move so that the focal point of a light beam is not deviated from the disk surface. The microcomputer 130 outputs a focus driving switch command to the focus driving switch circuit 120. The input signal to the focus driving circuit 121 is switched to the output of the focus phase compensation 119, thereby closing a focus loop, i.e., performing a focus attracting operation.

Figure 19:
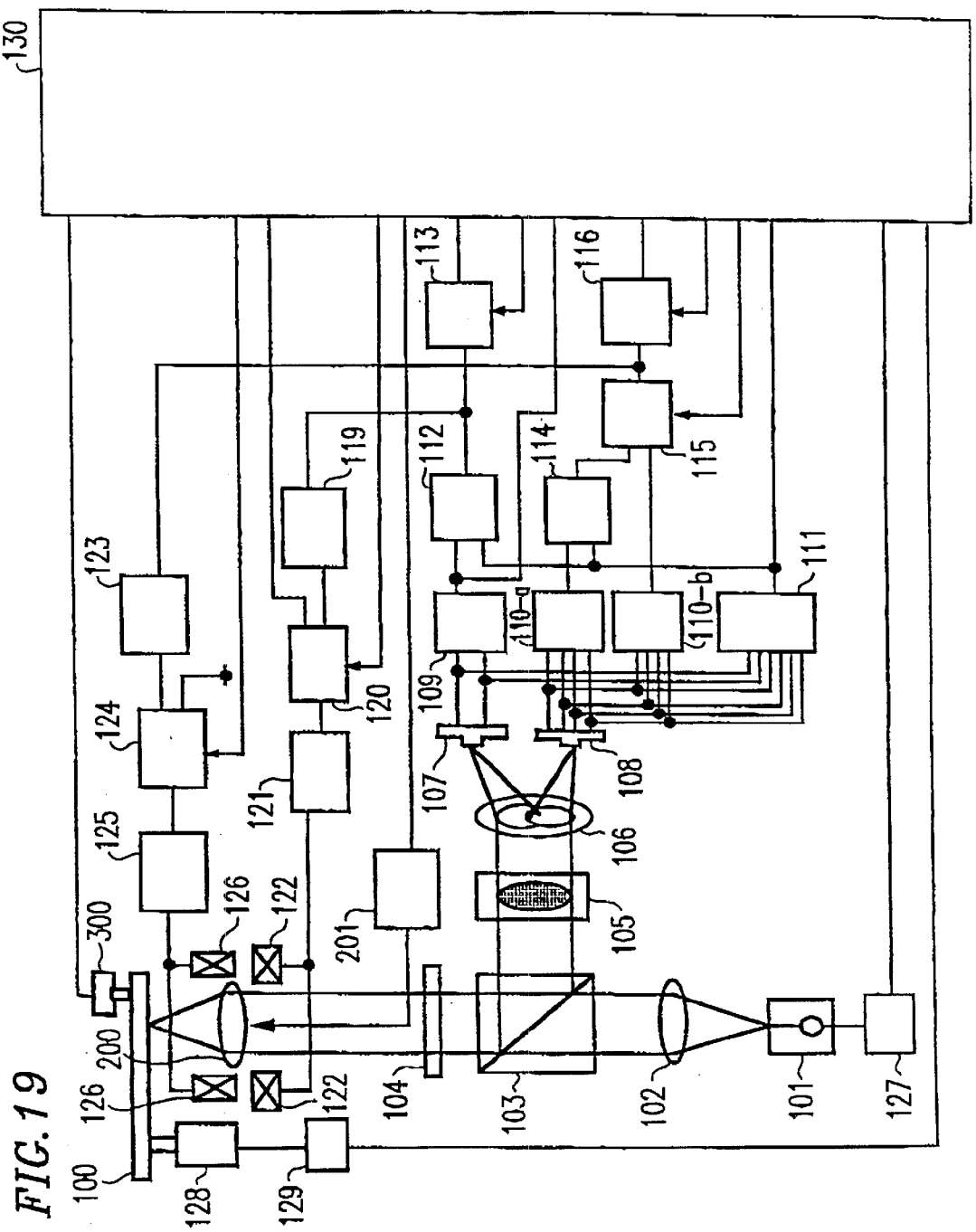
FIG. 19 is a diagram showing a recording/reproducing apparatus according to the present invention.

In this example, the focusing error signal is synthesized from the output of the reflected light detection section 111 by the first synthesis section 112, the output of which is connected to the microcomputer 130. As shown in FIG. 19, an output terminal of the focusing error detection section 109 may be connected to the microcomputer 130. A focusing error signal, detected when the focusing lens (a) 200-*a* is moved to approach or withdraw from the recording surface of the disk 100, may be compared with the predetermined value by the microcomputer 130 so that the recording surface count is counted. This leads to achievement of the same effects.

Hereinafter, the operation when a DVD-ROM (a dual layer) disk is loaded as a disk in the recording/reproducing apparatus shown in FIG. 1 will be shown in FIGS. 1, 16, and 18.

FIG. 16 is a diagram showing a flow chart of the information recording surface count determination method. FIG. 18 is a diagram showing a time chart of output signals of components when the information recording surface count is determined.

Figure 18:
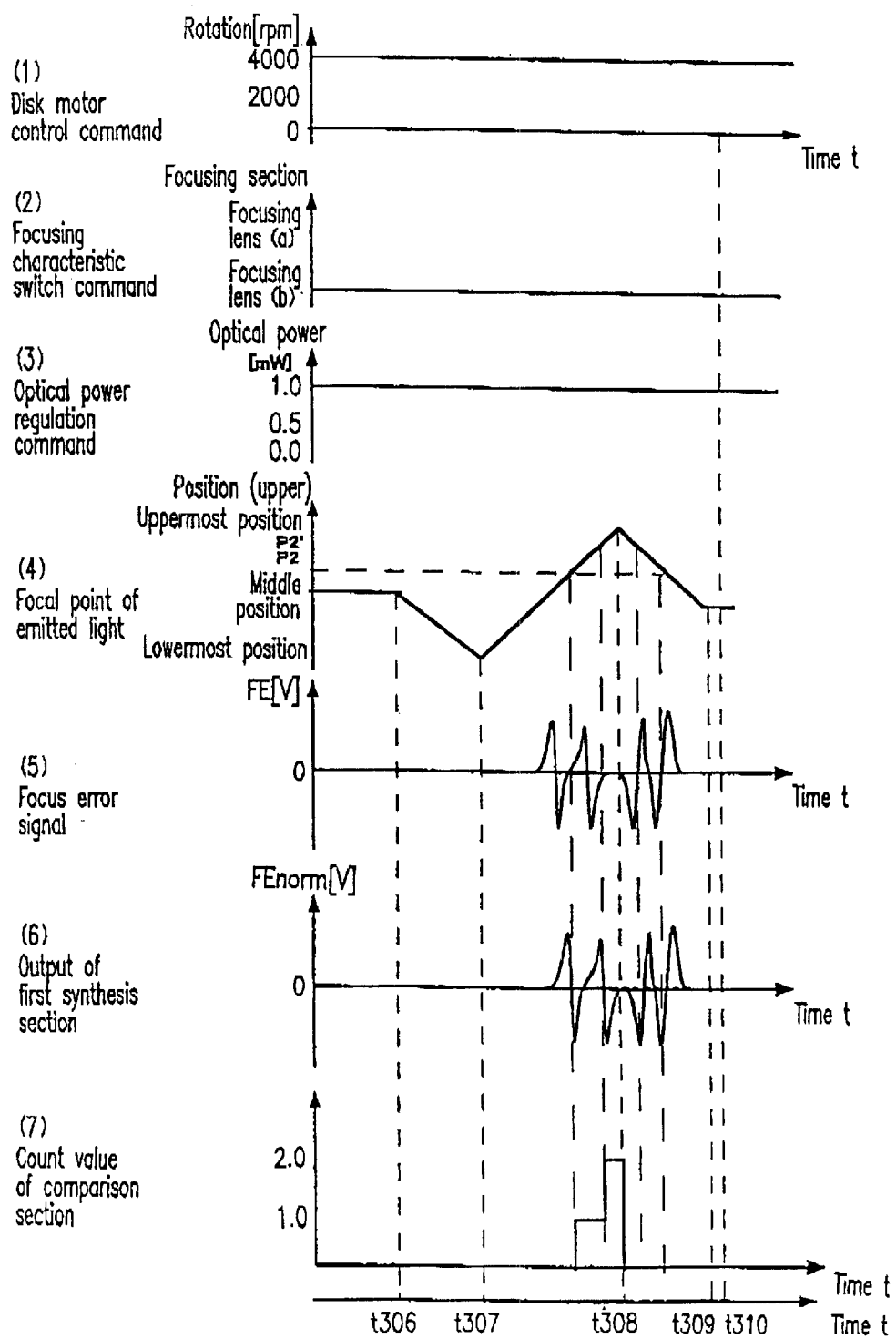
FIG. 18 is a diagram showing a time chart of output signals output from the components when the information recording surface count is determined.

Specifically, FIG. 18(1) is a diagram showing the relationship between the disk motor control command output from the microcomputer 130 to the disk motor driving section 129, and time. FIG. 18(2) is a diagram showing the relationship between a focusing characteristic switch command output to a focusing characteristic switch section 201 for switching the focusing characteristic of the focusing section 200 between focusing lenses (a) 200-*a* and (b) 200-*b*, and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 18(3) is a diagram showing the relationship between the optical power regulation command output from the microcomputer 130 to the optical power regulation section 127, and time. FIG. 18(4) is a diagram showing the relationship between the focal point of the emitted light, and time. FIG. 18(5) is a diagram showing the relationship between an output signal of the focusing error detection section 109, and time. FIG. 18(6) is a diagram showing the relationship between an output signal of the first synthesis detection section 112, and time. FIG. 18(7) is a diagram.showing the relationship between a count value of the comparison section counter within the microcomputer 130, and time.

The operations of the components from time t=t306 to t307 are almost the same as those described for time t=t301 to t302, whereby the description is omitted.

At time t=t307, the microcomputer 130 outputs the up/down movement command, which causes the focusing lens (a) 200-*a* to approach the disk surface, to the focus driving circuit 121 via the focus driving switch section 120. In response to this, the focus driving circuit 121 starts driving the focusing lens (a) 200-*a* so that the focal point of the emitted light approaches the disk surface (STEP 302).

The focal point of the emitted light continues to approach the disk 100. Eventually, the focal point of the emitted light passes through the in-focus position P2 and P2' in this order. In this case, an output signal of the focusing error detection section 109 detects S-shaped focusing error signals as shown in FIG. 18(5). The first synthesis section 112 outputs an S-shaped signal as shown in FIG. 18(6) to the microcomputer 130. There are two in-focus positions as shown in FIG. 18(6) since the information recording surface count of the disk loaded in the recording/reproducing apparatus is two. The count value obtained by counting the result of comparison of the output signal of the first synthesis section 112 with the predetermined value within the microcomputer 130 is 2.0 (STEP 303).

At time t=t308, the focal point of the emitted light reaches the uppermost position, when the comparison section counter within the microcomputer 130 ends counting the comparison result of the output of the first synthesis section 112 with the predetermined value. After storing the comparison section count value, the comparison section counter sets the count value to zero. Thereafter, the microcomputer 130 outputs the up/down movement command, which causes the focal point of the emitted light to approach the in-focus position P2', to the focus driving section 121 via the focus driving switch circuit 120. In response to this, the focus driving circuit 121 starts driving the focusing lens (b)

200-*b* in such a way as to approach the in-focus position P2' of the disk surface (STEP 304).

The focal point of the emitted light continues to approach the disk 100, and eventually passes through the in-focus positions P2' and P2 in this order. In this case, the first synthesis section 112 detects an S-shaped focusing error normalized signal as shown in FIG. 18(6) again (STEP 305).

At time t=t3O9, the focusing lens (a) 200-*a* reaches a middle point of the range in which it can move. At that point, the microcomputer 130 ends the up/down movement command to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 306).

Next, the microcomputer 130 determines the information recording surface count based on the comparison section count value stored in STEP 304. At that point, the count value stored by the microcomputer 130 2.0, so that the information recording surf ace count of the loaded disk is two. That is, it is determined that the disk loaded in the recording/reproducing apparatus is a DVD-ROM (a dual layer) disk (STEP 307).

The microcomputer 130 determines that the number of information recording surfaces is two, and therefore outputs to the optical power regulation section 127 the optical power regulation command for causing the irradiation section 101 to emit a light beam having an optical power of 1.0 mW. The optical power regulation section 127 commands the irradiation section 101 to set the optical power of the light beam to 1.0 mW. The microcomputer 130 causes the focusing lens (a) 200-*a* to move so that the focal point of a light beam is not deviated from the disk surface. The microcomputer 130 outputs the focus driving switch command to the focus driving switch circuit 120. The input signal to the focus driving circuit 121 is switched to the output of the focus phase compensation 119, thereby closing a focus loop, i.e., performing a focus attracting operation.

In this example, the output signal of the first synthesis section 112 obtained by dividing the focusing error signal with the output signal of the reflection light detection section 111 is input to the microcomputer 130. Further, as shown in FIG. 19, the output signal of the focusing error signal detection section 109 may be input to the microcomputer 130. The microcomputer 130 may compare the focusing error signal, which is detected when the focusing lens (a) 200-*a* moves, i.e., approaches or withdraws from the disk 100, with a predetermined value. The comparison result may be counted. This leads to achievement of the same effects.

Hereinafter, the fourth part, i.e., the determination of the RAM/ROM, will be described. In this part, the types of disks to be loaded as the disk 100 in the recording/reproducing apparatus shown in FIG. 1 are limited to the following two types: a DVD-ROM disk (a single layer) disk and a DVD-RAM. Note that when the disk loaded in the recording/reproducing apparatus is a PD, CD, or DVD-ROM (a dual layer) disk, the disk type is already determined in STEP 50 and STEP 300.

The operation when the DVD-ROM disk (a single layer) is loaded in the recording/reproducing apparatus shown in FIG. 1, will be described with reference to FIGS. 1, 20, and 21.

Figure 20:
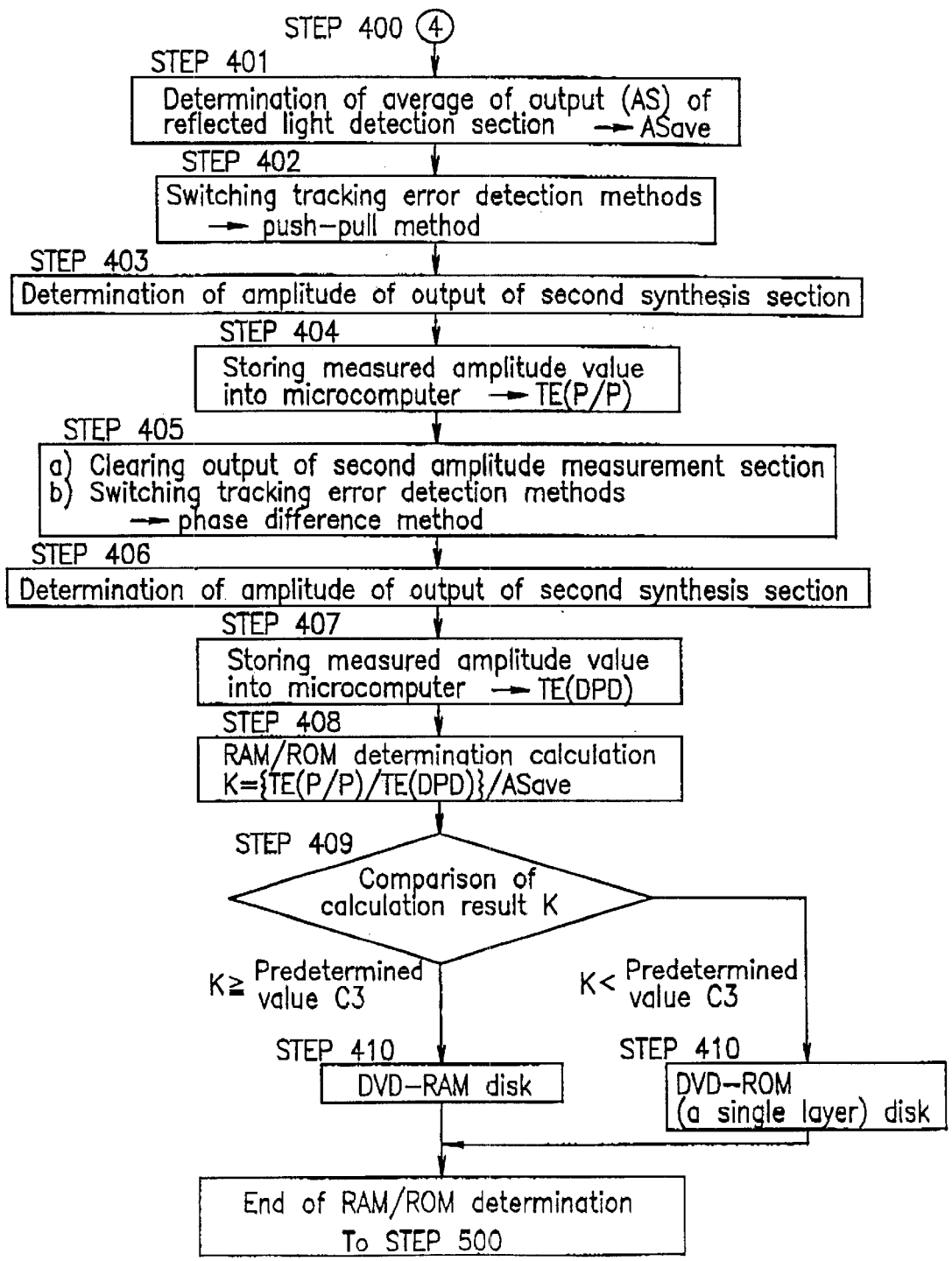
FIG. 20 is a diagram showing a flowchart of a RAM/ROM determination method.
Figure 21:
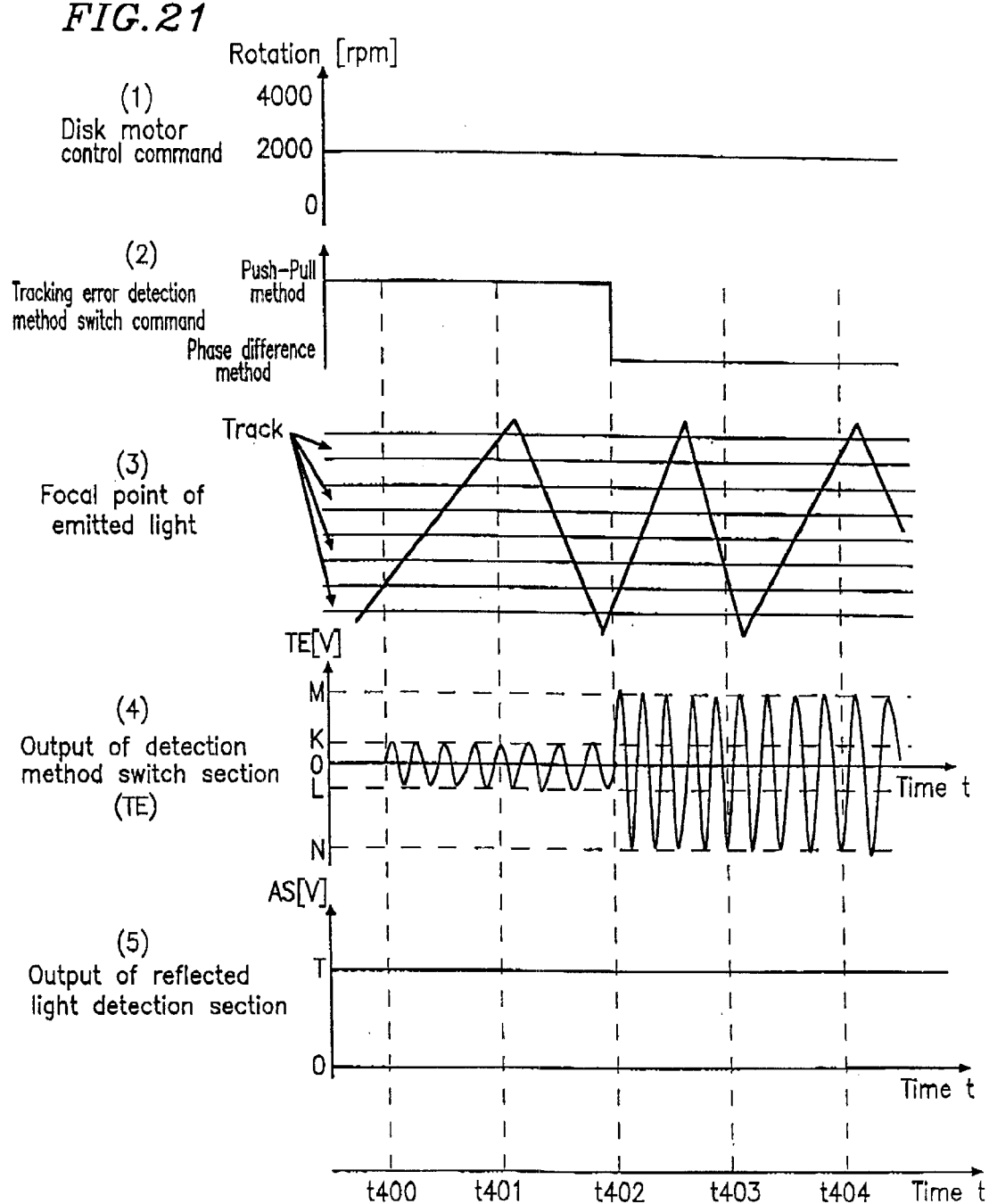
FIG. 21 is a diagram showing a time chart of output signals output from the components when RAM and ROM are distinguished from each other.

FIG. 20 is a diagram showing a flow chart of the RAM/ROM determination method. FIG. 21 is a diagram showing a time chart of output signals output from the components when the RAM/ROM is determined. Specifically, FIG. 21(1) is a diagram showing the relationship between the disk motor control command output to the disk motor driving section 129 from the microcomputer 130, and time. FIG. 21(2) is a diagram showing the relationship between a push-pull method or phase difference method as a tracking error signal detection method output by the microcomputer 130 to the detection method switch section 115, and time, i.e., the relationship between a tracking error signal detection method switch command for switching between an output signal of the second synthesis section 114 and an output signal of the tracking error signal detection section (phase difference method) 110-*b*, and time. FIG. 21(3) is a diagram showing the relationship between the positional relationship between the focal point of the emitted light and a track, and time. FIG. 21(4) is a diagram showing the relationship between an output signal of the detection method switch section 115, and time. FIG. 21(S) is a diagram showing the relationship between an output signal of the reflected light detection section 111, and time.

The irradiation section 101 generates a light beam having a wavelength of 650 nm and a power of 0.5 mW. The disk motor 128 rotates the disk at 4000 revolutions per minute. The focus loop is closed. In other words, the focal point of the light beam is not deviated from the disk surface.

At time t=t400, the microcomputer 130 starts measuring the output level of the reflected light detection section 111.

At time t=t401, the microcomputer 130 ends measuring the output level of the reflected light detection section 111, and calculates the average. At that point, the output level of the reflected light detection section 111 is T as shown in FIG. 21(5) (STEP 401).

Further, the microcomputer 130 outputs the tracking error signal detection method switch command to the detection method switch section 115. The detection method switch section 1L5 selects the output of the second synthesis section 114 as the output of the detection method switch section 115 (STEP 402).

In this case, the output signal of the detection method switch section 115 has a small amplitude, since the pit depth of the disk is about $\lambda/4$ ($\lambda$ is the wavelength of a light beam) so that the phase difference between the reflected light beams diffracted by the pit and the mirror portion, respectively, is $\pi$. As shown in FIG. 21(4), the output signal of the detection method switch section 115 is a sine-wave signal having the maximum value K and the minimum value L. The second amplitude measurement section 116 detects the maximum K and minimum L of the output signal of the detection method switch section 115, determines the difference (K–L), and outputs it to the microcomputer 130 (STEP 403).

The microcomputer 130 stores the output (K–L) of the second amplitude measurement section 116 (STEP 404).

At time t=t402, the microcomputer 130 sets the output of the second amplitude measurement section 116 to zero in accordance with the clear signal. Further, the microcomputer 130 outputs to the detection method switch section 115 the tracking error signal detection method switch command in which the output of the detection method switch section 115 is switched to the phase difference TE which is the output of the tracking error detection section (phase difference method) 110-*b*. The detection method switch section 115 outputs the phase difference TE to the second amplitude measurement section 116. At that point, the detection method switch section 115 outputs a sine-wave signal having the maximum value M and the minimum value N as shown in FIG. 21(4), since the intensity distribution pattern of the reflected light to be input to the four-way split light detection section 108 changes when the focal point of the light beam passes through the pit (STEP 405).

The second amplitude measurement section 116 detects the maximum M and minimum N of the output signal of the detection method switch section 115, determines the difference (M−N), and outputs it to the microcomputer 130 (STEP 406).

The microcomputer 130 stores the output signal (M−N) of the second amplitude measurement section 116 (STEP 407).

At time t=t403, the microcomputer 130 performs calculation given by the following expression (1) based on the average output value of the reflection light detection section 111, the amplitude (K−L) of the second synthesis section, and the phase difference TE amplitude (M−N) stored in STEPs 401, 404, and 407, respectively:

$$X1=\{(K-L)/(M-N)\}/T \tag{1}$$

The calculation result X1 based on expression (1) is compared with a predetermined value C2 preset by the microcomputer 130. When the calculation result X1 is smaller than the predetermined value C2, it ts determined that the loaded disk is a read-only disk, i.e., a DVD-ROM (a single layer) (STEP 409).

Hereinafter, the comparative value C2 preset by the microcomputer 130 will be described.

Figure 23:
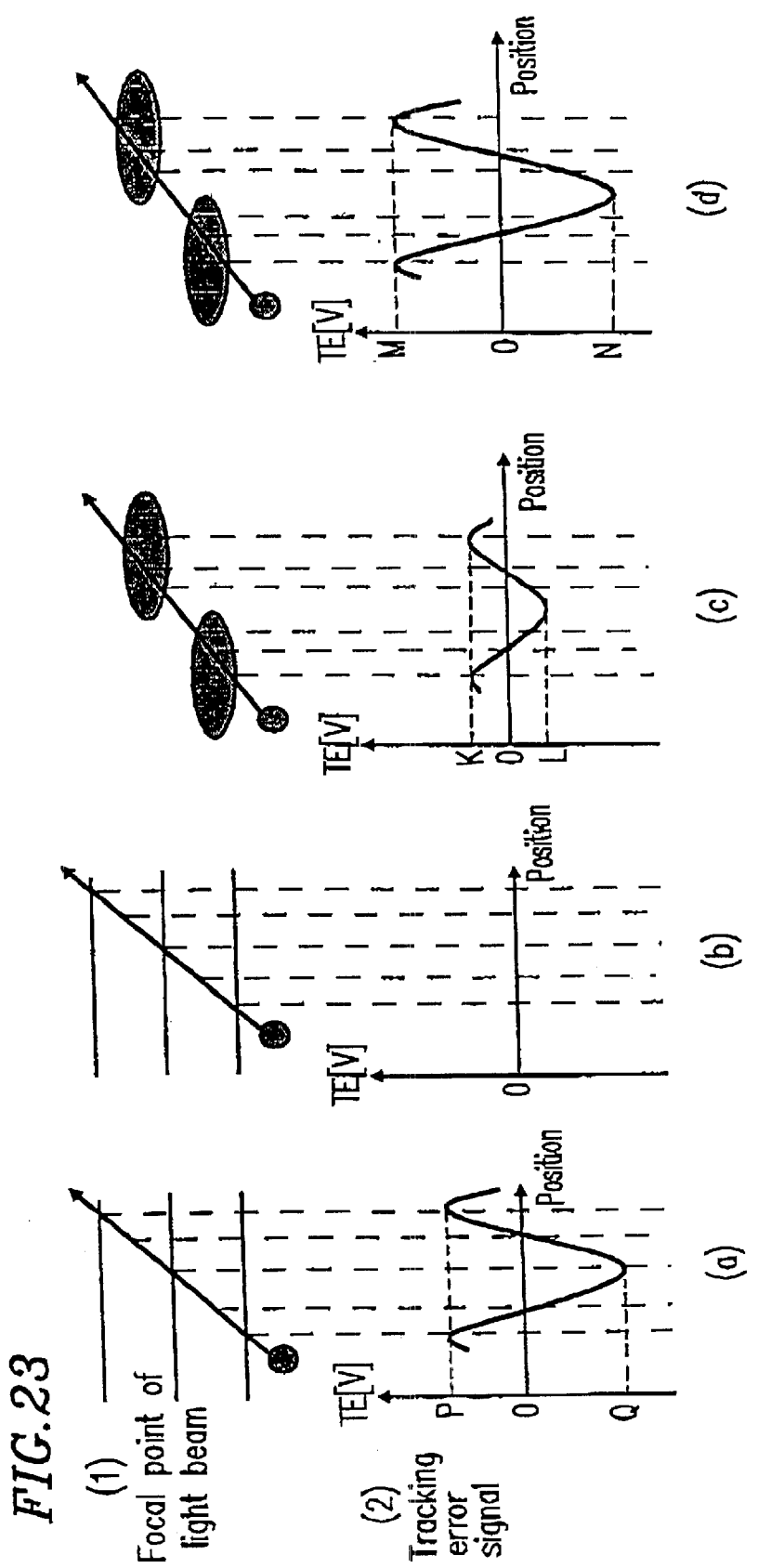
FIG. 23 is a diagram showing tracking error signal waveforms detected by a tracking error signal detection section 110-a (push-pull method) and a tracking error signal detection section 110-b (phase difference method) when the focal point of a light beam passes a track on a DVD-RAM disk, or when the focal point of a light beam passes through a pit on a DVD-ROM disk.

FIG. 23(2)(a) is a diagram showing a tracking error signal waveform detected by the tracking error signal detection section (push-pull method) 110-a when the focal point of a light beam passes through a track of the DVD-RAM disk. FIG. 23(2)(b) is a diagram showing a tracking error signal waveform detected by the tracking error signal detection section (phase difference method) 110-b when the focal point of a light beam passes through a track of the DVD-RAM disk. FIG. 23(2)(c) is a diagram showing a tracking error signal waveform detected by the tracking error signal detection section (push-pull method) 110-a when the focal point of a light beam passes through a pit of the DVD-ROM disk. FIG. 23(2)(d) is a diagram showing a tracking error signal waveform detected by the tracking error signal detection section (phase difference method) 110-b when the focal point of a light beam passes through a pit of the DVD-ROM disk.

In FIGS. 23(2)(a) and (b), data is plotted where the horizontal axis represents the positional relationship between the focal point of a light beam and the track and the center of the track is regarded as "0"; and the vertical axis represents the output of the tracking error signal detection section (push-pull method) 110-a and the output of the tracking error signal detection section (phase difference method) 110-b. In FIGS. 23(2)(c) and (d), data is plotted where the horizontal axis represents the positional relationship between the focal point of a light beam and the pit and the center of the pit is regarded as "0"; and the vertical axis represents the output of the tracking error signal detection section (push-pull method) 110-a and the output of the tracking error signal detection section (phase difference method) 110-b.

In this example, the output of the tracking error signal detection section (push-pull method) 110-a (hereinafter, referred to as a push-pull TE), when the DVD-ROM disk is loaded as a disk, has the small amplitude of the output signal since the pit depth of the disk is about λ/4 (λ is the wavelength of a light beam) so that the phase difference between the reflected light beams diffracted by the pit and the mirror portion, respectively, is π. The light beams interfere and cancel with each other, so that the amplitude of the output signal is reduced to (K−L) . The amplitude (hereinafter referred to as a phase difference TE) of the output of the tracking error signal detection section (phase difference) 110-b is (M−N).

When a DVD-RAM disk is loaded, the push-pull TE amplitude is (P−Q) and the amplitude of the phase difference TE output is zero, since there is no pit, i.e., in a non-recording area, there is no occurrence of a change in intensity of the reflected light from the disk.

Therefore, the ratio of the push-pull TE amplitude to the phase difference TE amplitude, i.e., the value of (push-pull TE amplitude)/(phase difference TE amplitude)

satisfies $$X1=(\text{push-pull } TE \text{ amplitude to the phase difference } TE \text{ amplitude})<1 \tag{2}$$

when a DVD-ROM is loaded.

When a DVD-RAM disk is loaded, $$X2'=(\text{push-pull } TE \text{ amplitude to the phase difference } TE \text{ amplitude})>1 \tag{3}$$

is satisfied.

Moreover, the average value T of output signals output from the reflected light detection section 111 when a DVD-ROM disk is loaded, and the average value U of output signals output from the reflected light detection section 111 when a DVD-RAM disk is loaded, satisfy the following expression:

$$T>>U$$

due to the difference in reflectance between the disks.

Therefore, the comparative value C2 is designed so as to satisfy:

$$(X1'/T)>C2>(X2'/U)$$

utilizing the difference in amplitude of tracking error signals in the tracking error detection method.

Hereinafter, the effect of normalization of the output signal of the tracking error signal detection section (push-pull method) 110-a using the output signal of the reflected light detection section 111 will be described with reference to FIG. 24.

FIGS. 24(a)(1) and 24(b)(1) are diagrams showing the positional relationship between the focal point of a light beam and the track of a disk. FIGS. 24(a)(2) and 24(b)(2) are diagrams showing the tracking error signal waveform (push-pull method). In FIGS. 24(a)(3) and 24(b)(3) are diagrams showing the output waveforms of the reflected light detection section 111. FIGS. 24(a)(4) and 24(b)(4) are diagrams showing the output waveforms of the second synthesis section 114.

Figure 24:
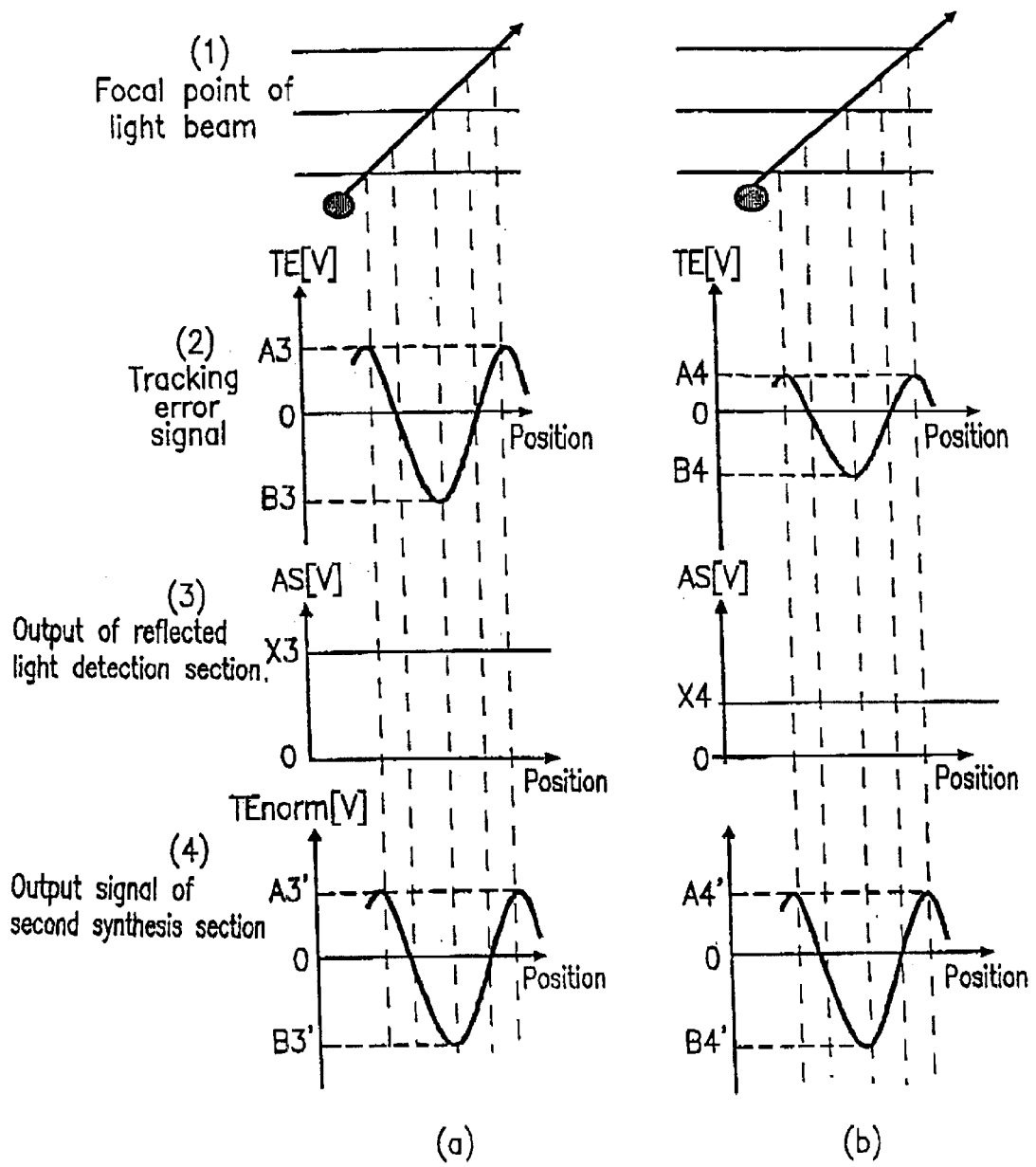
FIG. 24 is a diagram for explaining an effect obtained by normalizing an output signal of the tracking error signal detection section 110-a (push-pull method) using an output signal of the reflected light detection section 111.

In FIGS. 24(1) to (4), the horizontal axis represents the positional relationship between the focal point of the reflected light and the track, and the center of the track is zero.

In FIGS. 24(a) and (b), conditions of the recording/reproducing apparatus and the like are that a DVD-RAM disk is loaded in the recording/reproducing apparatus; the focusing characteristic of the focusing lens (a) 200-a is the same between FIGS. 24(a) and (b); the light beam emitted by the irradiation section 101 has a wavelength of 650 nm; and the power is 0.5 mW, i.e., the same between FIGS. 24(a) and (b). Note that in FIG. 24(b), dirt and dust are attached. In FIG. 24(a), there is no contamination.

As shown in FIG. 24(a)(2), the amplitude of the tracking error signal is (A3−B3) when the focusing lens (a) 200-a is not contaminated. However, when the focusing lens (a) 200-a is contaminated with dirt or dust attached thereto, part of a light beam input to the focusing lens (a) 200-a is blocked or scattered by the dirt or dust. As a result, the ratio of the incoming light to the outgoing light of the focusing lens (a) 200-a, i.e., the transmission rate of the focusing lens (a) 200-a is reduced. As a result, the reflected light from the disk 100 is reduced, so that the amplitude of the tracking error signal is reduced to (A4−B4).

$$(A3-B3)>(A4-B4)$$

being satisfied.

Similarly, the output signal of the reflected light detection section 111 is X4 as shown in FIGS. 24(b)(3) when the focusing lens (a) 200-a is contaminated. The output signal of the reflected light detection section 111 is X3 as shown in FIGS. 24(a)(3) when the focusing lens (a) 200-a is not contaminated.

$$X3>X4$$

is satisfied.

As described above, when the tracking error signal amplitude where the focusing lens (a) 200-a is contaminated is used, $$\{(A4-B4)/(\text{phase difference } TE \text{ amplitude})\}/X4$$

is calculated, and the result and the comparative value C2 are compared with each other. The result of the comparison may lead to erroneous determination.

On the other hand, as in the method of this example, the push-pull TE is divided by the output signal of the reflected light detection section 111 to be normalized, so that a change in the amount of reflected light can be absorbed.

Specifically, as shown in FIGS. 24(a)(4) and 24(b)(4), the amplitude of the output signal of the second synthesis section 114 when there is no contamination is (A3'−B3'), and the amplitude of the output signal of the second synthesis section 114 when there is contamination is (A4'−B4').

That is, $$(A3'-B3')\approx(A4'-B4')$$

is satisfied.

Therefore, precise determination can be realized regardless of the presence or absence of contamination of the focusing lens (a) 200-a.

At time t=t404, the microcomputer 130 determines that the loaded disk in the recording/reproducing apparatus is a DVD-ROM (a single layer), and therefore outputs to the optical power regulation section 127 the optical power regulation command for causing the irradiation section 101 to emit a light beam having an optical power of 0.5 mW. The irradiation section 101 emits a light beam having a wavelength of 650 nm and a power of 0.5 mW in accordance with the output of the microcomputer 130. The microcomputer 130 observes the phase difference TE which is the output of the detection method switch section 115 and outputs the tracking attraction command to the tracking driving switch section 124 when the deviation of the focal point of the light beam from the track is zero, i.e., the phase difference TE is zero. The tracking driving switch section 124 switches the input signal to the tracking driving circuit 125 to the output of the tracking phase compensation 123, thereby closing the tracking loop. That is, the tracking attraction operation is performed (STEP 500).

After the tracking attraction, the microcomputer 130 outputs to the disk motor driving section 129 the disk motor control command for causing the linear velocity to be constant. The disk motor 128 rotates the disk 100 at a constant linear velocity in accordance with the output of the microcomputer 130.

Hereinafter, the operation when the DVD-RAM disk is loaded in the recording/reproducing apparatus shown in FIG. 1, will be described with reference to FIGS. 1, 20, and 22.

FIG. 20 is a diagram showing a flow chart of the RAM/ROM determination method. FIG. 22 is a diagram showing a time chart of output signals output from the components when the RAM/ROM is determined.

Figure 22:
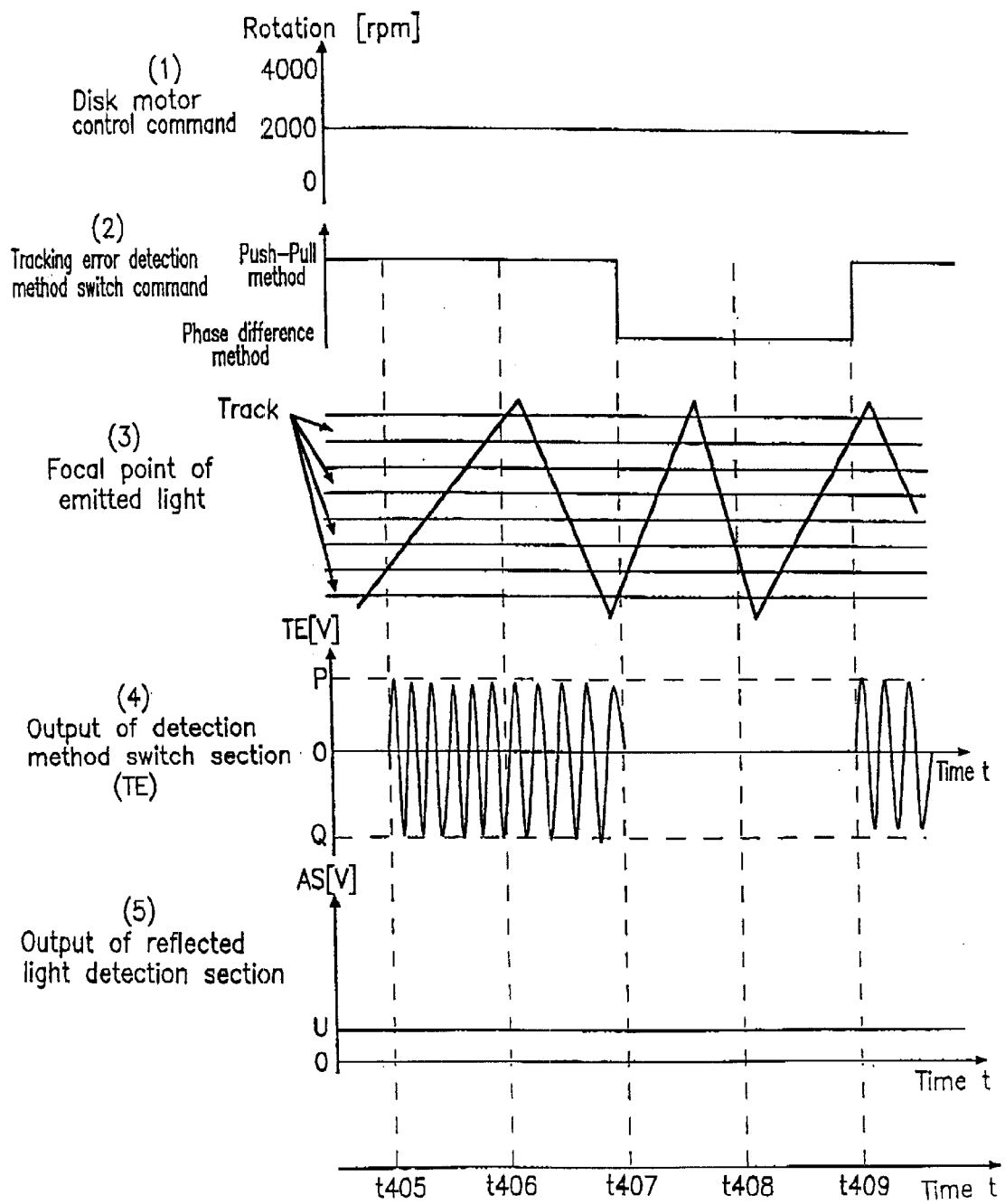
FIG. 22 is a diagram showing a time chart of output signals output from the components when RAM and ROM are distinguished from each other.

Specifically, FIG. 22(1) is a diagram showing the relationship between the disk motor control command output to the disk motor driving section 129 from the microcomputer 130, and time.

FIG. 22(2) is a diagram showing the relationship between the tracking error signal detection method switch command, and time. The tracking error signal detection method switch command switches the tracking error signal detection method output by the microcomputer 130 to the detection method switch section 115 between the push-pull method and the phase difference method. Specifically, the command switches between a tracking error signal detection method switch command for switching between an output signal of the second synthesis section 114 and an output signal of the tracking error signal detection section (phase difference method) 110-b. FIG. 22(3) is a diagram showing the relationship between the positional relationship between the focal point of the emitted light and a track, and time. FIG. 22(4) is a diagram showing the relationship between an output signal of the detection method switch section 115, and time. FIG. 22(5) is a diagram showing the relationship between an output signal of the reflected light detection section 111, and time.

As in the case when a DVD-ROM (a single layer) disk is loaded in the recording/reproducing apparatus, the irradiation section 101 generates a light beam having a wavelength of 650 nm and a power of 0.5 mW. The disk motor 128 rotates the disk at 4000 revolutions per minute. The focus loop is closed. In other words, the focal point of the light beam is not deviated from the disk surface.

At time t=t405, the microcomputer 130 starts measuring the output level of the reflected light detection section 111.

At time t=t406, the microcomputer 130 ends measuring the output level of the reflected light detection section 111, and calculates the average. At that point, the output level of the reflected light detection section 111 is U as shown in FIG. 22(5) (STEP 401).

Further, the microcomputer 130 outputs the tracking error signal method switch command to the detection method switch section 115. The detection method switch section 115 selects the output of the second synthesis section 114 as the output of the detection method switch section 115 (STEP 402).

In this case, the output signal of the detection method switch section 115 has an amplitude larger than the output signal of the second synthesis section 114 obtained by the reflected light detection section 111 synthesizing the push-pull TE when the DVD-ROM is loaded, since the pit depth of the disk is about λ/6 (λ is the wavelength of a light beam). As shown In FIG. 22(4), the output signal of the detection method switch section 115 is a sine-wave signal having the maximum value P and the minimum value Q.

The second amplitude measurement section 116 detects the maximum P and minimum Q of the output signal of the detection method switch section 115, determines the difference (P−Q), and outputs it to the microcomputer 130 (STEP 403).

The microcomputer 130 stores the output (P–Q) of the second amplitude measurement section 116 (STEP 404).

At time t=t407, the microcomputer 130 sets the output of the second amplitude measurement section 116 to zero in accordance with the clear signal. Further, the microcomputer 130 outputs to the detection method switch section 115 the tracking error signal detection method switch command in which the output of the detection method switch section 115 is switched to the phase difference TE which is the output of the tracking error detection section (phase difference method) 110-b. The detection method switch section 115 outputs the phase difference TE to the second amplitude measurement section 116. At that point, the disk has no pit, so that there is no intensity distribution of the reflected light from the disk which enters the four-way split light detection section 108, even when the focal point of a light beam passes through the track. Therefore, the output signal of the detection method switch section 115 has no change in amplitude as shown in FIG. 22(4) (STEP 405).

The second amplitude measurement section 116 detects the maximum value and minimum value of the output signal of the detection method switch section 115, both of which are zero, determines zero as a measured amplitude value, and outputs it to the microcomputer 130 (STEP 406).

The microcomputer 130 stores the output zero of the second amplitude measurement section 116 (STEP 407).

At time t=t408, the microcomputer 130 performs calculation given by the following expression (4) based on the average output value U of the reflection light detection section 111, the amplitude (P–Q) of the second synthesis section 114 obtained by synthesizing the push-pull TE with the output signal of the reflected light detection section 111, and the phase difference TE amplitude zero stored in STEPs 401, 404, and 407, respectively:

$$X2=\{(P-Q)/0(\text{zero})\}/U \quad (4).$$

The microcomputer 130 compares the calculation result X2 based on expression (4) with the predetermined value C2 preset by the microcomputer 130. When the calculation result X2 is larger than the predetermined value C2, it is determined that the loaded disk is a readable-and-writable disk, i.e., a DVD-RAM (STEP 409).

At time t=t409, the microcomputer 130 determines that the disk loaded in the recording/reproducing apparatus is a DVD-RAM, and therefore outputs to the detection method switch section 115 the tracking error signal detection method switch command for changing the tracking error signal detection method to the push-pull method. The output signal of the second synthesis section 114 is input to the microcomputer 130. The microcomputer 130 outputs to the optical power regulation section 127 the optical power regulation command for causing the irradiation section 101 to emit a light beam having a wavelength of 650 nm and an optical power of 1.0 mW. The irradiation section 101 emits a light beam having a wavelength of 650 nm and a power of 0.5 mW in accordance with the output signal of the microcomputer 130.

The microcomputer 130 observes the output signal of the second synthesis section 114 which is the output of the detection method switch section 115, and outputs the tracking attraction command to the tracking driving switch section 124 when the deviation of the focal point of the light beam from the track is zero, i.e., the output signal of the second synthesis section is zero. The tracking driving switch section 124 switches the input signal to the tracking driving circuit 125 to the output of the tracking phase compensation 123, thereby closing the tracking loop. That is, the tracking attraction operation is performed (STEP 500).

After the tracking attraction, the microcomputer 130 outputs to the disk motor driving section 129 the disk motor control command for causing the linear velocity to be constant. The disk motor 128 rotates the disk 100 at a constant linear velocity in accordance with the output of the microcomputer 130.

In this example, the following calculation is performed based on the average value (ASave) of the outputs of the reflected light detection section 111, the push-pull amplitude TE, and the phase difference TE amplitude determined in STEPs 401, 403, and 405, respectively:

$$\{(\text{push-pull } TE \text{ amplitude/phase difference } TE \text{ amplitude})/\text{ASave}\}.$$

STEP 401 may be omitted, so that (push-pull $TE$ amplitude/phase difference $TE$ amplitude)

is compared with the comparative value C2 by the microcomputer 130. The microcomputer 130 may determine RAM/ROM based on the difference in quantity between the values. In this way, the above-described same effects are obtained.

Note that the comparative value C2 is designed so as to satisfy the following expression:

$$X1'>C2>X2'$$

where X1' and X2' are described in expressions (2) and (3), respectively.

Alternatively, the output signal of the detection method switch section 115 may be input to the microcomputer 130. Only STEP 402 in this example may be performed, so that the RAM/ROM determination may be performed based on the result from the comparison of the output of the detection method switch section 115 with the comparative value C2, i.e., the push-pull TE signal with the comparative value C2. This leads to achievement of the above-described same effects.

Note that the comparative value C2 is designed so as to satisfy the following expression:

$$(P-Q)<C2<(K-L)$$

as shown in FIGS. 23(2)(a) and (2)(c).

Figure 34:
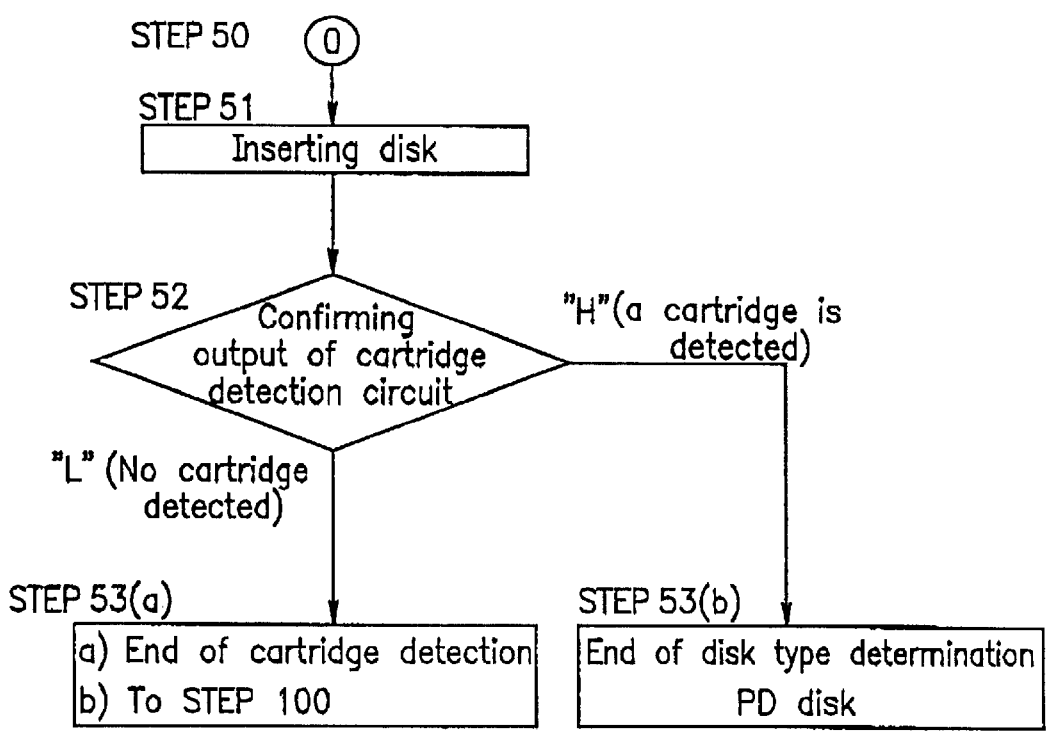
FIG. 34 is a diagram showing a cartridge detection method.

Hereinafter, the detailed description of the cartridge detection in STEP 50 will be described with reference to FIGS. 32 through 34.

Figure 32:
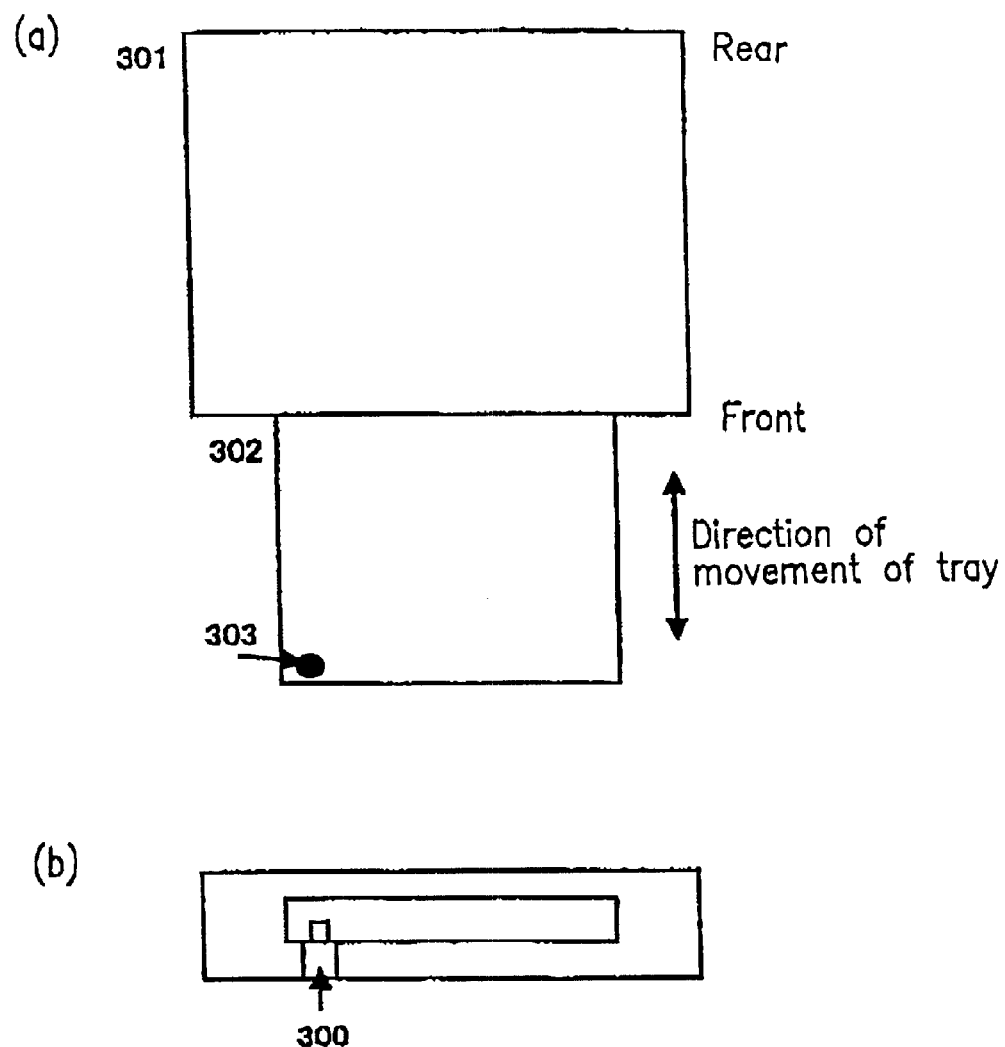
FIG. 32 is a diagram showing an outline of the recording/reproducing apparatus shown in FIG. 1.

FIG. 32 is a diagram showing an outline of the recording/reproducing apparatus shown in FIG. 1. Specifically, FIG. 32(a) is a diagram showing the recording/reproducing apparatus shown in FIG. 1 viewed from above when a tray 302 is opened so as to load a disk into the apparatus. FIG. 32(b) to a diagram showing the recording/reproducing apparatus shown in FIG. 1 viewed from the front.

Reference numeral 301 indicates a housing of the recording/reproducing apparatus shown in FIG. 1. The housing 301 includes the tray 302 for loading a disk. The tray 302 can move toward the front and rear sides of the housing 301. A disk can be loaded on the tray 302 when the tray 302 is positioned beyond a predetermined position toward the front side.

When the tray 302 moves toward the rear side and is housed in the housing 301, the recording/reproducing apparatus comes into a state where information can be written to or read from the disk. The tray 302 is provided with a detection hole 303 for detecting a cartridge. The cartridge detection section 300 as well as the tray 302 are housed in the housing 301.

Hereinafter, the mechanism for detecting the cartridge will be described.

FIG. 33(a) is a diagram showing the tray 302 viewed from above on which a disk housed in the cartridge is loaded. FIG. 33(b) is a diagram showing the tray 302 and the cartridge detection section 300 shown in FIG. 33(a), viewed from the front. FIG. 33(a) is a diagram showing a detection circuit of the cartridge detection section 300.

FIG. 33(d) is a diagram showing the tray 302 viewed from above an which a disk, which is not housed in the cartridge, is loaded. FIG. 33(e) is a diagram showing the tray 302 and the cartridge detection section 300, viewed from the front. FIG. 33(f) is a diagram showing the detection circuit of the cartridge detection section 300 when a disk, which is not housed in the cartridge, is loaded.

Hereinafter, the configuration of the cartridge detection circuit 300 will be described.

The cartridge detection section 300 includes a contact mechanism 300-a, a support spring 300-b, and a detection switch 300-a. The contact mechanism 300-a contacts with the cartridge via the detection hole 303 when the tray 302 is housed in the housing 301. The support spring 300-b mechanically supports the contact mechanism 300-a. The detection switch 300-c closes only when the contact mechanism 300-a contacts with the cartridge.

As shown in FIG. 33(a), when the disk housed in the cartridge is loaded, the detection hole 302 is blocked by the cartridge. As a result, a cartridge contacting portion of the contact mechanism 300-a contacts with the cartridge at a detection hole 303 position as shown in FIG. 33(b). Therefore, the detection switch 300-c is closed. Since the detection switch 300-a is closed, the cartridge detection circuit outputs a output voltage +5 V, i.e., the "H" level to the microcomputer 130 as shown in FIG. 33(c).

However, as shown in FIG. 33(d), when a disk, which is not housed in a cartridge, is loaded, the detection hole 302 is not blocked since a cartridge is not loaded on the tray 302. Therefore, the cartridge contacting portion of the contact mechanism 300-a approaches a position closer to the disk than the detection hole 303 due to the spring force of the support spring 300-b. The detection switch 300-c is thus opened. Since the detection switch 300-c is opened, the cartridge detection circuit outputs an output voltage 0 V, i.e., the "L" level to the microcomputer 130 as shown in FIG. 33(f).

The microcomputer 130 detects the presence of a cartridge when the output signal of the cartridge detection circuit is the "H" level, and determines that the type of the loaded disk is PD.

The microcomputer 130 detects the absence of a cartridge when the output signal of the cartridge detection circuit is the "L" level, and determines that the type of the loaded disk is other than PD.

Hereinafter, the cartridge detection method will be described with reference to FIG. 34.

A disk is loaded on the tray 302 and then inserted into the recording/reproducing apparatus (STEP 51).

The microcomputer 130 performs cartridge detection in accordance with the output signal of the cartridge detection circuit. When the output signal of the cartridge detection circuit has the "H" level, the microcomputer 130 determines that the disk is housed in a cartridge (STEP 52), and determines that the disk is a PD. The disk type determination is ended.

When the output signal of the cartridge detection circuit has the "L" level, the microcomputer 130 determines that the disk is not housed in a cartridge (STEP 52), and determines that the disk is other than a PD. The determination processes in STEP 100 and the subsequent STEPs are performed.

EXAMPLE 2

Figure 25:
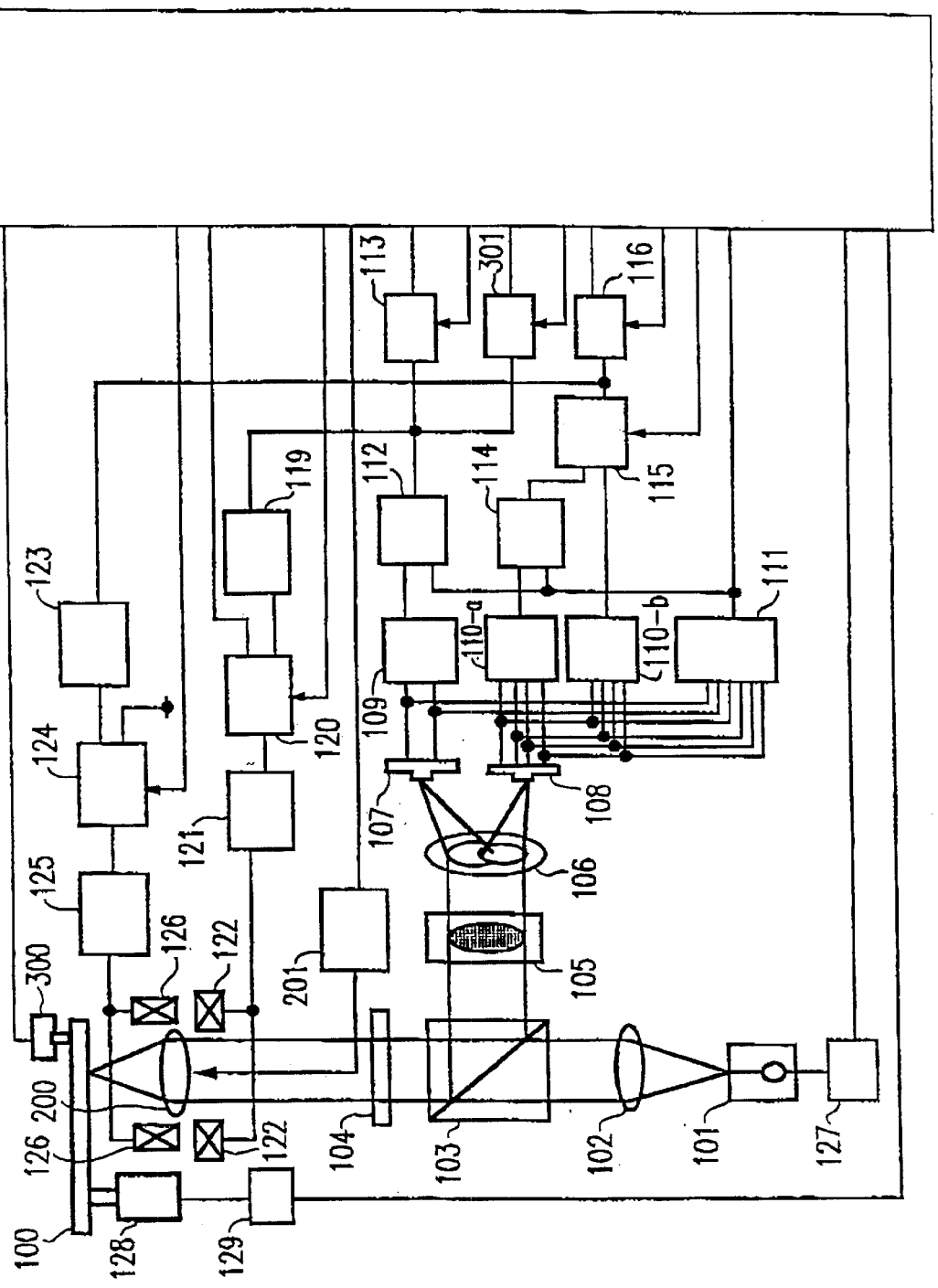
FIG. 25 is a diagram showing a recording/reproducing apparatus according to the present invention.

FIG. 25 is a diagram showing another recording/reproducing apparatus according to the present invention.

In Example 2, it is determined whether a disk is a single-layer disk or a multi-layer disk. Here, the single layer disk means a DVD-ROM (a single layer), a DVD-RAM, or the like. The multi-layer disk means a DVD-ROM (a dual layer) disk. Note that when a disk loaded in the recording/reproducing apparatus is a PD or CD, the type of the disk may be determined by a method similar to that in Example 1.

In Example 2, the same components and steps as those in Example 1 are indicated by the same numerals as those in Example 1, and the description is generally omitted. The differences in mechanism between the recording/reproducing apparatus shown in FIG. 25 and the recording/reproducing apparatus shown in FIG. 1 will be described.

In the recording/reproducing apparatus shown in FIG. 1, the information recording surface count determination (STEP 300) is performed in the following way. The output signal of the first synthesis section 112 is input to the microcomputer 130, and compared with the predetermined value preset in the comparison section of the microcomputer 130. The comparison section counter in the microcomputer 130 counts the comparison result. The microcomputer 130 can determine the number of information recording surfaces based on the count number counted by the comparison section counter.

In this example, as shown in FIG. 25, the first synthesis section 112 inputs the output signal of the first synthesis section 112 to a counter 301. The counter 301 counts the number of in-focus positions of the disk 100 based on the output signal of the first synthesis section 112, and outputs the count number to the microcomputer 130. The microcomputer 130 determines the information recording surface count based on the output of the counter 301.

Hereinafter, a method for counting the number of in-focus positions of the disk 100 using the counter 301 will be described with reference to FIGS. 26 through 30.

The case when a DVD-ROM (a single layer) of which the information recording surface count is one is loaded in the recording/reproducing apparatus shown in FIG. 26 will be described with reference to FIGS. 28 and 29.

Figure 28:
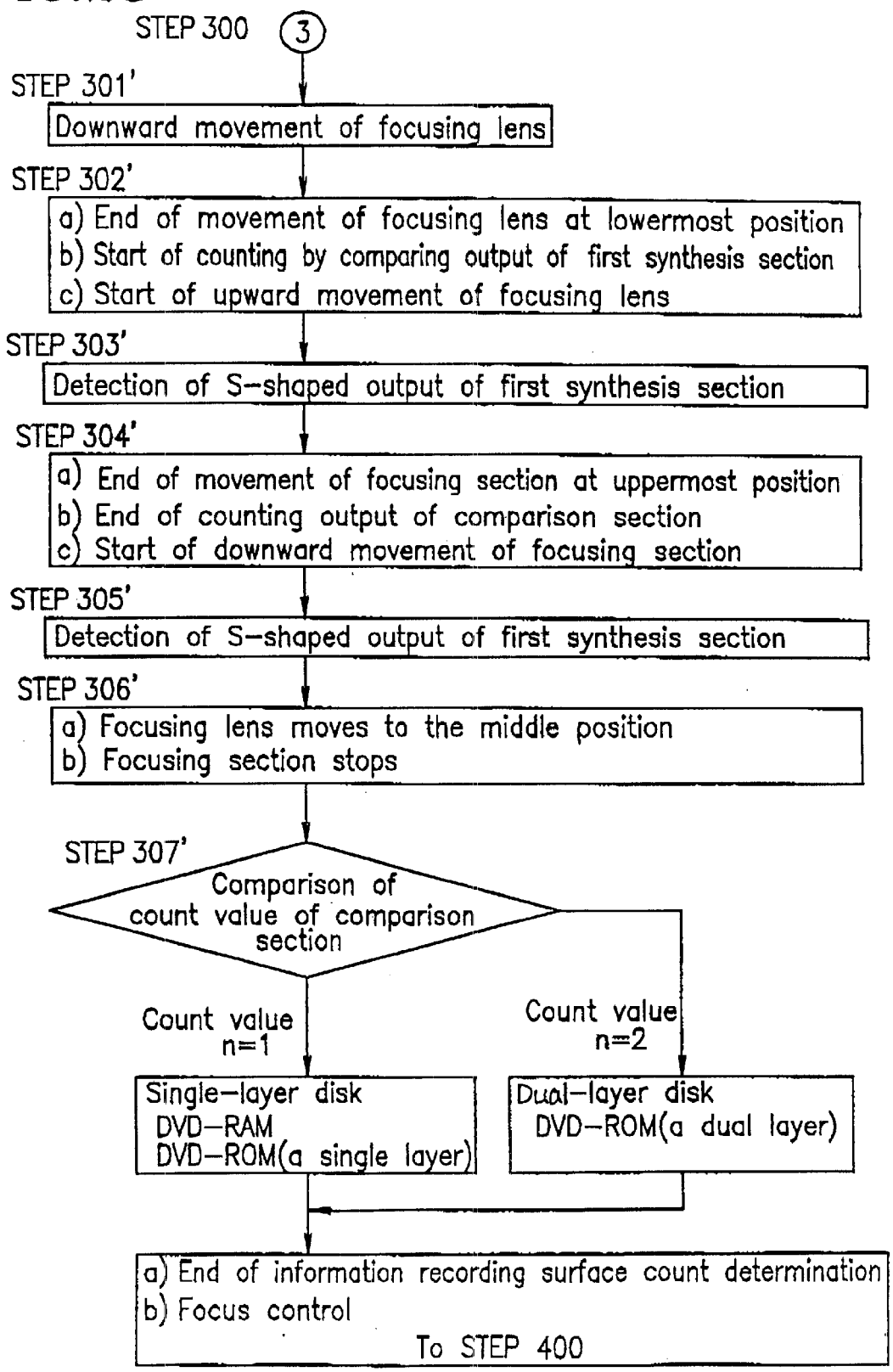
FIG. 28 is a diagram showing a flowchart of the information recording surface count determination method.

FIG. 28 is a diagram showing a flowchart of the information recording surface count determination method. FIG. 29 is a time chart of output signals output from the components when the information recording surface count is determined.

Figure 29:
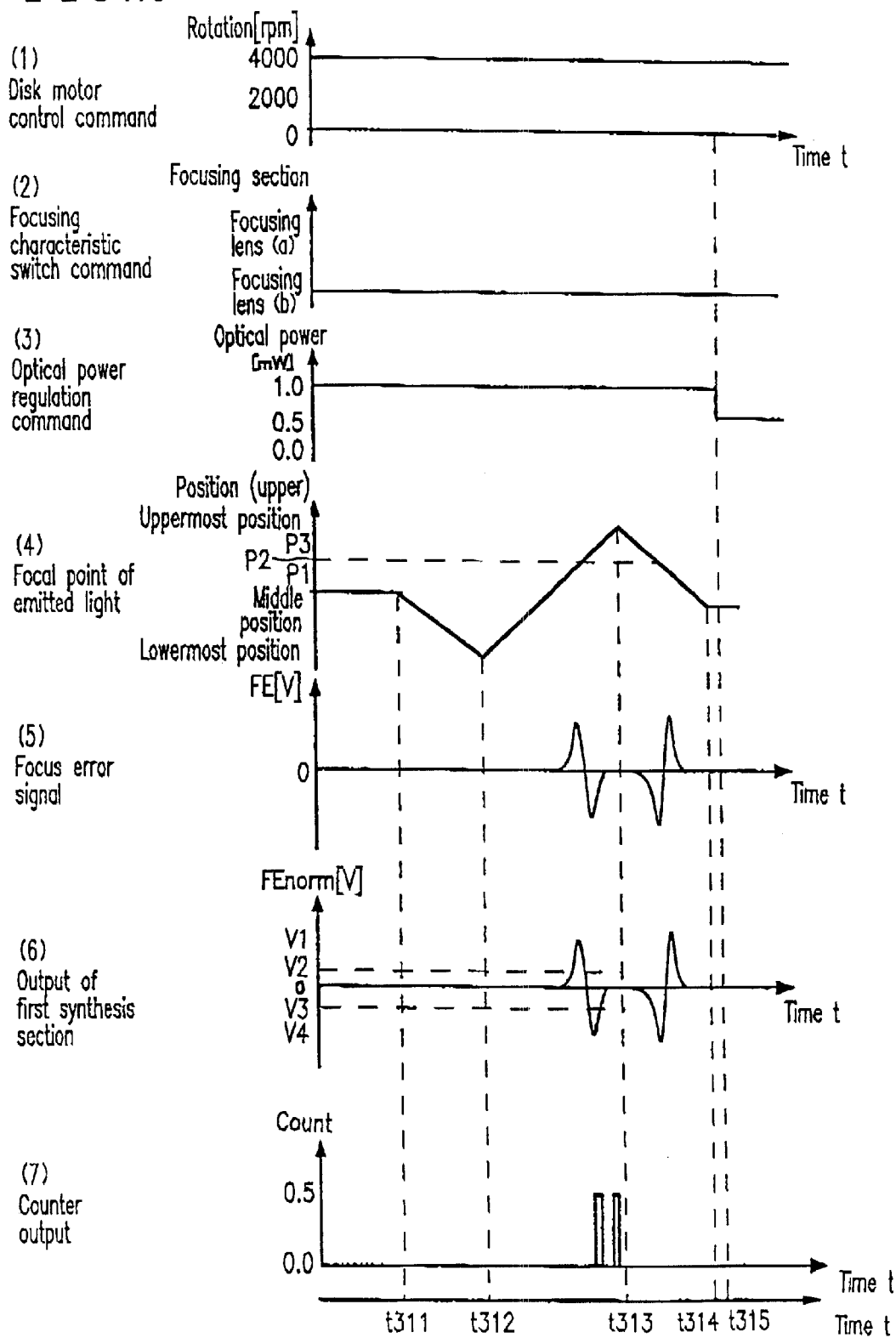
FIG. 29 is a diagram showing a time chart of output signals output from the components when the information recording surface count of a disk is determined.

Specifically, FIG. 29(1) is a diagram showing the relationship between the disk motor control command output from the microcomputer 130 to the disk motor driving section 129, and time. FIG. 29(2) is a diagram showing the relationship between the focusing characteristic switch command of the microcomputer 130 output to the focusing characteristic switch section 201 for switching the focusing characteristic of the focusing section 200 between focusing lens (a) 200-a and (b) 200-b, and time. The focusing lens (a) 200-a of the focusing section 200 is designed to bring a light beam into a focus on a thick disk having a substrate thickness of 0.6 mm. The focusing lens (b) 200-b of the focusing section 200 is designed to bring a light beam into a focus on a thick disk having a substrate thickness of 1.2 mm. FIG. 29(3) is a diagram showing the relationship between the optical power regulation command output from the microcomputer 130 to the optical power regulation section 127 which regulates an optical beam power emitted by the irradiation section 101, and time. FIG. 29(4) is a diagram showing the relationship between the focal point of the emitted light, and time. FIG. 29(5) is a diagram showing the relationship between an output signal of the focusing error detection section 109, and time. FIG. 29(6) is a diagram showing the relationship between the output signal of the first synthesis section 112, and time. FIG. 29(7) is a diagram showing the relationship between the output signal of the counter 301, and times At time t=t311, the microcomputer 130 outputs the up/down movement command, which causes a focusing lens (a) 200-a to withdraw from the disk surface, to the focus driving circuit 121 via the focus driving switch section 120. In response to this, the focus driving circuit 121 drives the focusing lens (a) 200-a so that the focal point of the emitted light withdraws from the in-focus position P2 of the disk surface, as shown in FIG. 29(4) (STEP 301').

At time t=t312, the counter 301 starts counting the number of in-focus positions of the disk 100 based on the output signal of the first synthesis section 112, The microcomputer 130 outputs the up/down movement command, which causes the focusing lens (a) 200-a to approach the disk surface, to the focus driving circuit 121 via the focus driving switch section 120. In response to this, the focus driving circuit 121 starts driving the focusing lens (a) 200-a so that the focal point of the emitted light approaches the disk surface (STEP 302').

The focal point of the emitted light continues to approach the disk 100. Eventually, the focal point of the emitted light passes through the in-focus position P2. In this case, the focusing error detection section 109 detects an S-shaped focusing error signal as shown in FIG. 29(5). The first synthesis section 112 outputs an S-shaped signal as shown in FIG. 29(6) to the counter 301.

Hereinafter, a method for counting the number of in-focus positions of the disk 100, performed by the counter 301, will be described with reference to FIGS. 26 and 27.

Figure 26:
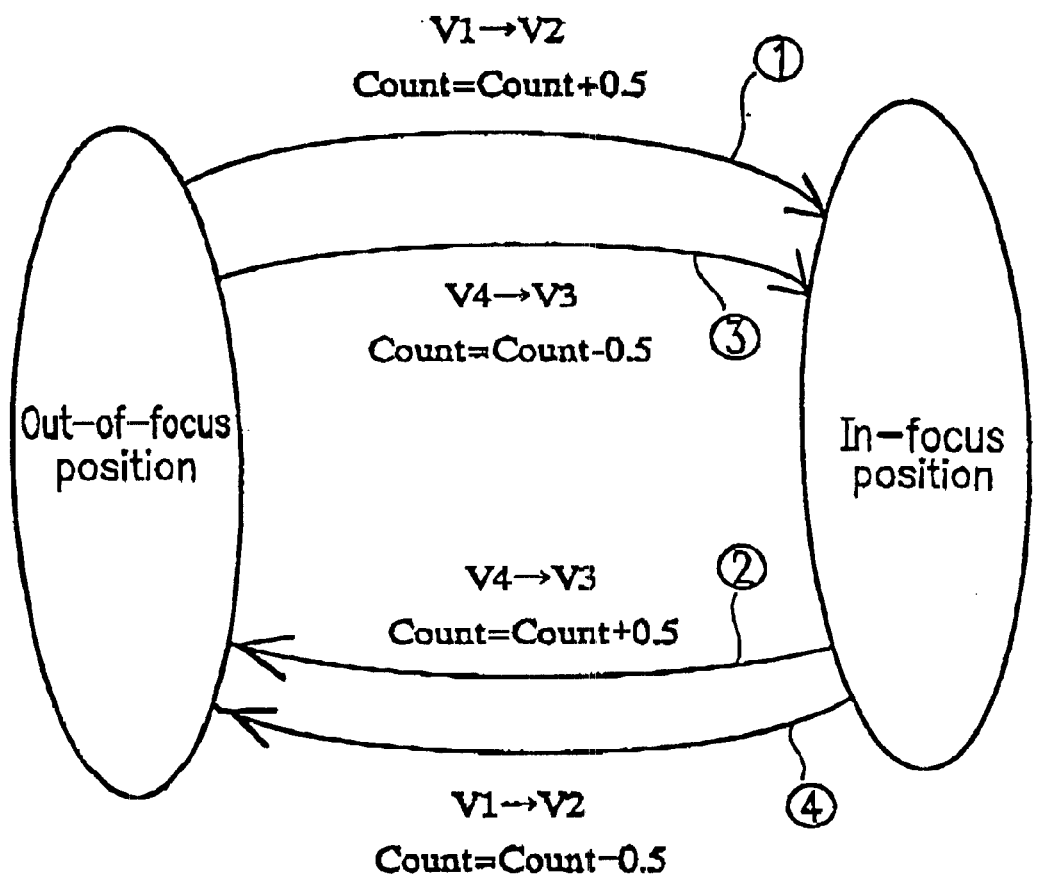
FIG. 26 is a diagram showing the state transition of an output signal of a first synthesis section 112.

FIG. 26 is a diagram showing the state transition when the counter 301 counts the number of in-focus positions of the disk 100.

Figure 27:
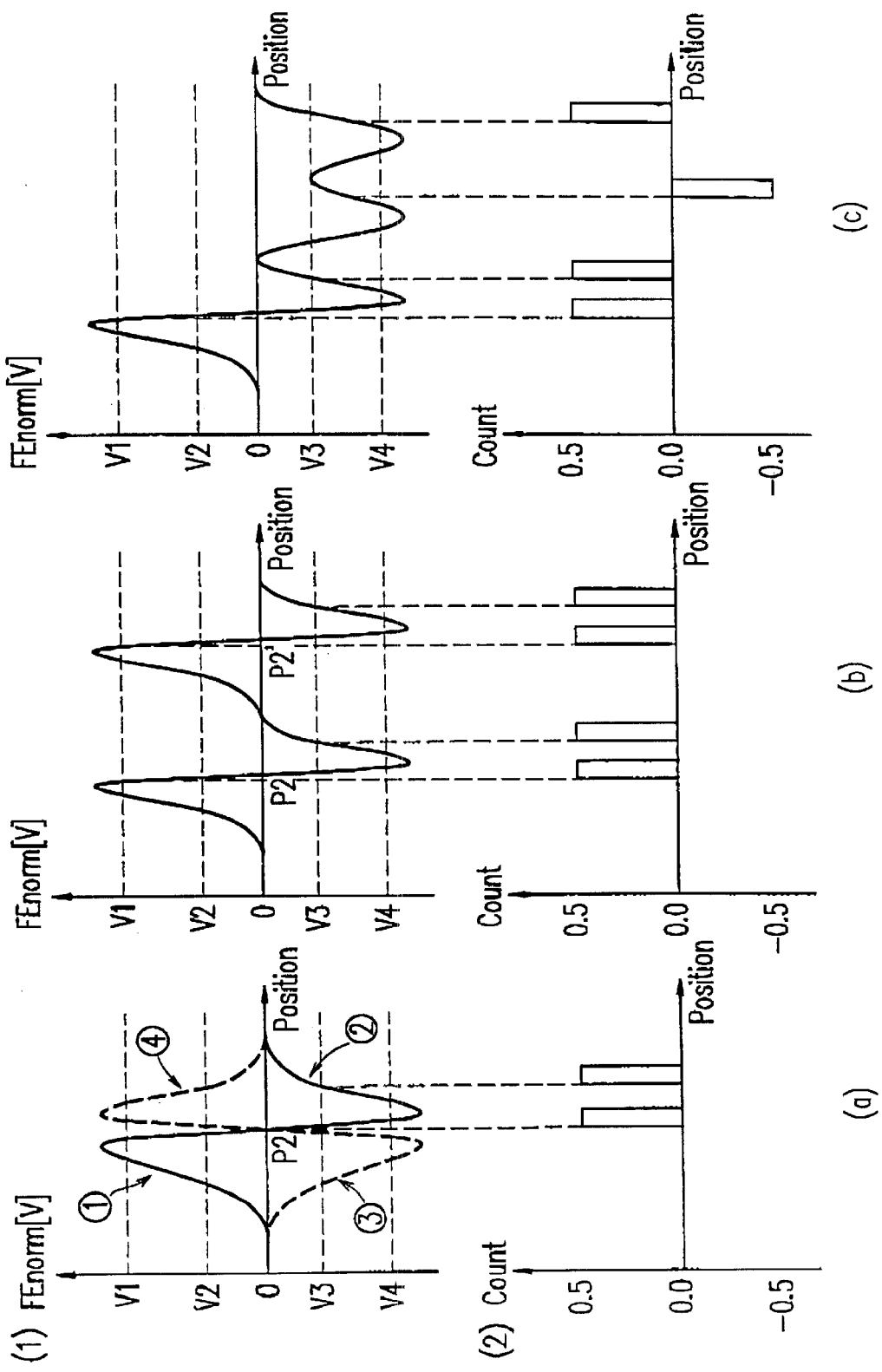
FIG. 27 is a diagram showing an output signal of a first synthesis section 112.

FIG. 27(1)(a) is a diagram showing the relationship between the output signal of the first synthesis section 112 and the position of the focal point of a light beam when the light beam approaches the recording surface of the disk 100 of which the information recording surface count is one, and the focal point of the light beam passes through the in-focus position P2. FIG. 27(2)(a) is a diagram showing the relationship between the output signal of the counter 301 and the position of the focal point of a light beam when the light beam approaches the recording surface of the disk 100 of which the information recording surface count is one, and the focal point of the light beam passes through the in-focus position P2. FIG. 27(1)(b) is a diagram showing the relationship between the output signal of the first synthesis section 112 and the position of the focal point of a light beam when the light beam approaches the recording surface of the disk 100 of which the information recording surface count is two and the focal point of the light beam passes through the first in-focus position P2 and then through the second in-focus position P2'. FIG. 27(2)(b) is a diagram showing the relationship between the output signal of the counter 301 and the position of the focal point of a light beam when the light beam approaches the recording surface of the disk 100 of which the information recording surface count is two, and the focal point of the light beam passes through the first in-focus position P2 and then through the second in-focus position P2'.

The counter 301 observes the state transition of the first synthesis section 112 when the focal point of the light beam approaches the recording surfaces of the disk 100, i.e., the focal point of the light beam approaches from an out-of-focus position to an in-focus position.

After the focal point of the light beam is positioned at an out-of-focus position, when the output signal of the first synthesis section 112 transitions from V1 to V2 (①), the counter 301 determines that the focal point of the light beam moves from the out-of-focus position to the in-focus position. Then, the counter 301 is incremented by 0.5. After the focal point of the light beam is positioned at an in-focus position, when the output signal of the first synthesis section 112 transitions from V4 to V3 (②), the counter 301 determines that the focal point of the light beam moves from the in-focus position to the out-of-focus position. Then, the counter 301 is incremented by 0.5. After the focal point of the light beam is positioned at an in-focus position, when the output signal of the first synthesis section 112 transitions from V1 to V2 (④), the counter 301 determines that the focal point of the light beam moves from the in-focus position to the out-of-focus position. Then, the counter 301 is decremented by 0.5. After the focal point of the light beam is positioned at an out-of-focus position, when the output signal of the first synthesis section 112 transitions from V4 to V3 (③), the counter 301 determines that the focal point of the light beam moves from the out-of-focus position to the in-focus position. Then, the counter 301 is decremented by 0.5.

For example, when the output signal of the first synthesis section 112 is changed as shown in FIG. 27(1)(b), the total count is two. It is thus determined that the disk loaded in the recording/reproducing apparatus is a two-layer disk.

For example, when the output signal of the first synthesis section 112 is changed as shown in FIG. 27(1)(c), the total count is one. It is thus determined that the disk loaded in the recording/reproducing apparatus is a one-layer disk.

In this example, since the focusing section 200 is initially positioned away from the recording surface of the disk 100, an out-of-focus position is a starting point in the state transition of the output signal of the first synthesis section 112 when the focal point of a light beam approaches the recording surface of the disk 100. Therefore, when the number of information recording surfaces of the disk 100 is one, the total of the output signals of the counter 301 is one as the count result of the counter 301 as shown in FIG. 27(2)(a). When the number of information recording surfaces of the disk 100 is two, the total of the output signals of the counter 301 is two as shown in FIG. 27(2)(b).

Again, the flowchart shown in FIG. 28 will be described.

Since the number of information recording surfaces of the disk loaded in the recording/reproducing apparatus is one, the total of counts of the counter 301 is one as shown in FIG. 29(7). (STEP 303'). In other words, the microcomputer 130 determines that the number of in-focus positions of the disk is one.

At time t=t313, the focal point of the emitted light reaches the uppermost position, when the counter 301 ends counting the number of information recording surfaces of the disk 100 in response to the output signal of the first synthesis section 112. The counter 301 outputs the count number to the microcomputer 130. In this case, the count number (total of the number of counts) is one. After storing the count number, the counter 301 sets the output signal to zero.

Thereafter, the microcomputer 130 outputs the up/down movement command, which causes the focal point of the emitted light to approach the in-focus position P2, to the focus driving section 121 via the focus driving switch circuit 120. In response to this, the focus driving circuit 121 starts driving the focusing lens (b) 200-*b* in such a way as to approach the in-focus position P2 of the disk surface (STEP 304').

The focal point of the emitted light continues to approach the disk 100, and eventually passes through the in-focus position P2. In this case, the first synthesis section 112 detects an S-shaped focusing error normalized signal as shown in FIG. 29(6) again (STEP 305').

At time t=t314, the focusing lens (a) 200-*a* reaches a middle point of the range in which it can move. At that point, the microcomputer 130 ends the up/down movement command (5) to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 306').

The microcomputer 130 determines the information recording surface count based on the output of the counter 301 stored in STEP 304'. At that point, the output signal (the total of counts) of the counter 301 stored by the microcomputer 130 is 1, so that the information recording surface count of the loaded disk is one. That is, it is determined that the information recording surface count of the disk loaded in the recording/reproducing apparatus is one (STEP 307').

The microcomputer 130 determines that the information recording surface count is one, i.e., the disk loaded in the recording/reproducing apparatus is a DVD-ROM (a single layer) or DVD-RAM. In this case, the microcomputer 130 outputs to the optical power regulation section 127 the optical power regulation command for causing the irradiation section 101 to emit a light beam having a wavelength of 650 nm and an optical power of 0.5 mW. The optical power regulation section 127 commands the irradiation section 101 to provide the optical power of the light bean to having a wavelength of 650 nm and an optical power of 0.5 mW.

Further, the microcomputer 130 causes the focusing lens (a) 200-*a* to move so that the focal point of a light beam is not deviated from the disk recording surface. The microcomputer 130 outputs the focus driving switch command to the focus driving switch circuit 120. The input signal to the focus driving circuit 121 is switched to the output of the focus phase compensation 119, thereby closing a focus loop, i.e., performing a focus attracting operation.

Figure 31:
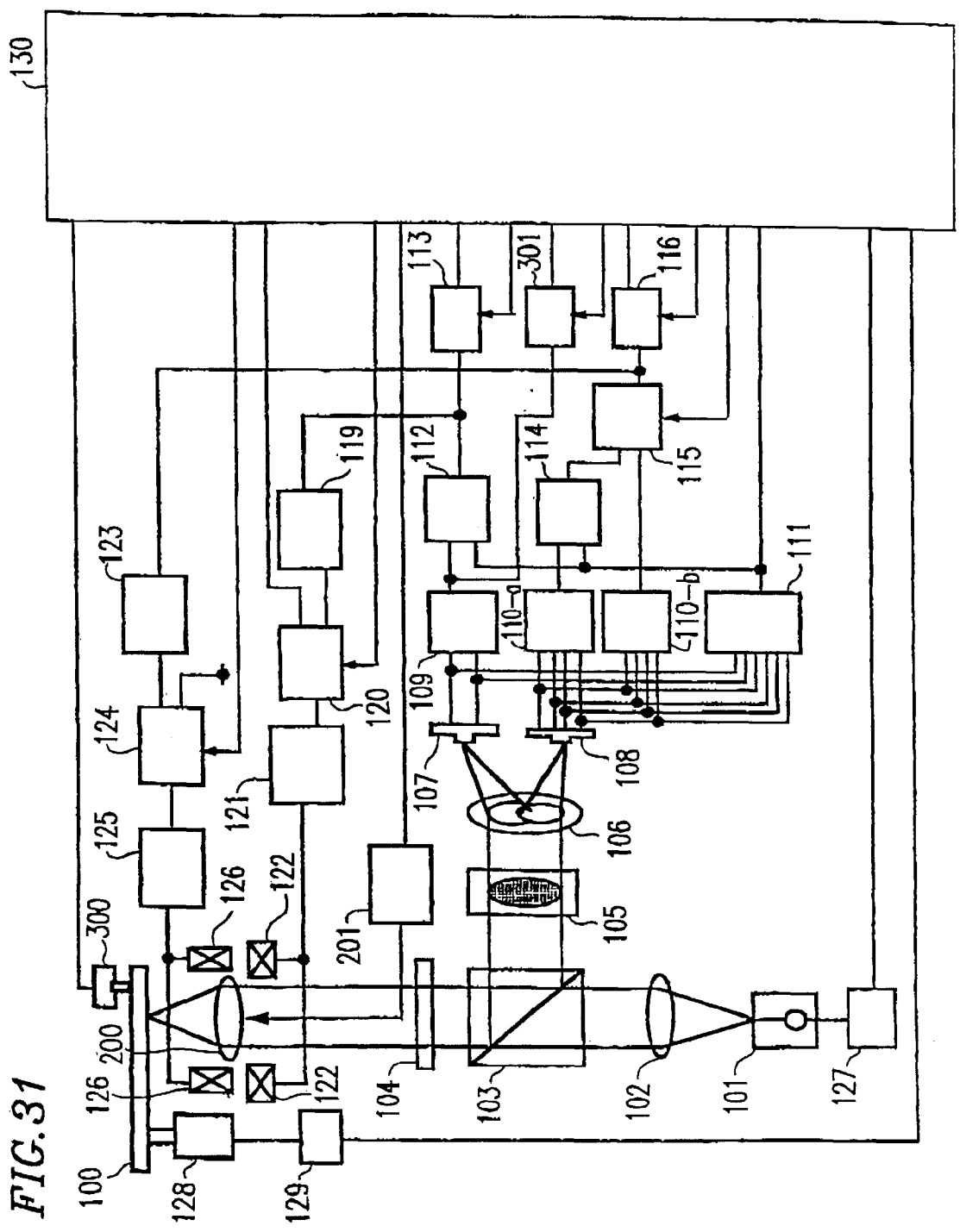
FIG. 31 is a diagram showing a recording/reproducing apparatus according to the present invention.

In this example, the output signal of the first synthesis section 112 obtained by synthesizing the focusing error signal with the output signal of the reflected light detection section 111 is input to the counter 301. Alternatively, as shown in FIG. 31, the output signal of the focusing error detection section 109 may be input to the counter 301. When the focusing lens (a) 200-*a* is moved in such a way as to approach or withdraw from the recording surface of the disk 100, the number of information recording surfaces may be counted by the counter 301 based on the detected focusing error signals. This leads to achievement of the same effects.

Figure 30:
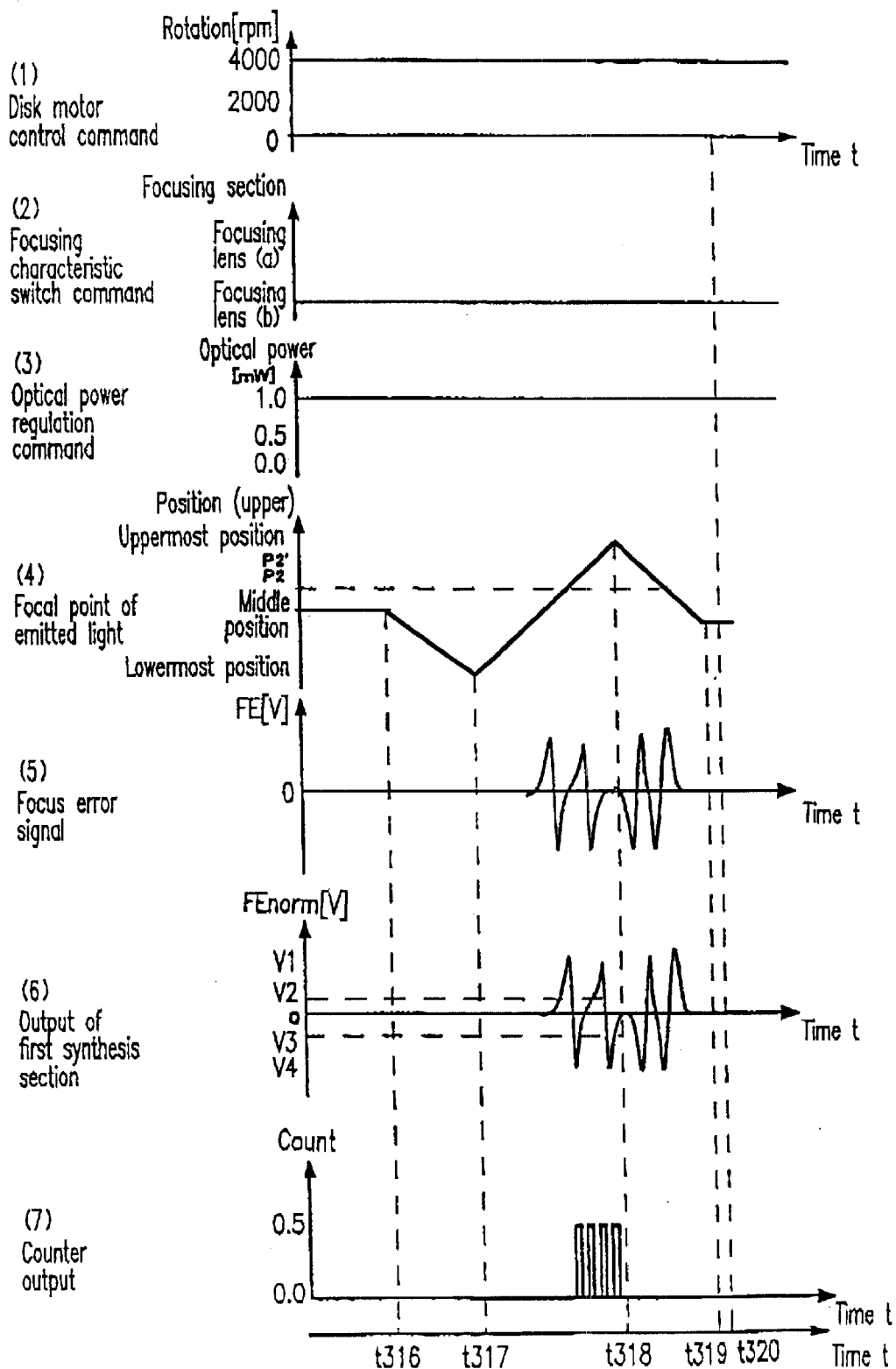
FIG. 30 is a diagram showing a time chart of output signals output from the components when the information recording surface count recorded on a disk is determined.

Hereinafter, the case when a DVD-ROM (a dual layer) disk is loaded as a disk in the recording/reproducing apparatus shown in FIG. 25 will be described with reference to FIGS. 25, 28, and 30.

FIG. 28 is a diagram showing a flowchart of the information recording surface count. FIG. 30 is a time chart of output signals output from the components when the information recording surface count is determined. Specifically, FIG. 30(1) is a diagram showing the relationship between the disk motor control command output to the disk motor driving section 129, and time. FIG. 30(2) is a diagram showing the relationship between the focusing characteristic switch command of the microcomputer 130 output to the focusing characteristic switch section 201 for switching the focusing characteristic of the focusing section 200 between focusing lenses (a) 200-*a* and (b) 200-*b*, and time. The focusing lens (a) 200-*a* of the focusing section 200 is designed to bring a light beam into a focus on a thick disk having a substrate thickness of 0.6 mm. The focusing lens (b) 200-*b* of the focusing section 200 is designed to bring a light beam into a focus on a thick disk having a substrate thickness of 1.2 mm. FIG. 30(3) is a diagram showing the relationship between the optical power regulation command output from the microcomputer 130 to the optical power regulation section 127 which regulates an optical beam power emitted by the irradiation section 101, and time. FIG. 30(4) is a diagram showing the relationship between the focal point of the emitted light, and time. FIG. 30(5) is a diagram showing the relationship between an output signal of the focusing error signal detection section 109, and time. FIG. 30(6) is a diagram showing the relationship between the output signal of the first synthesis section 112, and time. FIG. 30(7) is a diagram showing the relationship between the output signal of the counter 301, and time.

The operation of the components from time t=t316 to 317 is almost the same as that from t=t311 to t312. Therefore, a description thereof is omitted.

At time t=t317, the counter 301 starts counting the number of information recording surfaces of the disk 100. The microcomputer 130 outputs the up/down movement command, which causes the focusing lens (a) 200-*a* to approach the disk surface, to the focus driving circuit 121 via the focus driving switch section 120 in response to this, the focus driving circuit 121 starts driving the focusing lens (a) 200-*a* so that the focal point of the emitted light approaches the disk surface (STEP 302').

The focal point of the emitted light continues to approach the disk 100. Eventually, the focal point of the emitted light passes through the in focus position P2. In this case, the focusing error detection section 109 detects an S-shaped focusing error signal as shown in FIG. 30(5). The first synthesis section 112 outputs an S-shaped signal as shown in FIG. 30(6) to the counter 301.

Further, the focal point of the emitted light passes through the second in-focus position P2'. In this case, the focusing error detection section 109 detects an S-shaped focusing error signal as shown in FIG. 30(5). The first synthesis section 112 outputs an S-shaped signal as shown in FIG. 30(6) to the counter 301 again.

Since the number of information recording surfaces of the disk loaded in the recording/reproducing apparatus is two, i.e., the number of in-focus positions is two, the counter 301 outputs two counts as the count value (the total of counts) to the microcomputer 130 (STEP 303').

At time t=t318, the focal point of the emitted light reaches the uppermost position, when the counter 301 ends counting the number of information recording surfaces of the disk 100. The counter 301 outputs the count number to the microcomputer 130. In this case, the count number (the number of counts) is one. After storing the count number, the counter 301 sets the output signal to zero.

Thereafter, the microcomputer 130 outputs the up/down movement command, which causes the focal point of the emitted light to approach the in-focus position P2, to the focus driving section 121 via the focus driving switch circuit 120. In response to this, the focus driving is circuit 121 starts driving the focusing lens (b) 200-*b* in such a way as to approach the in-focus position P2 of the disk surface (STEP 304').

The focal point of the emitted light continues to approach the disk 100, and eventually passes through the second in-focus position P2, the first in-focus position P2, and the position P1 in this order. In this case, the first synthesis section 112 detects an S-shaped focusing error normalized signal as shown in FIG. 30(6) again (STEP 305').

At time t=t319, the focusing lens (a) 200-*a* reaches a middle point of the range in which it can move. At that point, the microcomputer 130 ends the up/down movement command to the focus driving circuit 121, via the focusing driving switch section 120. The focus driving circuit 121 sets the driving output to the focusing lens (a) 200-*a* to zero. Thus, the focusing lens (a) 200-*a* stops at the neutral point (STEP 306').

The microcomputer 130 determines the information recording surface count based on the output signal (the total of counts) of the counter 301 stored in STEP 304'. At that point, the output signal (the total of counts) of the counter 301 stored by the microcomputer 130 is two, so that the information recording surface count of the loaded disk is two. That is, it is determined that the disk loaded in the recording/reproducing apparatus is a DVD-ROM (a dual layer) disk (STEP 307').

The microcomputer 130 determines that the number of information recording surfaces is two. In this case, the microcomputer 130 outputs to the optical power regulation section 127 the optical power regulation command for causing the irradiation section 101 to emit a light beam having a wavelength of 650 nm and an optical power of 1.0 mW. The optical power regulation section 127 commands the irradiation section 101 to provide the optical power of the light beam to having a wavelength of 650 nm and an optical power of 1.0 mW.

Further, the microcomputer 130 causes the focusing lens (a) 200-*a* to move so that the focal point of a light beam is not deviated from the disk surface. The microcomputer 130 outputs the focus driving switch command to the focus driving switch section 120. The input signal to the focus driving circuit 121 is switched to the output of the focus phase compensation 119, thereby closing a focus loop, i.e., performing a focus attracting operation.

Industrial Applicability

According to the present invention, the recording/reproducing apparatus can perform at least one of the steps of recording information onto a plurality of types of optical disks and reproducing information from a plurality of types of optical disks, and determines the types of the disks correctly. For example, the substrate thickness, information recording surface count, and capability of recording and reproducing of a disk is determined by the present invention. As a result, at least one of the focusing characteristic of the focusing section, the light output of a light beam, the number of rotations or rotation method of the disk motor, the tracking error signal detection method, and the gain characteristic of the focusing control for controlling the positional deviation of the focal point of a light beam from the track can be switched. As a result, a single recording/reproducing apparatus can record and reproduce disks compliant with different standards.

When the focusing section for bringing a light beam into a focus on a disk is moved in such a way as to approach or withdraw from the recording surface of the disk, the amplitude of the focusing error signal is small due to influence of spherical aberration when the focus distance of the focusing section is different from the substrate thickness of the disk to be recorded or reproduced. Therefore, the focusing error signal when the focusing section is moved in such a way as to approach or withdraw from the recording surface of the disk is smaller than a predetermined value. When the focus distance of the focusing section and the substrate thickness of a disk to be reproduced are corrected by changing the focusing characteristic of the focusing section, the focusing section for bringing a light beam into a focus on the disk is moved in such a way as to approach or withdraw from the recording surface of the disk. In this case, the amplitude of the focusing error signal is larger than in the case when the substrate thickness is different. When the focusing section is moved in such a way as to approach or withdraw from the recording surface of the disk, the amplitude of the focusing error signal is larger than the predetermined value.

Therefore, when the focusing section is moved in such a way as to approach or withdraw from the recording surface of the disk, if the focusing error signal is detected by changing the focusing characteristic of the focusing section, the substrate thickness of a disk to be recorded or reproduced can be determined.

The first step of the present invention can determine the amplitude of the signal obtained by synthesizing the focus error signal with part or all of reflected or transmitted light from the disk. When the focusing section is moved in such a way as to approach or withdraw from the recording surface of the disk, the substrate thickness of the disk can be determined based on the amplitude of the above-described synthesized signal. Using the above-described method, even when the light beam output emitted to the disk is extremely changed, the substrate thickness of the disk can be determined more reliably by synthesizing the focus error signal with part or all of reflected or transmitted light from the disk and measuring the amplitude of the above-described synthesized signal.

The second step of the present invention can determine the number of recording surfaces of a disk based on the number of detections of a predetermined waveform of the focusing error signal when the focusing section is moved in such a way as to approach or withdraw from the recording surface of the disk. Using the above-described method, information on the number of recording surfaces does not need to be read out from the control track. Further, the type of a disk can be determined without focus control operation in which the position of the focal point of a light beam is controlled with the recording surface of the disk. Therefore, the time which it takes to determine the type of a disk can be largely reduced.

Another second step of the present invention can determine the number of recording surfaces of a disk based on the number of detections of in-focus positions when the focusing section is moved in such a way as to approach or withdraw from the recording surface of the disk. Using the above-described method, information on the number of recording surfaces does not need to be read out from the control track. Further, the type of a disk can be determined without focus control operation in which the position of the focal point of a light beam is controlled with the recording surface of the disk. Therefore, the time which it takes to determine the type of a disk can be largely reduced.

What is claimed is:

1. A method for determining the type of a disk, including:
a first step of determining a substrate thickness of the disk based on a focusing error signal representing a positional deviation of the focal point of a light beam from a recording surface of the disk, when a focusing section is moved in such a way as to approach or withdraw from the recording surface of the disk, the focusing section including a plurality of focusing characteristics for bringing the light beam into a focus on the disk;
a second step of determining the number of recording surfaces of the disk using a focusing error signal when the focusing section is moved in such a way as to approach or withdraw from the recording surface of the disk; and
a third step of determining whether or not the disk can be recorded and reproduced using a tracking error signal representing a positional deviation of the focal point of a light beam from a track of the disk, when the light beam crosses the track,
wherein after the first step is performed, the second stop and the third step are performed in the descending order or in the ascending order while the focusing characteristics of the focusing section are switched in accordance with the substrate thickness of the disk determined by the first step.

2. A disk type determination method according to claim 1, wherein in the first step, the substrate thickness of the disk is determined based on a signal obtained by synthesizing the focusing error signal when the focusing section is moved in such a way as to approach or withdraw from the recording surface of the disk with at least part of one of reflected or transmitted light from the disk.

3. A disk type determination method according to claim 1, wherein in the first step, the substrate thickness of the disk is determined based on the amplitude of a signal obtained by synthesizing the focusing error signal when the focusing section to moved in such a way as to approach or withdraw from the recording surface of the disk with at least part of one of reflected or transmitted light from the disk.

4. A disk type determination method according to claim 1, wherein in the second step, the number of the recording surfaces of the disk is determined based on the number of detections of a change from an intermediate value to a peak value and a change from the bottom value to the intermediate value of the focusing error signal, in a predetermined order, when the focusing section is moved in such a way as to approach or withdraw from the recording surface of the disk.

5. A disk type determination method according to claim 4, wherein a change from an intermediate value to a peak value of the focusing error signal is detected by comparing the focusing error signal with a first reference value;
a change from the peak value to the intermediate value of the focusing error signal is detected by comparing the focusing error signal with a second reference value;
the first reference value is defined to be larger than the intermediate value of the focusing error signal; and
the second reference value is defined to be smaller than the intermediate value of the focusing error signal.

6. A disk type determination method according to claim 1, wherein the second step includes the steps of: determining one of a first internal state or a second internal state based on a position, on which the light beam is brought into a focus, when the focusing section is moved in such a way as to approach or withdraw from the recording surface of the disk; and calculating by adding or subtracting a predetermined value based an the determined internal state and the focusing error signal,
wherein the internal state determining step and the calculating step are repeated in at least a part of an interval where the focusing section is moved in such a way as to approach or withdraw from the recording surface of the disk; and the number of recording surfaces of the disk is determined based on the result of the calculation.

7. A disk type determination method according to claim 6, wherein the first internal state is where the focal point of the light beam is in focus; and the second internal state is where the focal point of the light beam is out of focus.

8. A disk type determination method according to claim 6, wherein when the focusing section is moved in such a way as to approach or withdraw from the recording surface of the disk, the internal state determining step determines that the internal state transitions to the first or second state in the case of detecting any one of transition from the first reference value to the second reference value or transition from the fourth reference value to the third reference value.

9. A disk type determination method according to claim 8, wherein the first reference value is larger than the second reference value and the third reference value is larger than the fourth reference value; or the first reference value is smaller than the second reference value and the third reference value is smaller than the fourth reference value.

10. A disk type determination method according to claim 6, wherein in the calculating step:
the predetermined value is added when the focusing error signal transitions from the fourth reference value to the third reference value, in the second internal state;
the predetermined value is added when the focusing error signal transitions from the first reference value to the second reference value, in the first internal state;
the predetermined value is subtracted when the focusing error signal transitions from the fourth reference value to the third reference value, in the first internal state; and
the predetermined value is subtracted when the focusing error signal transitions from the first reference value to the second reference value, in the second internal state.

11. A disk type determination method according to claim 10, wherein the first reference value is larger than the second reference value and the third reference value is larger than the fourth reference value; or the first reference value is smaller than the second reference value and the third reference value is smaller than the fourth reference value.

12. A disk type determination method according to claim 6, wherein in the second step, when the focusing section starts moving in such a way as to approach or withdraw from the recording surface of the disk, the position of the focusing section is away from the recording surface of the disk; and the focusing section is set in the first or second internal state.

13. A disk type determination method according to claim 1, wherein the third step determines whether or not the disk can be recorded and reproduced based on the tracking error signal when the light beam crosses the track at the time of switching between methods of detecting the tracking error signal.

14. A disk type determination method according to claim 1, wherein the third step determines whether or not the disk can be recorded and reproduced based on the amplitude of the tracking error signal when the light beam crosses the track.

15. A disk type determination method according to claim 1, wherein the third step determines whether or not the disk can be recorded and reproduced based on a signal obtained by synthesizing the tracking error signal when the light beam crosses the track with at least part of one of reflected or transmitted light from the disk, at the time of switching between methods of detecting the tracking error signal.

16. A disk type determination method according to claim 15, wherein the signal obtained by synthesizing the tracking error signal when the light beam crosses the track with at least part of one of reflected or transmitted light from the disk, is a signal obtained by dividing the tracking error signal by the at least part of one of reflected or transmitted light from the disk.

17. A method for determining the type of a disk, including:
   a first step of determining a substrate thickness of the disk based on a focusing error signal representing a positional deviation of the focal point of a light beam from a recording surface of the disk, when a plurality of objective lenses are moved in such a way as to approach or withdraw from the recording surface of the disk, the plurality of objective lenses having a plurality of focusing characteristics for bringing the light beam into a focus on the disk;
   a second step of determining the number of recording surfaces of the disk using a focusing error signal when the objective lens is moved in such a way as to approach or withdraw from the recording surface of the disk; and
   a third step of determining whether or not the disk can be recorded and reproduced using a tracking error signal representing a positional deviation of the focal point of a light beam from a track of the disk, when the light beam crosses the track,
   wherein after the first step is performed, the second step and the third step are performed in the descending order or in the ascending order while the plurality of objective lenses are switched in accordance with the substrate thickness of the disk determined by the first step.

18. A disk type determination method according to claim 17, wherein in the first step, the substrate thickness of the disk is determined based on a signal obtained by synthesizing the focusing error signal when the objective lens is moved in such a way as to approach or withdraw from the recording surface of the disk with at least part of one of reflected or transmitted light from the disk.

19. A disk type determination method according to claim 17, wherein in the first step, the substrate thickness of the disk is determined based on the amplitude of a signal obtained by synthesizing the focusing error signal when the objective lens in moved in such a way as to approach or withdraw from the recording surface of the disk with at least part of one of reflected or transmitted light from the disk.

20. A disk type determination method according to claim 17, wherein in the second step, the number of the recording surfaces of the disk is determined based on the number of detections of a change from an intermediate value to a peak value and a change from the bottom value to the intermediate value of the focusing error signal, in a predetermined order, when the objective lens is moved in such a way as to approach or withdraw from the recording surface of the disk.

21. A disk type determination method according to claim 20, wherein a change from an intermediate value to a peak value of the focusing error signal is detected by comparing the focusing error signal with a first reference value;
   a change from the peak value to the intermediate value of the focusing error signal is detected by comparing the focusing error signal with a second reference value;
   the first reference value is defined to be larger than the intermediate value of the focusing error signal; and
   the second reference value is defined to be smaller than the intermediate value of the focusing error signal.

22. A disk type determination method according to claim 17, wherein the second step includes the steps of: determining one of a first internal state or a second internal state based on a position, on which the light beam is brought into a focus, when the objective lens is moved in such a way as to approach or withdraw from the recording surface of the disk; and calculating by adding or subtracting a predetermined value based on the determined internal state and the focusing error signal,
   wherein the internal state determining step and the calculating step are repeated in at least a part of an interval where the objective lens is moved in such a way as to approach or withdraw from the recording surface of the disk; and the number of recording surfaces of the disk is determined based on the result of the calculation.

23. A disk type determination method according to claim 22, wherein the focusing position of the light beam is detected based on an order in which the focusing error signal transitions at least one of a first reference value, a second reference value, a third reference value, and a fourth reference value when the focusing section is moved in such a way as to approach or withdraw from the recording surface of the disk.

24. A disk type determination method according to claim 22, wherein in the second step, when the objective lens starts moving in such a way as to approach or withdraw from the recording surface of the disk, the position of the objective lens is away from the recording surface of the disk; and the objective lens is set in the first or second internal state.

25. A disk type determination method according to claim 17, wherein the third step determines whether or not the disk can be recorded and reproduced based an the tracking error signal when the light beam crosses the track at the time of switching between methods of detecting the tracking error signal.

26. A disk type determination method according to claim 17, wherein the third step determines whether or not the disk can be recorded and reproduced based on the amplitude of the tracking error signal when the light beam crosses the track.

27. A disk type determination method according to claim 17, wherein the third step determines whether or not the disk can be recorded and reproduced based on a signal obtained by synthesizing the tracking error signal when the light beam crosses the track with at least part of one of reflected or transmitted light from the disk, at the time of switching between methods of detecting the tracking error signal.

28. A disk type determination method according to claim 27, wherein the signal obtained by synthesizing the tracking error signal when the light beam crosses the track with at least part of one of reflected or transmitted light from the disk, is a signal obtained by dividing the tracking error signal by the at least part of one of reflected or transmitted light from the disk.

29. A method for determining the type of a disk, including:
   a step of detecting a cartridge housing the disk;
   a first step of determining a substrate thickness of the disk based on a focusing error signal representing a positional deviation of the focal point of a light beam from a recording surface of the disk, when a focusing section is moved in such a way as to approach or withdraw from the recording surface of the disk, the focusing section including a plurality of focusing characteristics for bringing the light beam into a focus on the disk;

a second step of determining the number of recording surfaces of the disk using a focusing error signal when the focusing section is moved in such a way as to approach or withdraw from the recording surface of the disk; and a third step of determining whether or not the disk can be recorded and reproduced using a tracking error signal representing a positional deviation of the focal point of a light beam from a track of the disk, when the light beam crosses the track, wherein when the cartridge is not detected, the first step is performed, and the second step and the third step are performed in the descending order or in the ascending order while the focusing characteristics of the focusing section are switched in accordance with the substrate thickness of the disk determined by the first step.

* * * * *

UNITED STATES PATENT AND TRADEMARK OFFICE
CERTIFICATE OF CORRECTION

PATENT NO. : 6,449,232 B1 Page 1 of 1
DATED : September 10, 2002
INVENTOR(S) : Masaya Kuwahara et al.

It is certified that error appears in the above-identified patent and that said Letters Patent is hereby corrected as shown below:

Column 45,
Line 21, "stop" should be -- step --.
Line 38, "to" (first occurrence) should be -- is --.

Column 46,
Line 2, "an" should be -- on --.

Column 47,
Line 50, "in" (first occurrence) should be -- is --.

Column 48,
Line 15, "stop" should be -- step --.

Signed and Sealed this

Eighteenth Day of March, 2003

JAMES E. ROGAN
*Director of the United States Patent and Trademark Office*